United States Patent
Takayama et al.

(10) Patent No.: US 10,170,083 B2
(45) Date of Patent: *Jan. 1, 2019

(54) DISPLAY APPARATUS FOR CONTROL INFORMATION, METHOD FOR DISPLAYING CONTROL INFORMATION, AND SYSTEM FOR DISPLAYING CONTROL INFORMATION

(71) Applicant: Panasonic Intellectual Property Management Co., Ltd., Osaka (JP)

(72) Inventors: Hisashi Takayama, Tokyo (JP); Yuki Waki, Osaka (JP); Yasuo Yoshimura, Shiga (JP); Tetsuya Kouda, Osaka (JP); Toshihisa Ikeda, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 115 days.

This patent is subject to a terminal disclaimer.

(21) Appl. No.: 15/245,782

(22) Filed: Aug. 24, 2016

(65) Prior Publication Data

US 2016/0365073 A1 Dec. 15, 2016

Related U.S. Application Data

(62) Division of application No. 14/128,720, filed as application No. PCT/JP2013/001238 on Feb. 28, 2013, now Pat. No. 9,459,606.

(30) Foreign Application Priority Data

Feb. 28, 2012 (JP) .................... 2012-042429

(51) Int. Cl.
*G09G 5/377* (2006.01)
*H04L 12/28* (2006.01)
(Continued)

(52) U.S. Cl.
CPC ............. *G09G 5/377* (2013.01); *G05B 15/02* (2013.01); *G06Q 10/06* (2013.01); *G06Q 50/06* (2013.01);
(Continued)

(58) Field of Classification Search
CPC ............... G09G 5/377; G09G 2340/12; G09G 2320/10; H04L 12/2816; G06Q 50/06;
(Continued)

(56) References Cited

U.S. PATENT DOCUMENTS 5,377,319 A * 12/1994 Kitahara ............. G06F 3/04895
715/707
5,432,525 A * 7/1995 Maruo ...................... H04N 1/42
345/2.2

(Continued)

FOREIGN PATENT DOCUMENTS

CN 101738995 6/2010
CN 101881944 11/2010
(Continued)

OTHER PUBLICATIONS

Office Action dated Oct. 9, 2016 in corresponding Chinese Application No. 201380001876.1 (with English translation of Search Report).
(Continued)

*Primary Examiner* — Ramesh B Patel
(74) *Attorney, Agent, or Firm* — Wenderoth, Lind & Ponack, L.L.P.

(57) ABSTRACT

A management unit including: a demand plan generating unit that obtains control information items related to energy consuming appliances; an obtaining unit that obtains picture data items showing the appliances; a memory which stores the picture data items obtained by the obtaining unit; a selecting unit which selects a picture data item from selec-
(Continued)

tion candidates including the picture data items stored in the memory, based on a specified control mode; a processor that executes processing for superimposing the control information items corresponding to the appliances in the picture data item selected by the selecting unit; and an output unit which displays the picture data item with the superimposed control information item.

6 Claims, 46 Drawing Sheets

(51) Int. Cl.
    *G05B 15/02*     (2006.01)
    *G06Q 10/06*     (2012.01)
    *G06Q 50/06*     (2012.01)
    *H02J 3/00*     (2006.01)

(52) U.S. Cl.
    CPC ..... *H04L 12/2816* (2013.01); *G09G 2320/10* (2013.01); *G09G 2340/12* (2013.01); *H02J 2003/007* (2013.01); *Y02E 60/76* (2013.01); *Y04S 40/22* (2013.01)

(58) Field of Classification Search
    CPC ........ G06Q 10/06; G05B 15/02; Y02E 60/76; Y04S 40/22; H02J 2003/007
    See application file for complete search history.

(56) References Cited

U.S. PATENT DOCUMENTS

| | | | | |
|---|---|---|---|---|
| 8,145,748 | B2* | 3/2012 | Denis | H04L 41/06 709/223 |
| 8,149,267 | B2* | 4/2012 | Sasaki | G11B 20/10527 348/42 |
| 8,326,651 | B2* | 12/2012 | McLaren | G06Q 10/06 705/3 |
| 8,907,962 | B2* | 12/2014 | Sakamaki | G09G 3/3611 345/534 |
| 9,046,883 | B2* | 6/2015 | Guo | H04L 67/18 |
| 2003/0193525 | A1* | 10/2003 | Nygaard, Jr. | G06F 3/0482 715/810 |
| 2004/0015079 | A1* | 1/2004 | Berger | A61B 8/546 600/437 |
| 2004/0130502 | A1* | 7/2004 | Sato | H04L 12/2838 345/2.1 |
| 2005/0114793 | A1* | 5/2005 | Jung | G11B 27/034 715/839 |
| 2006/0094453 | A1* | 5/2006 | Rhyu | H04L 51/38 455/466 |
| 2006/0184509 | A1* | 8/2006 | Ahmed | G06F 17/30398 |
| 2006/0276938 | A1* | 12/2006 | Miller | G06Q 50/06 700/295 |
| 2007/0067472 | A1* | 3/2007 | Maertens | H04L 29/06027 709/230 |
| 2007/0112939 | A1* | 5/2007 | Wilson | H04L 12/2807 709/219 |
| 2010/0277503 | A1* | 11/2010 | Sakamaki | G09G 3/3611 345/619 |
| 2011/0098869 | A1* | 4/2011 | Seo | G01D 4/004 700/296 |
| 2011/0125337 | A1* | 5/2011 | Zavadsky | G06F 1/263 700/291 |
| 2011/0196547 | A1* | 8/2011 | Park | G06Q 50/06 700/296 |

FOREIGN PATENT DOCUMENTS

| | | |
|---|---|---|
| JP | 2003-240335 | 8/2003 |
| JP | 2005-065118 | 3/2005 |
| JP | 3888906 | 3/2007 |
| JP | 2008-202984 | 9/2008 |
| JP | 2009-112075 | 5/2009 |
| JP | 2009-245361 | 10/2009 |
| JP | 2012-098946 | 5/2012 |
| WO | 2011/052696 | 5/2011 |

OTHER PUBLICATIONS

International Search Report dated Apr. 23, 2013 in International (PCT) Application No. PCT/JP2013/001238.

* cited by examiner

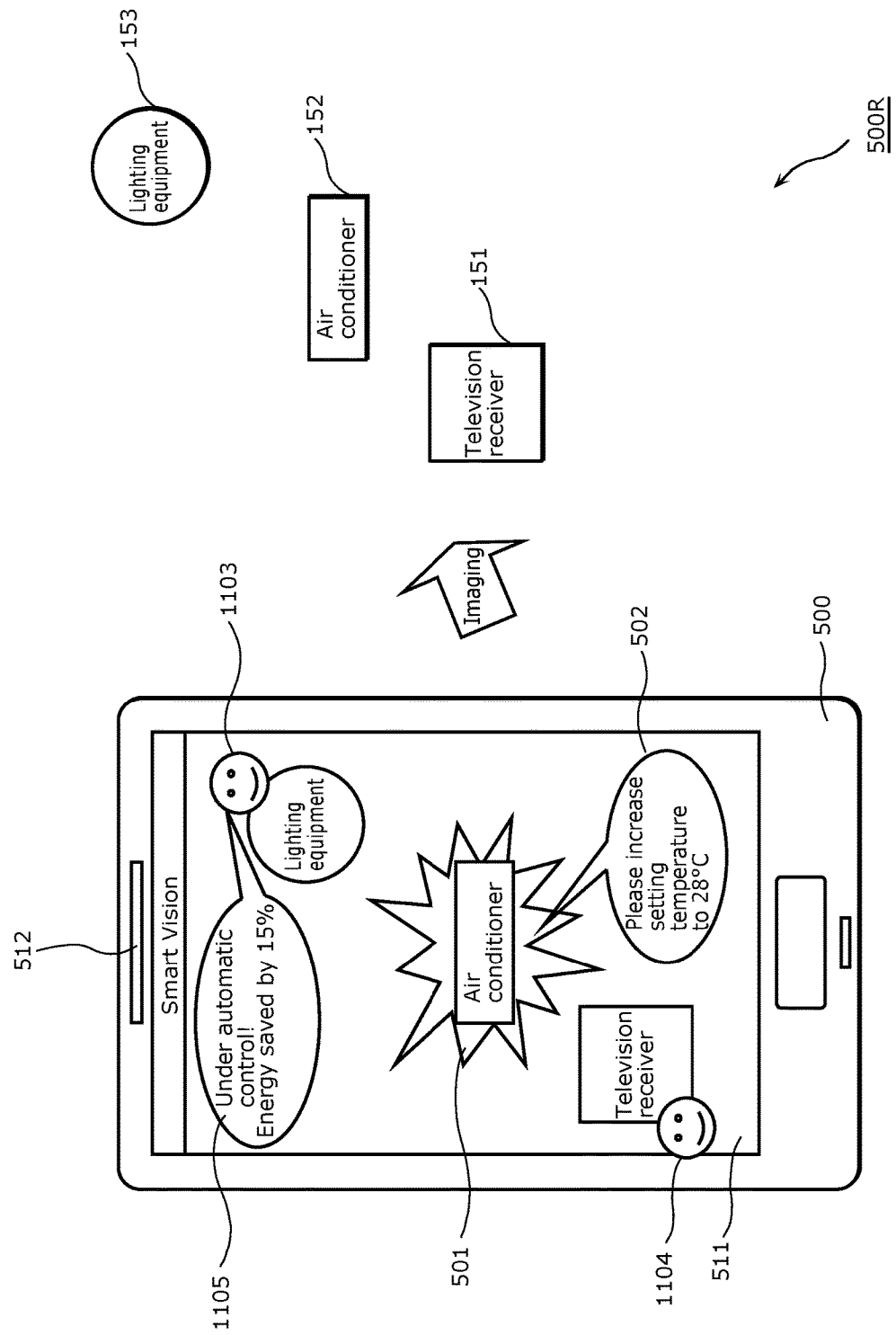

DISPLAY APPARATUS FOR CONTROL INFORMATION, METHOD FOR DISPLAYING CONTROL INFORMATION, AND SYSTEM FOR DISPLAYING CONTROL INFORMATION

TECHNICAL FIELD

The present invention relates to a control information display apparatus, a control information display method, and a control information display system.

BACKGROUND ART

There have been proposed systems in which a controller collects states of energy use by appliances by communicating with the appliances, and provides a user with degrees of appropriateness of the energy use by the appliances (for example, see Patent Literature 1).

CITATION LIST

Patent Literature

[PTL 1]
Japanese Patent Publication No. 3888906
[PTL 2]
PCT International Publication No. 2011/052696

SUMMARY OF INVENTION

Technical Problem

However, when a control information item for satisfying a control request in a building is presented, a user cannot specifically find out a target one of the appliances and the kind of control which should be performed to achieve the presented control request.

In view of this, the present invention provides a control information display apparatus which presents a user with control information necessary for achieving a presented control request.

Solution to Problem

In order to solve the aforementioned conventional problem, an information display apparatus according to an aspect of the present invention includes: a first obtaining unit configured to obtain one or more control information items regarding one or more appliances; a second obtaining unit configured to obtain one or more picture data items showing images of the one or more appliances; a memory that stores the one or more picture data items obtained by the second obtaining unit; a selecting unit configured to select, based on a specified control mode, a picture data item from among selection candidates including the one or more picture data items stored in the memory; a processor that executes processing for superimposing a control information item for each of the one or more appliances which are included in the picture data item selected by the selecting unit, at a position around the appliance in the picture data item; and a display unit configured to display the picture data item with the control information item superimposed thereon.

These general and specific aspects may be implemented using a system, a method, an integrated circuit, a computer program, a computer-readable recording medium such as a CD-ROM, or any combination of systems, methods, integrated circuits, computer programs, or recording media.

Advantageous Effects of Invention

The control information display apparatus according to the present invention is capable of presenting the user with the control information necessary for achieving the presented control request.

BRIEF DESCRIPTION OF DRAWINGS

FIG. 13 is a diagram showing an example of a picture data item with superimposed presentation data items output on an output unit in Embodiment 4.

Figure 1:
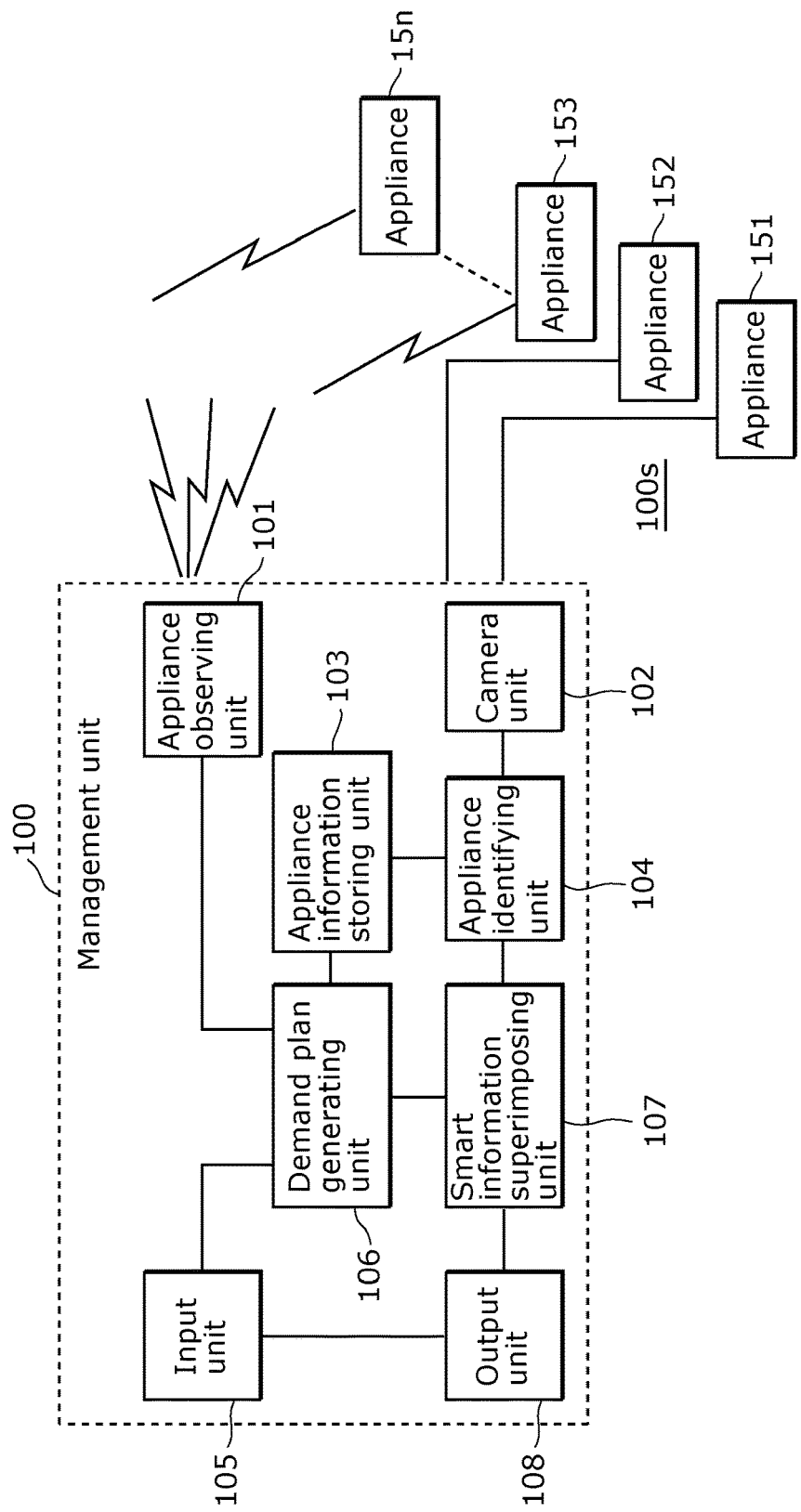
FIG. 1 is a diagram showing a configuration of an energy management system in Embodiment 1.

DESCRIPTION OF EMBODIMENTS (Underlying Knowledge Forming Basis of the Present Disclosure)

The Inventors found that the energy-related information presenting system identified in the "Background Art" section has problems below.

Energy saving efforts have been made globally in order to reduce CO2 and prevent global warming. As examples of such efforts, nations are making promotion movements for saving energy by presenting specific numerical targets to enterprises and homes.

In addition, due to reduction in electric power supply in Japan, enterprises and households have been requested to reduce electric power consumption drastically. If such reduction is not achieved, a large-scale blackout may occur due to shortage of power supply with respect to demands. This has been a social problem.

In view of this, there have been systems below. For example, a system has been proposed which prompts a user to save energy by measuring energy consumption in his or her home and displaying the measurements on a monitor or the like. In the proposed system, a controller communicates with appliances in the home and performs control for preventing unnecessary use of an appliance included in the appliances.

However, when a 15% reduction in power consumption in a household is presented as a target, the household cannot find out how to achieve the 15% reduction. Methods for using individual appliances in an energy saving manner have been introduced through various kinds of media. However, different households use different appliance configurations. For this reason, each of the households cannot find out how to combine some of the methods for the appliance configuration in order to achieve the 15% reduction. For this reason, there are cases where the 15% reduction is not achieved actually, energy saving is performed too much, comfort is significantly affected, health is affected, etc.

In addition, systems have been proposed which includes the system (see Patent Literature 1) for collecting states of energy consumed by the appliances by communicating with the appliances and presenting the user degrees of appropriateness of the energy use by the respective appliances. However, the household have many appliances without any communication function. These appliances are excluded from such targets for such presentation of the degrees of appropriateness of the energy use. Thus, the user cannot find out how to achieve the 15% reduction. Supposing that the user can obtain a list of methods for using the appliances so as to achieve the 15% reduction in the household, the user is required to take complicated operations of searching out, one by one, the actual appliances corresponding to the respective appliances on the list and using the appliances according to the specified methods.

In other words, when the control information item is presented to satisfy the control request in the building, the user cannot specifically find out a target one of the appliances and the kind of control which should be performed to achieve the presented control request.

In view of this, the present invention provides a control information display apparatus which presents a user with control information necessary for achieving a presented control request.

In order to solve such a problem, an information display apparatus according to an aspect of the present invention is an information display apparatus including: a first obtaining unit configured to obtain one or more control information items regarding one or more appliances; a second obtaining unit configured to obtain one or more picture data items showing images of the one or more appliances; a memory that stores the one or more picture data items obtained by the second obtaining unit; a selecting unit configured to select, based on a specified control mode, a picture data item from among selection candidates including the one or more picture data items stored in the memory; a processor that executes processing for superimposing a control information item for each of the one or more appliances which are included in the picture data item selected by the selecting unit, at a position around the appliance in the picture data item; and a display unit configured to display the picture data item with the control information item superimposed thereon.

Figure 35:
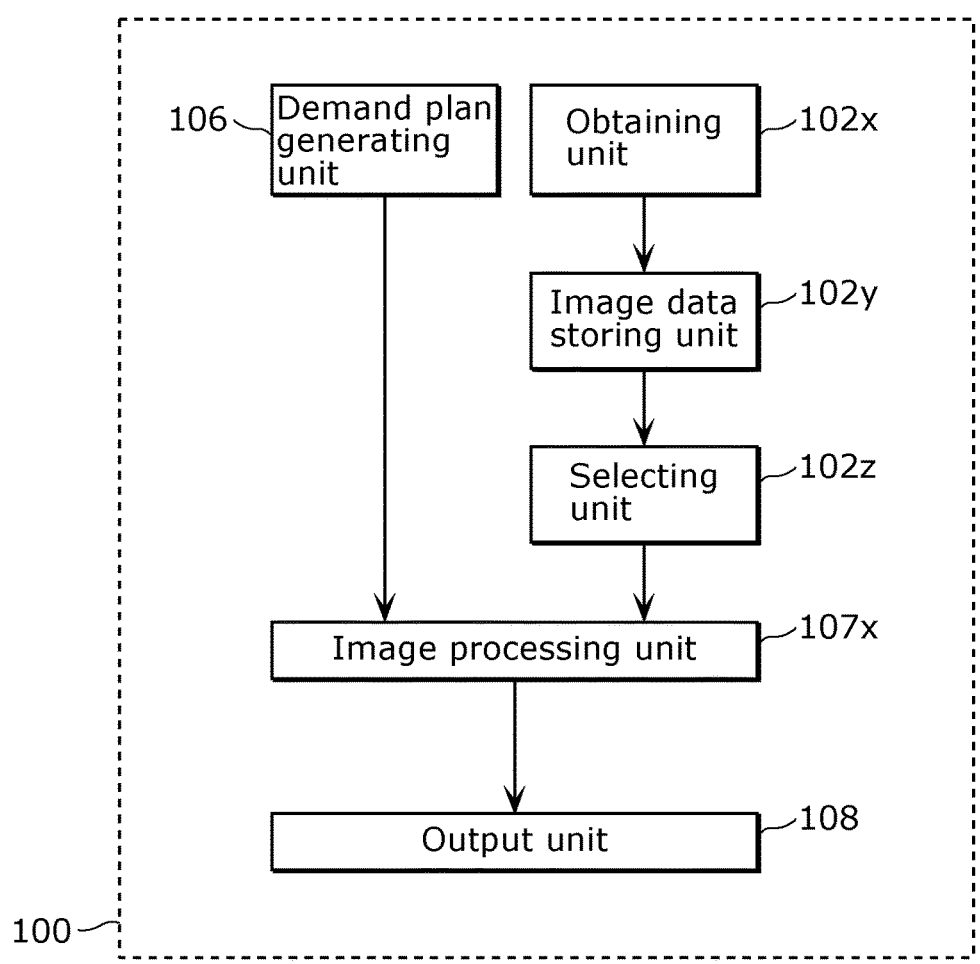
FIG. 35 is a diagram of a management unit.

In order to solve such a problem, a control information display apparatus according to an aspect of the present invention is a control information display apparatus (a management unit 100) including: a first obtaining unit (a demand plan generating unit 106) configured to obtain one or more control information items (i) regarding one or more appliances which consume energy provided in a building and (ii) used for satisfying a control request in the building; a second obtaining unit (a camera unit 102, an appliance identification unit 104) configured to obtain one or more picture data items showing images of the one or more appliances; a memory that stores the one or more picture data items obtained by the second obtaining unit; a selecting unit configured to select, based on a specified control mode, a picture data item from among selection candidates including the one or more picture data items stored in the memory; a processor (a presentation data generating unit 302, a superimposing unit 303) that generates a presentation data item to be presented to a user to indicate a control information item for each of the one or more appliances which are included in the picture data item selected by the selecting unit, and superimpose the presentation data item at a position around the appliance in the picture data item; and a display unit configured to display the picture data item with the presentation data item superimposed thereon. It is to be noted that the control information display apparatus may include an obtaining unit 102x including the camera unit 102 and the appliance identification unit 104. In addition, the control information display apparatus may include an image processing unit 107x including the presentation data generating unit 302 and the superimposing unit 303 (FIG. 35).

For example, the second obtaining unit may be configured to obtain the picture data items which include, as attribute information items of the picture data items, image capturing position information items indicating image capturing positions of the picture data items, and the selecting unit may be configured to select, as the picture data item, a selection candidate associated with an image capturing position closer to a position of the control information display apparatus, the image capturing position being included in the image capturing positions indicated by the image capturing information items.

For example, the control information display apparatus may further include: a control unit configured to control the one or more appliances via a communication network; an input unit configured to receive a control instruction for controlling a control target appliance among the one or more appliances; and a remote control application which transmits the control instruction received by the input unit to the control unit, wherein the control unit may be configured to control the current control target appliance based on the control instruction received from the remote control application.

For example, the a processor may be configured to superimpose, at a position around the control target appliance in the picture data item, an activation button for activating the remote control application corresponding to the current control target appliance which is included in one of the picture data items, the remote control application may transmit, to the control unit, the control instruction received from the input unit, in response to a press of the activation button for activating the remote control application, and the control unit may be configured to control the current control target appliance.

For example, the second obtaining unit may further be configured to obtain one or more video data items in each of which images of the one or more appliances are included, and the selecting unit may be configured to select the picture data item from among the selection candidates which include (i) the video data items and (ii) the picture data items stored in the memory.

For example, the control information display apparatus may further include: a third obtaining unit configured to obtain current values indicating amounts of energy consumed by the one or more appliances; and a presentation need determining unit configured to determine one or more appliances which are included in the one or more appliances in the picture data item, to be M or less appliances for each of which a presentation data item is to be presented to the user, M being a predetermined number (which is an integer), wherein the presentation need determining unit may be configured to preferentially determine the M or less appliances included in the one or more appliances in the picture data item, in descending order of differences between the current values indicating the amounts of consumed energy and estimated values indicating amounts of energy consumable in the case of performing control based on the control information item, and the processor may be configured to superimpose the presentation data item onto the picture data item, for each of the M or less appliances for which the presentation data item is to be presented to the user.

For example, the control information display apparatus may further include a control unit configured to control one or more appliances controllable via a communication network among the appliances in the picture data item, based on the control information items obtained by the first obtaining unit, wherein the presentation need determining unit may be configured to preferentially determine, as the M or less appliances, one or more appliances uncontrollable via the communication network over the one or more appliances controllable via the communication network among the appliances in the picture data item.

For example, the processor may be configured to generate, as the presentation data items, a detailed presentation data item including detailed information, and a brief presentation data item including brief information, and when determining the M or less appliances, the presentation need determining unit may be configured to: preferentially determine one or more appliances included in the one or more appliances in the picture data item, to be Md or less appliances for each of which the detailed presentation data item is to be presented, in descending order of differences between the current values indicating the amounts of consumed energy and estimated values indicating amounts of energy consumable in the case of performing control based on the control information item, Md being a predetermined number (which is an integer satisfying Md≤M); and preferentially determine one or more appliances other than the Md or less appliances for each of which the detailed presentation data item is to be presented among the one or more appliances in the picture data item, to be (M−Md) or less appliances for each of which the brief presentation data item is to be presented, in descending order of differences between the current values indicating the amounts of consumed energy and estimated values indicating amounts of energy, (M−Md) denoting a predetermined number.

For example, the first obtaining unit may be configured to receive the control request from an electric power company or a public institution via a network.

For example, the display unit may include a display screen, and the presentation need determining unit is configured to determine the predetermined number M according to a size of the display screen.

For example, an operation unit may be configured to receive an instruction from the user, wherein the presentation need determining unit may be configured to determine the number received through the operation unit as the predetermined number M.

For example, the control information display apparatus is one of a mobile phone, a smart phone, and a television receiver.

For example, the first obtaining unit may be configured to obtain a plurality of the control information items regarding a plurality of the appliances, the second obtaining unit may be configured to obtain, as the one or more picture data items, a plurality of the picture data items showing images of the appliances, and the processor may be configured to generate at least one of a plurality of the presentation data items which is for presenting a corresponding one of the control information items which is for at least one of the appliances, and superimpose the at least one presentation data item onto a corresponding one of the picture data items, in association with the at least one appliance whose location is identified in the corresponding picture data item.

For example, the control information display apparatus may further include a presentation priority determining unit configured to set, for each of the appliances included in the picture data item, a presentation priority level to the at least one presentation data item for presenting the corresponding control information item, the presentation priority level becomes higher with an increase in a difference between the estimated value indicating the amount of energy consumable in the case of performing the control based on the control information item and the current value indicating the amount of consumed energy, wherein the processor may be configured to superimpose the at least one presentation data item having the higher presentation priority level set by the presentation priority determining unit, in a larger size onto the display unit.

For example, a plurality of the control requests may include a control request regarding a current amount of energy consumed in the building.

For example, a plurality of the control requests may include a control request regarding an indoor environment parameter including at least a temperature, a humidity, or an luminance in the building.

For example, a plurality of the control requests may include a control request regarding an indoor air quality in the building.

For example, the second obtaining unit may be configured to obtain, as the picture data item, a picture data item with an identification information item including ID and a position of the appliance in the picture data item, and the a processor may be configured to superimpose the presentation data item at the position around the appliance in the picture data item identified by the identification information item.

In addition, a control information display apparatus according to an aspect of the present invention includes a first obtaining unit configured to obtain a control request regarding amounts of energy consumed in a building; a second obtaining unit configured to obtain one or more picture data items showing images of one or more appliances which consume energy provided in the building, each of the one or more picture data items including identification information items of the one or more appliances; a third obtaining unit configured to obtain current values indicating amounts of energy consumed by the one or more appliances; a control information generating unit configured to generate a control information item for each of the one or more appliances to satisfy the control request, based on the current values indicating the amounts of energy consumed by the one or more appliances; a processor that generates at least one presentation data item for presenting the control information item of at least one of the one or more appliances whose images are included in the picture data item, and superimpose the at least one presentation data item onto the image data item in association with the at least one appliance identified by the identification information item; and a display unit configured to display the picture data item with the at least one presentation data item superimposed thereon.

In addition, a control information display method according to an aspect of the present invention includes: obtaining one or more control information items (i) regarding one or more appliances which consume energy provided in a building and (ii) used for satisfying a control request in the building; obtaining one or more picture data items showing images of the one or more appliances; storing the one or more picture data items obtained in the obtaining of the one or more picture data items; selecting, based on a specified control mode, a picture data item from among selection candidates including the one or more picture data items stored in the storing; generating a presentation data item to be presented to a user to indicate a control information item for each of the one or more appliances which are included in the picture data item selected in the selecting, and superimposing the presentation data item at a position around the appliance in the picture data item; and displaying the picture data item with the presentation data item superimposed thereon.

In addition, a control information display system according to an aspect of the present invention includes appliances which consume energy provided in a building, the system including a control information display apparatus including: a first obtaining unit configured to obtain one or more control information items (i) regarding one or more appliances which consume energy provided in a building and (ii) used for satisfying a control request in the building; a second obtaining unit configured to obtain one or more picture data items showing images of the one or more appliances; a memory that stores the one or more picture data items obtained by the second obtaining unit; a selecting unit configured to select, based on a specified control mode, a picture data item from among selection candidates including the one or more picture data items stored in the memory; a processor that generates a presentation data item to be presented to a user to indicate a control information item for each of the one or more appliances which are included in the picture data item selected by the selecting unit, and superimpose the presentation data item at a position around the appliance in the picture data item; and a display unit configured to display the picture data item with the presentation data item superimposed thereon.

With the control information display apparatus, the presentation data items based on a demand plan is superimposed around the target energy consuming appliance on the output unit. Thus, the user can easily understand how to use the energy consuming appliance so as to satisfy a demand control request.

When many energy consuming appliances are displayed on the display screen, a limited number of presentation data items are superimposed onto the picture data item so as to sufficiently secure the visibility. For example, presentation data items related to energy consuming appliances having larger differences between predetermined operation states and current operation states are preferentially superimposed based on the demand plan because the presentation data items provide higher energy saving effects when displayed.

In this case, the presentation data items superimposed on the data on the output unit are visually recognized by the user. Thus, effective control based on the presentation data items is performed to achieve the demand control request. Accordingly, it is possible to prompt the user to use the energy consuming appliances effectively to achieve the demand control request.

In addition, it is possible to provide an energy control apparatus which provides control information items related to the appliances in a high visible manner in order to achieve the energy consumption target in the building.

[Embodiment 1]

FIG. 1 is a diagram showing a configuration of an energy management system in this embodiment.

The energy management system in this embodiment includes n energy consuming appliances 151 to 15n (n is an integer larger than or equal to 1) and a management unit 100.

Each of the energy consuming appliances 151 to 15n is placed in a home, and provides particular functions for the user while consuming energy. The management unit 100 manages energy consumed by the energy consuming appliances 151 to 15n.

The management unit 100 includes: an appliance observing unit 101; a camera unit 102; an appliance information storing unit 103; an appliance identifying unit 104; an input unit 105; a demand plan generating unit 106; a smart information superimposing unit 107; and an output unit 108.

The appliance observing unit 101 communicates with the energy consuming appliances wired or wirelessly, obtains and stores the amounts of energy consumed by the energy consuming appliances and appliance operation state information items related to the states of the respective energy consuming appliances.

The camera unit 102 captures images of the energy consuming appliances placed inside and outside of the home.

The appliance information storing unit 103 stores (i) appliance specifications information items including the manufactures, models, power consumptions etc. of the energy consuming appliances 151 to 15n placed in the home, and (ii) appliance identification information items for identifying the respective energy consuming appliances.

The appliance identifying unit 104 identifies the energy consuming appliance (specifically, the ID of the energy consuming appliance and the image position of the energy consuming appliance) included in the picture data item obtained by the camera unit 102. The appliance identifying unit 104 may obtain a picture data item from an external appliance (not shown) and identify the energy consuming appliance included in the picture data item. In this case, the camera unit 102 is unnecessary.

The input unit 105 receives an input of the demand control request related to energy consumed in the home.

The demand plan generating unit 106 generates the demand plan of details of control for the respective energy consuming appliances 151 to 15n in order to satisfy the demand control request received through the input unit 105. The demand plan generating unit 106 generates information items to be presented to the user (hereinafter referred to as "presentation information items") including the demand plan (see FIG. 3 which is described later).

The smart information superimposing unit 107 superimposes presentation data items generated from the presentation information items onto a picture data item showing energy consuming appliances identified therein.

The output unit 108 outputs the picture data item with presentation data items superimposed by the smart information superimposing unit 107.

The energy consuming appliances 151 to 15n are home appliances such as an air conditioner, a lighting equipment, and a television receiver. These home appliances may be a hot water dispenser, a solar power generating appliance, power storage appliance, or so on. The solar power generating appliance is included in the energy consuming appliances and generates electric energy and whose energy consumption is negative.

The camera unit 102 is a digital camera capable of imaging a still image and a video.

The appliance observing unit 101, the appliance information storing unit 103, the appliance identifying unit 104, the input unit 105, the demand plan generating unit 106, and the smart information superimposing unit 107, and the output unit 108 are configured actually in the forms of one or more CPUs and a plurality of memory appliances. In other words, the one or more CPUs execute the program stored in the memory appliances, and stores information on memory areas on the memory appliances in readable formats. This makes it possible to realize the functions of the appliance observing unit 101, the appliance information storing unit 103, the appliance identifying unit 104, the demand plan generating unit 106, and the smart information superimposing unit 107.

In addition, the input unit 105 includes, as elements, a touch panel and an audio microphone. Each CPU executes driver software stored in the memory appliances, a soft keyboard, and a speech recognition application. In this way, the one or more CPUs receive various kinds of touch inputs from the touch panel and audio inputs from the audio microphone.

In addition, the output unit 108 includes, as elements, a liquid crystal display and a speaker. Each CPU executes the driver software stored in the memory appliances, a display application such as a browser, and an audio reproduction application. In this way, the one or more CPUs display information onto the liquid crystal display and output audio from the speaker.

Here, the touch panel of the input unit 105 and the liquid crystal display of the output unit 108 constitute the same display screen. For example, the input unit 105 receives an input for information output on the output unit 108. More specifically, for example, when an operation such as a tap operation is performed on the touch panel of the input unit 105, the operation is received as an input by an appliance application such as a browser executed by the CPU. The operation is received as an operation of pressing a button displayed at a position such as a tap position, or as an operation of selecting a link displayed on the position.

The appliance observing unit 101, the camera unit 102, the appliance information storing unit 103, the appliance identifying unit 104, the input unit 105, the demand plan generating unit 106, the smart information superimposing unit 107, and the output unit 108 are configured in the form(s) of one or more appliances. When these units are configured as a plurality of appliances, these appliances are connected to each other for wired or wireless communication.

Figure 2:
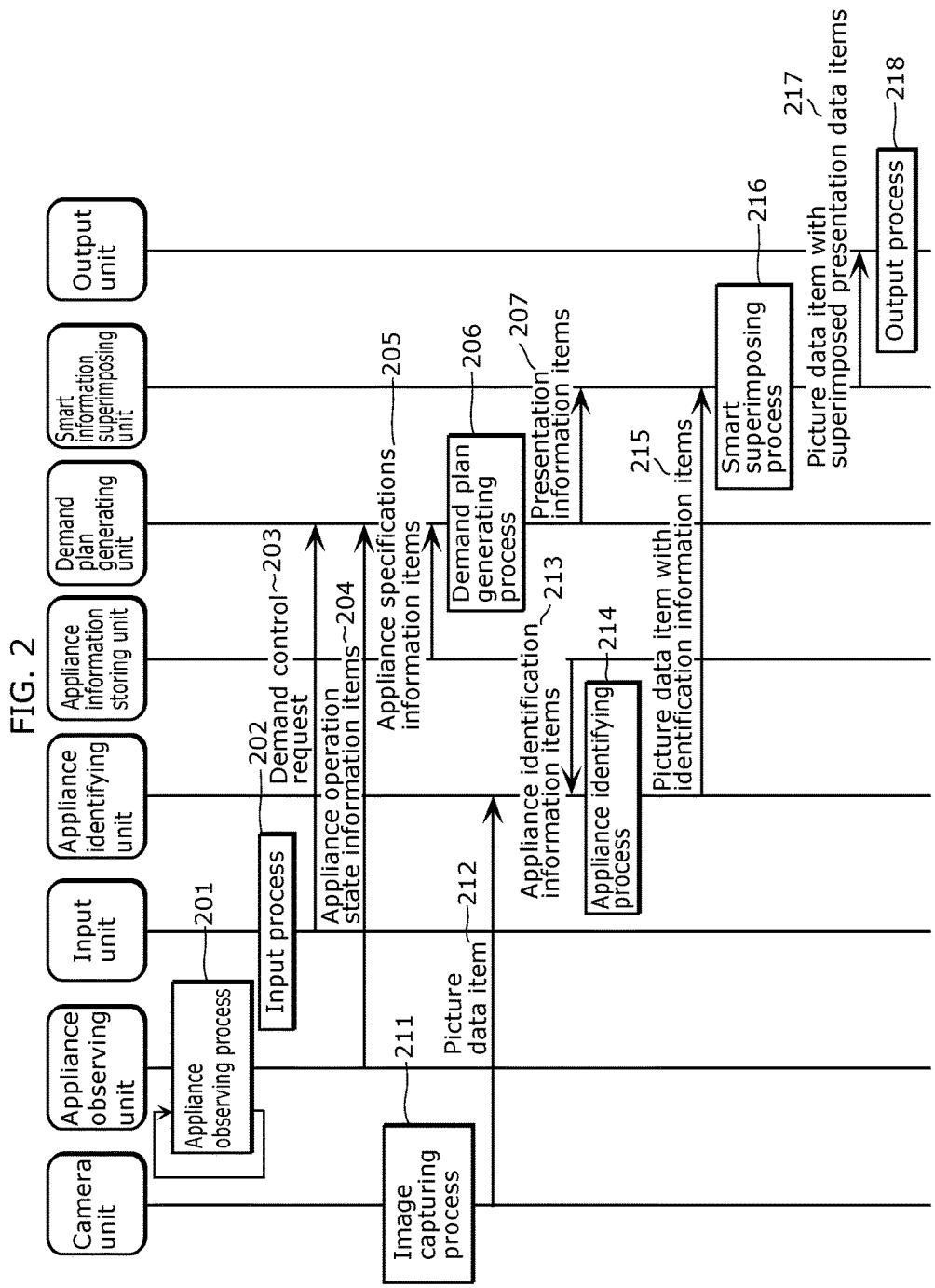
FIG. 2 is a sequence diagram for explaining operations in the energy management system in Embodiment 1.

FIG. 2 is a diagram showing a sequence of operations performed by the energy management system in this embodiment.

First, the appliance observing unit 101 executes an appliance observing process 201. In the appliance observing process 201, the appliance observing unit 101 obtains, through communication with each of the energy consuming appliances 151 to 15n, the amounts of energy consumed by the respective energy consuming appliances and information items related to the states of the respective energy consuming appliances (hereinafter referred to as "appliance operation state information items"), and stores the amounts and the information items on some of the memory areas. The appliance observing unit 101 executes an appliance observing process 201 repeatedly and periodically.

Meanwhile, the user inputs the demand control request 203 through the input unit 105 (an input process 202). For example, the demand control request 203 is a demand request related to energy consumed in the home. The case where the demand control request 203 is a demand control request related to energy consumed in the home is described below.

The demand control request 203 which has been input is transmitted to the demand plan generating unit 106. Here, the demand control request 203 is a request for "a 10% reduction in the energy consumption amount in the entire home", "a 10% reduction in the CO2 discharge amount due to energy consumption in the home", or "a 10% reduction in cost required for energy consumption in the home". Hereinafter, for simplicity, descriptions are given of a case where the demand control request 203 is the request for "a 10% reduction in the energy consumption amount in the entire home".

Upon receiving the demand control request 203, the demand plan generating unit 106 performs a demand plan generating process 206. In the demand plan generating process 206, access to the appliance observing unit 101 is made, and the appliance operation state information items 204 stored in one of the memory areas are referred to. Furthermore, the appliance specifications information items 205 stored in the appliance information storing unit 103 are referred to. With reference to these information items, the demand plan satisfying the demand control request 203 is generated using a method such as a publicly known method.

The appliance information storing unit 103 stores the appliance specifications information items 205 of the respective energy consuming appliances 151 to 15n. More specifically, information items related to energy consumed in various kinds of operation states of the energy consuming appliances are stored as the appliance specifications information items 205 of the respective energy consuming appliances. In this storing operation, for example, the appliance specifications information items 205 are stored in association with ID of the energy consuming appliance.

Examples of publicly known methods that the demand plan generating unit 106 can use to generate the demand plan include the method as indicated below. Specifically, the method is a method in which a simulation executing unit generates a reduction plan as described in the paragraphs [0078] and [0106] of Patent Literature 2. In the case of the demand plan generating unit 106 in this embodiment, the following simulation method is shown as an example. For example, there are control patterns which can be combined with a current configuration of energy consuming appliances. In other words, the current configuration of energy consuming appliances is combined with each of the control patterns. The demand plan generating unit 106 performs a simulation for each of the combinations. The demand plan generating unit 106 evaluates the results of the simulations, derives one of the control patterns which yields a result satisfying the demand control request 203 (corresponding to the reduction target in Patent Literature 2), and determines details of the derived control pattern as the demand plan.

The demand plan generating unit 106 transmits, to the smart information superimposing unit 107, the presentation information items 207 including the generated demand plan and the appliance operation state information items 204 indicating current operation states of the respective energy consuming appliances.

Next, when the user captures images of the interior or exterior of the home using the camera unit 102 (an image capturing process 211), the picture data item 212 is transmitted to the appliance identifying unit 104.

The appliance identifying unit 104 which has received the picture data item 212 performs an appliance identifying process 214. In this process, the appliance identifying unit 104 identifies the energy consuming appliance included in the received picture data item 212, with reference to the (earlier-mentioned) appliance identification information items 213 stored in the appliance information storing unit 103.

The appliance information storing unit 103 stores the appliance identification information items 213 of the respective energy consuming appliances 151 to 15n. The appliance identification information item 213 of each of the energy consuming appliance is an information item for identifying the energy consuming appliance through image analysis from among the picture data item 212 including the energy consuming appliance. This information item is stored in association with the ID of the energy consuming appliance.

The appliance identifying unit 104 performs image processing on the picture data item 212 to extract feature information. The appliance identifying unit 104 verifies whether the feature information matches the appliance identification information items 213 stored in the appliance information storing unit 103. In this way, the appliance identifying unit 104 identifies the energy consuming appliance included in the picture data item 212 to be the energy consuming appliance corresponding to the appliance identification information item whose verification has been successfully done. The appliance identifying unit 104 transmits, to the smart information superimposing unit 107, the picture data item 215 with the identification information of the identified energy consuming appliance obtained by adding the identification information of the appliance to the picture data item 212 obtained by the camera unit 102. The appliance identification information includes ID of the identified energy consuming appliance and the information indicating a position of the energy consuming appliance in the picture data item 212 in a video.

Next, upon receiving the presentation information items 207 and the picture data item 215 with the identification information items, the smart information superimposing unit 107 executes a smart superimposing process 216. In this process, presentation data items which are to be actually presented to the user are generated from the presentation information items 207 based on a predetermined algorithm which is later described. The generated presentation data items are superimposed around the (afore-mentioned) positions of the energy consuming appliances in the picture data item 215 with the identification information items. At this time, in the smart superimposing process 216, a limited number of presentation data items are to be superimposed considering user visibility. In this way, the details of the presentation information items 207 are displayed in a comparatively easy-to-recognize format. For example, the picture data item 215 with the identification information items is transmitted from the appliance identifying unit 104 to the smart information superimposing unit 107. As another example, the picture data item 215 with the identification information items may be transmitted from an external appliance which functions as a camera unit 102 and an appliance identifying unit 104 to the smart information superimposing unit 107. Here, "around" means within a range having a predetermined distance from a specified position.

In addition, the smart superimposing process 216 performs a process for generating picture data item 217 on which the generating picture data item 215 with the identification information items and the presentation data items have been superimposed. These data items are to be output by the display application of the output unit 108, the audio reproduction application etc. More specifically, the smart superimposing process 216 generates data items having a data format below. Specifically, the data items are input through the display application of the output unit 108 and the audio reproduction application and have a data format which can be interpreted by the display application and the audio reproduction application. These data items are included in the picture data item 217 with superimposed presentation data items. More specifically, in the smart superimposing process 216, the data items generated here are data items on which the picture data item 215 and the presentation data items are superimposed, and which are written using Hyper Text Markup Language (HTML) or the like. For example, the smart information superimposing unit 107 generates, as the picture data item 217 with superimposed presentation data items, the data items written using HTML and data items such as image data items and audio data items referred to by the HTML data items, and outputs the generated data items to the output unit 108.

Next, the output unit 108 outputs the picture data item 217 with the superimposed presentation data items using the liquid crystal display and the speaker (an output process 218). Based on the HTML data items, the display application of the output unit 108 displays the presentation data items on the liquid crystal display by superimposing them around the energy consuming appliances. In addition, the audio reproduction application of the output unit 108 drives the speaker to reproduce the audio data items referred to by the HTML data items.

Next, the smart information superimposing unit 107 is described in detail.

Figure 3:
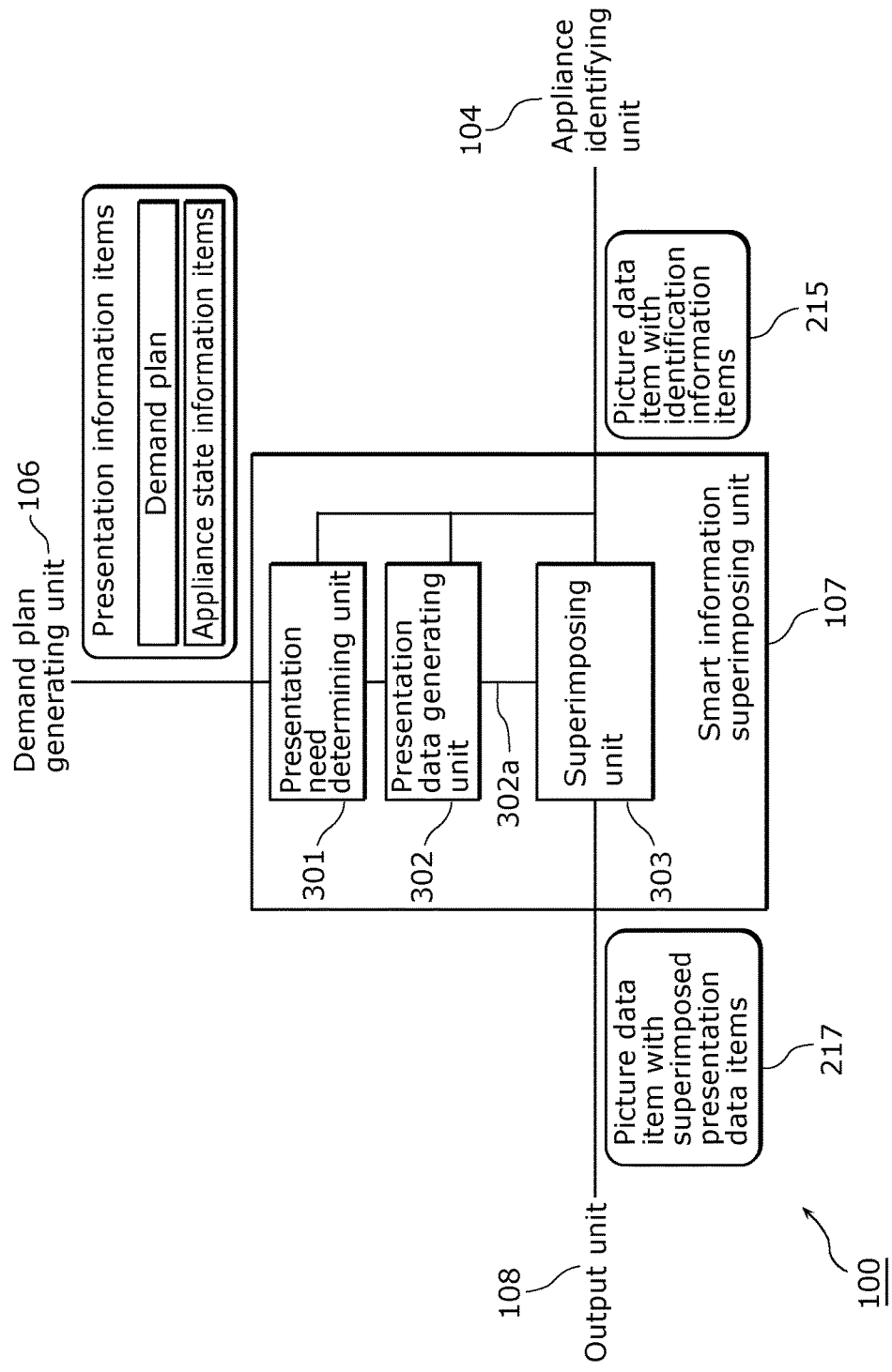
FIG. 3 is a block diagram of a smart information superimposing unit in the energy management system in Embodiment 1.

FIG. 3 shows an internal structure of the smart information superimposing unit 107.

The smart information superimposing unit 107 includes: a presentation need determining unit 301; a presentation data generating unit 302; and a superimposing unit 303. The presentation need determining unit 301 determines whether each of presentation data items needs to be presented to the user based on the predetermined algorithm (a presentation need determining process). The presentation data generating unit 302 generates presentation data items determined to be presentation data items which need to be presented by the presentation need determining unit 301, based on the presentation information item. The superimposing unit 303 superimposes the presentation data items determined to be presentation data items which need to be presented by the presentation need determining unit 301 onto the picture data item 215 with the appliance identification information items of the identified energy consuming appliances.

For example, there is a possibility that a comparatively large number of energy consuming appliances is identified in the picture data item 212. In this case, when presentation data items for the respective energy consuming appliances are simply superimposed, many presentation data items are displayed on the liquid crystal display at the same time. This makes it difficult for the user to recognize the data items, resulting in a reduction in visibility. In view of this, the presentation need determining unit 301 limits the number of presentation data items to be superimposed, by determining whether each of the information items indicating the details of the demand plan needs to be presented to the user, based on the predetermined algorithm with consideration of user visibility.

Figure 4:
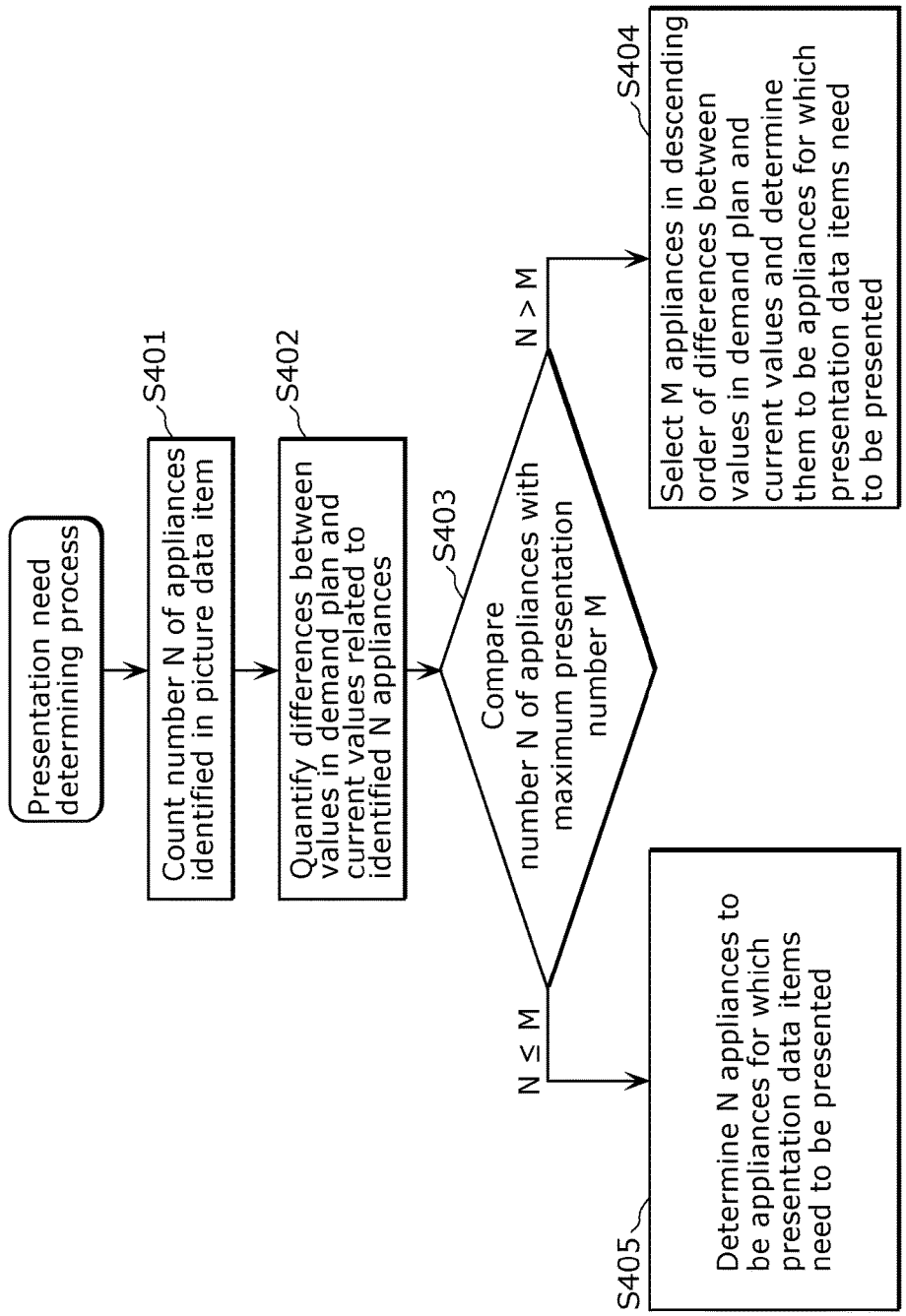
FIG. 4 is a flowchart for explaining a presentation need determining process in Embodiment 1.

FIG. 4 is a flowchart of the presentation need determining process performed by the presentation need determining unit 301.

First, the presentation need determining unit 301 counts the number N (N is an integer larger than or equal to 0) of energy consuming appliances identified in the picture data item 212, based on appliance identification information items of the appliances (Step S401).

Next, the presentation need determining unit 301 quantifies the differences between target values obtainable by performing the demand plan and current values related to the identified N energy consuming appliances (Step S402). Examples of data items specifically used here include control details for the energy consuming appliances indicated by the demand plan. In the case where the demand control request is a control request related to a total energy consumption amount, the difference $\Delta E$ ($=Er-Ep$) between an estimated value Ep and an actual value Er is calculated as being obtainable value when the control details are performed, wherein Ep denotes the amount of energy consumed by each energy consuming appliance and Er denotes the amount of energy which is being consumed in a current state.

In the case where the demand control request is a control request related to a $CO_2$ discharge amount, the difference $\Delta E$ ($=Er-Ep$) between an estimated value Ep and an actual value Er is calculated as being obtainable value when the control details are performed, wherein Ep denotes a $CO_2$ discharge amount based on energy consumed by each energy consuming appliance and Er denotes a $CO_2$ discharge amount based on energy which is being consumed in a current state.

In the case where the demand control request is a control request related to cost, the difference $\Delta E$ (=Er−Ep) between an estimated value Ep and an actual value Er is calculated as being obtainable value when the control details are performed, wherein Ep denotes cost based on energy consumed by each energy consuming appliance and Er denotes cost based on energy which is being consumed in a current state.

Next, the number N of energy consuming appliances is compared with the maximum presentation number M (M is an integer larger than or equal to 1) indicating the number of presentation data items to be presented at maximum (Step S403). Here, the maximum presentation number M is the upper limit value for the number of presentation data items to be presented on the liquid crystal display of the output unit 108 at the same time. In other words, the maximum presentation number M is a value predetermined based on the display screen size and resolution of the liquid crystal display, as a value for sufficiently securing user visibility even when the presentation data items are displayed at the same time.

When N>M is satisfied, the number of energy consuming appliances identified in the picture data item is larger than the maximum presentation number M. For this reason, M energy consuming appliances among the identified appliances are selected in descending order of the differences $\Delta E$ between the values in the demand plan and the current values in Step S402, and are determined to be the energy consuming appliances for which presentation data items need to be presented for completion of the presentation need determining process (Step S404). Here, $\Delta E$ is also referred to as a presentation priority level. The process can be expressed as a process for selecting the M energy consuming appliances selected in descending order of presentation priority levels of the presentation data items and determining the presentation data items related to the energy consuming appliances as presentation data items which need to be presented.

When N≤M is satisfied, the number of energy consuming appliances identified in the picture data item is smaller than or equal to the maximum presentation number M. For this reason, presentation data items of N energy consuming appliances among the appliances identified in the picture data item are determined to be presentation data items which need to be presented, for completion of the presentation need determining process (Step S405).

Accordingly, through the aforementioned presentation need determining process, the following operations are performed.

For example, when a slight change in the orientation of the camera unit 102 increases the number N of energy consuming appliances identified in the picture data item 212, some of the N energy consuming appliances whose presentation data items once determined to be presentation targets may be excluded from the presentation targets. As another example, when a slight change in the orientation of the camera unit 102 decreases the number N of energy consuming appliances identified in the picture data item 212, energy consuming appliances which have not been included in the N energy consuming appliances whose presentation data items once determined to be presentation data items which need to be presented may be included in the presentation targets.

Furthermore, for example, when a zoom-out of the camera unit 102 increases the number N of energy consuming appliances identified in the picture data item 212, some of the N energy consuming appliances whose presentation data items once determined to be presentation data items which need to be presented may be excluded from the presentation targets. As another example, when zoom-in of the camera unit 102 decreases the number N of energy consuming appliances identified in the picture data item 212, energy consuming appliances which have not been included in the N energy consuming appliances whose presentation data items once determined to be presentation targets may be included in the presentation targets.

Furthermore, for example, when a zoom-out of the camera unit 102 increases the number N of energy consuming appliances identified in the picture data item 212, some of the N energy consuming appliances whose presentation data items once determined to be presentation targets may be excluded from the presentation targets. In this case, the presentation data items related to the energy consuming appliances are not presented to the user. As another example, when zoom-in of the camera unit 102 decreases the number N of energy consuming appliances identified in the picture data item, energy consuming appliances which have not included in the N energy consuming appliances whose presentation data items once determined to be presentation targets may be included in the presentation targets. In this case, the presentation data items related to the energy consuming appliances are presented to the user.

In the presentation need determining process, it is also good to determine the needs for presenting the presentation data items of only energy consuming appliances having a particular function such as an energy saving mode or energy consuming appliances made by a particular manufacturer.

In this case, the appliance identifying unit 104 performs a process of adding appliance identification information items to picture data items of the energy consuming appliances having a particular function such as an energy saving mode or the energy consuming appliances made by the particular manufacturer, with reference to specifications information items stored in the appliance information storing unit 103.

In addition, the presentation data generating unit 302 generates presentation data items 302a determined to be presented by the presentation need determining unit 301. The generated presentation data items 302a includes at least one of picture data items, audio data items, text data items, video data items, etc.

When a rate ((Er−Ep)/Ep) of the difference between Er and Ep with respect to the demand plan calculated in Step S402 is larger than or equal to a predetermined rate, the presentation data generating unit 302 performs operations below. Specifically, the presentation data generating unit 302 generates, as the presentation data items 302a, information items indicating current operation states, and a piece of advice for prompting control details indicated by the demand plan.

For example, when a rate ((Er−Ep)/Ep) of the difference between Er and Ep with respect to the demand plan is larger than or equal to 10%, the presentation data generating unit 302 generates, as the presentation data item 302a, an information item indicating a current operation state, and a piece of advice for prompting control details indicated by the demand plan.

In addition, when a rate $((Er-Ep)/Ep)$ of the difference between Er and Ep with respect to the demand plan calculated in Step S402 is smaller than the predetermined rate, the presentation data generating unit 302 generates, as the presentation data item 302a, an information item indicating a current operation state, and an information item indicating that the current operation state is almost ideal for achieving the demand control request.

For example, when the predetermined rate is 10% and a rate $((Er-Ep)/Ep)$ of the difference between Er and Ep with respect to the demand plan is smaller than 10%, the presentation data generating unit 302 generates, as the presentation data item 302a, an information item indicating a current operation state, and an information item indicating that the current operation state is almost ideal for achieving the demand control request.

The presentation data generating unit 302 stores, in advance, text message templates, image data items, audio data items, and animation data items which are component data items of the presentation data items 302a. The presentation data generating unit 302 generates the presentation data items 302a by embedding setting values for the demand plan included in the presentation information items 207, and combining with images of the component data.

The component data items include icons showing states of energy consuming appliances, image data items or animation data items of anthropomorphic characters, etc, and are used to present to the user the states of the energy consuming appliances and a piece of advice regarding the usage of the appliances in a comparatively easy-to-understand format.

The use of the comparatively easy-to-understand format makes it possible to draw the user's attention to the presentation details effectively, increasing the possibility that the user actually performs the operation based on the piece of advice of the presentation data item 302a.

The superimposing unit 303 superimposes the presentation data items 302a generated by the presentation data generating unit 302 on the picture data item 215 with appliance identification information items input from the appliance identifying unit 104.

At this time, the presentation data items 302a corresponding to an identified energy consuming appliance is superimposed around the identified energy consuming appliance in the picture data item 215 with the appliance identification information items.

At this time, the superimposing unit 303 generates the picture data item 217 with the superimposed presentation data items. When this data is used through the display application and the audio reproduction application on the output unit 108, the picture data item 215 with the superimposed presentation data items 302a is output. In other words, the data has a data format of Hyper Text Markup Language (HTML) or the like which can be interpreted by the display application.

Figure 5:
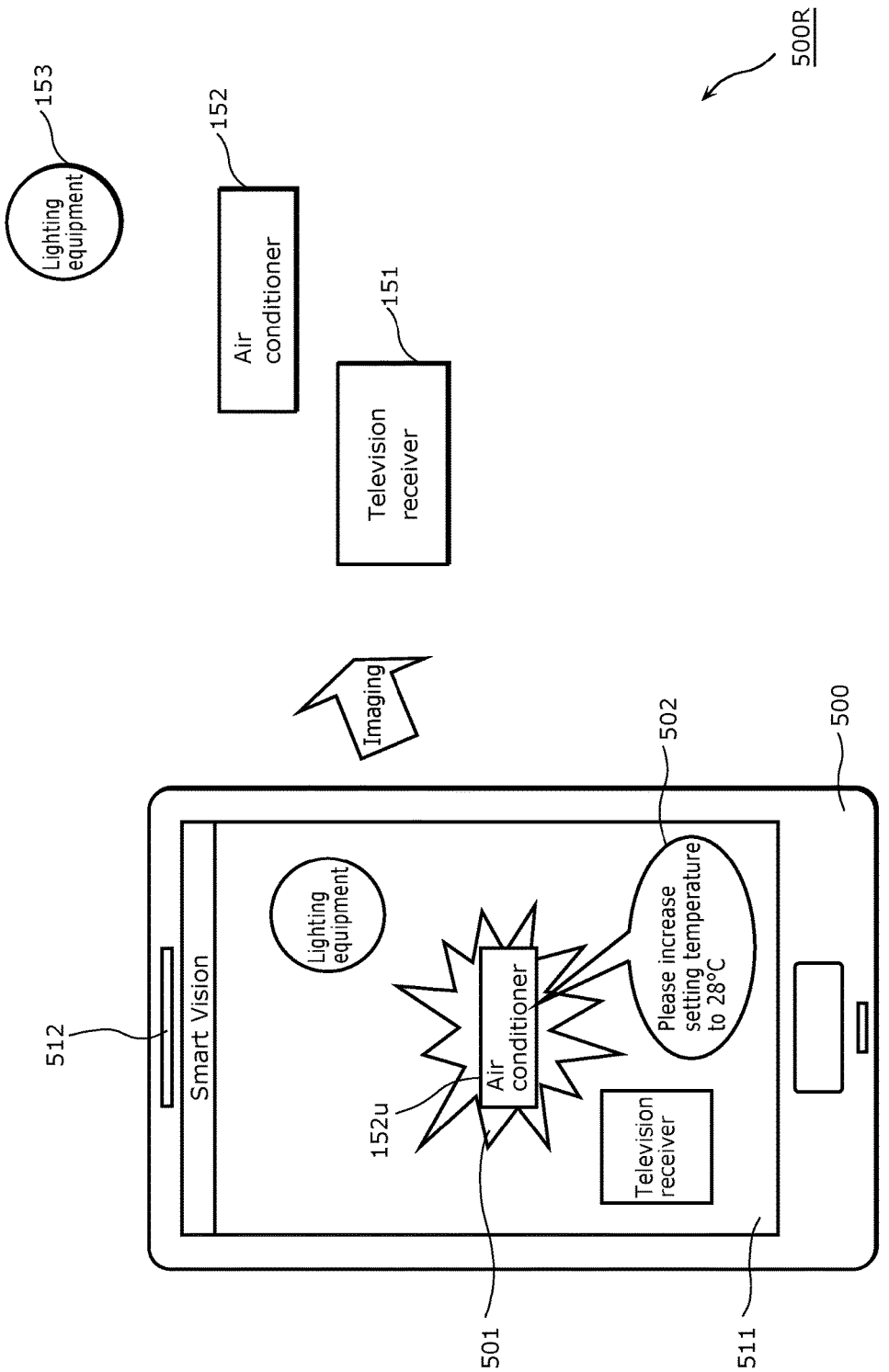
FIG. 5 is a diagram showing an example of a picture data item with superimposed presentation data items output on an output unit in Embodiment 1.

Next, FIG. 5 shows an example where the picture data item 217 with the superimposed presentation data items 302a is output to the output unit 108.

FIG. 5 is a diagram showing an example where a liquid crystal display 511 and a speaker 512 of the mobile terminal 500, and the display application (not shown) and the audio reproduction application (not shown) executed on the CPU of the mobile terminal 500 are configured as the output unit 108. In addition, FIG. 5 shows an example where the maximum presentation number M for the presentation data items is 1, and the presentation data item of the energy consuming appliance (air conditioner) 152 is determined to be the presentation data item which needs to be presented.

In this case, the picture data item 217 with the superimposed presentation data items is displayed on the liquid crystal display 511 by the display application. The picture data item 217 with the superimposed presentation data items is of a captured image of a home space 500R in which the following are included: an energy consuming appliance (television receiver) 151; an energy consuming appliance (air conditioner) 152; and an energy consuming appliance (lighting equipment) 153.

Furthermore, data items such as an image data item 501 which visually enhances the energy consuming appliance (air conditioner) 152 and a text data item 502 of "Please increase setting temperature to 28° C.!" are displayed as presentation data items for the energy consuming appliance (air conditioner) 152 on the liquid crystal display 511 by the display application.

In addition, when the user taps an image 152u representing the energy consuming appliance (air conditioner) on the touch panel integrated with the liquid crystal display 511, the audio reproduction application outputs a speech of "Please increase setting temperature to 28° C.!" from the speaker 512.

In this way, the presentation data based on the demand plan is output around the corresponding energy consuming appliance on the output unit 108. For this reason, the user can easily understand how to use each of the energy consuming appliances so as to satisfy the demand control request 203.

When the number of energy consuming appliances to be presented on the display screen is comparatively large, a limited number of presentation data items are to be superimposed onto corresponding picture data items so as to secure sufficient visibility. More specifically, presentation data items related to energy consuming appliances having larger differences between operation states based on the demand plan and current operation states are preferentially superimposed based on the demand plan because the presentation data items provide higher energy saving effects when displayed.

Thus, the user visually recognizes, on the output unit 108, the picture data items with the superimposed presentation data items which are comparatively effective for achieving the demand control request. In this way, it is expected that the control details of the presentation data items are executed in a comparatively secured manner.

Accordingly, it is possible to prompt the user to perform the comparatively effective methods for using the energy consuming appliances to achieve the demand control request.

Here, it is also good to include image data items and animation data items of a fairy which is virtually attached to one of the energy consuming appliances, in the component data items stored in the presentation data generating unit 302, and the presentation data generating unit 302 may generate presentation data items using these component data items.

In this case, the fairy of the energy consuming appliance gives the user an impression as if the fairy of the energy consuming appliance is presenting pieces of advice about a current state of the energy consuming appliance and a method of using the energy consuming appliance. In this way, it is possible to present the presentation data items in a userfriendly manner.

Furthermore, it is also good to activate the same operation as executed when the energy consuming appliance (air conditioner) 152 is tapped on the touch panel when the user calls a preset name of the fairy of the energy consuming appliance.

In this case, information related to the preset name of the fairy of the energy consuming appliance is stored in the appliance information storing unit 103 together with a specifications information item and an appliance identification information item. A speech recognition application of the input unit 105 recognizes the call of the preset name of the fairy of the energy consuming appliance, with reference to the information stored in the appliance information storing unit 103.

For example, in the case of an example shown in FIG. 5, in response to a call of the name of the fairy of the energy consuming appliance (air conditioner) 152, the audio reproduction application outputs the speech of "Please increase setting temperature to 28° C.!" from the speaker 512.

Presenting such a presentation data item in the comparatively easy-to-understand format makes it possible to draw the user's attention to the presentation details effectively, increasing the possibility that the user actually performs the operation based on the piece of advice of the presentation data item.

In the above description, the appliance observing unit 101 obtains the appliance operation state information items through wired or wireless communication with the energy consuming appliances. Alternatively, it is also good to set an electric power measurement appliance to a distribution switchboard, measure the amounts of energy consumed by the respective energy consuming appliances, and obtain the amounts of energy through wired or wireless communication with the electric power measurement appliance.

Furthermore, it is also good to obtain information items related to current states of the respective energy consuming appliance by analyzing transitions in the amounts of energy consumed by the respective energy consuming appliances.

In this case, it is possible to configure the energy management system in this embodiment even when the energy consuming appliances do not have any communication function for communicating with the appliance observing unit 101.

In the above description, the demand control request is input by the user through the input unit 105. However, the energy management system may be configured to receive a demand control request externally from an electric power company or a public institution through a secure network.

In this case, it is possible to externally prompt each of households to perform the demand control request, and for example, it is possible to perform demand control at a local area level.

In addition, the maximum presentation number M may be automatically set according to the size and resolution of the liquid crystal display screen of the output unit 108. In this case, even in the case of output on another output unit including a liquid crystal display having a screen size and a different resolution, the maximum presentation number M is automatically set to a value according to the liquid crystal display, and thus a user visibility is sufficiently secured even when the M presentation data items are displayed at the same time.

In addition, the maximum presentation number M may be set to a value input by the user through the input unit 105. Visibility in the case where a plurality of presentation data items are displayed at the same time varies from person to person. Thus, allowing setting of the value input by the user makes it possible to set the maximum presentation number M to a value which secures visibility for each user.

In addition, the maximum presentation number M may be automatically set to a number according to the liquid crystal display of the output unit 108 and display functions of the display application.

In this case, in the case of output on the output unit such as a mobile phone having a comparatively small display function, the maximum presentation number M is automatically set to the number according to the display function. Thus, even when presentation data items are displayed at the same time, display is performed without any extreme delay, and a user visibility is secured.

Here, it is also good to attach identification markers to the energy consuming appliances 151 to 15n, and stores, in the appliance information storing unit 103, the markers and the ID of the energy consuming appliances as appliance identification information items for the energy consuming appliances in a mutually associated manner.

In this case, it is possible to identify the appliances with high accuracy.

Here, it is also good to provide a plurality of camera units 102 at different positions in a home so that picture data items input to the appliance identifying unit 104 can be selected by switching from among a plurality of picture data items obtained by the camera units 102 at the different positions in the home.

In this case, when the presentation need determining unit 301 determines a presentation data item which needs to be presented in a superimposed manner from the output unit 108, the presentation data item is output accordingly by making a switch to a corresponding one of the picture data items 212 input, from the camera units 102 to the appliance identifying unit 104, for the energy consuming appliances which are at the different positions in the home and whose images are included at the different positions in the picture data item.

Here, the mobile terminal 500 may be, for example, a mobile phone, a smart phone, a television receiver, a wristwatch-type mobile terminal, or a glass-type mobile terminal. For example, when the mobile terminal 500 is the glass-type mobile terminal, a presentation data item is displayed in a superimposed manner on a liquid crystal display of a lens portion.

Here, the presentation data generating unit 302 may generate presentation formats for the presentation data items together with the presentation data items 302*a*. At this time, the presentation data generating unit 302 may set different presentation formats according to presentation priority levels of the presentation data items. More specifically, presentation formats may be generated which are designed to display an image data item, a text data item, or a video data item which is included in the presentation data items 302*a* and has a larger presentation priority level is displayed in a comparatively large size. In addition, presentation formats may be generated which are designed to output, in a comparatively large size, a speech presented by an audio data item which is included in the presentation data items 302*a* and has a larger presentation priority level. In other words, presentation formats may be generated which are designed to display, in a comparatively small size, an image data item, a text data item, or a video data item which is included in the presentation data items 302*a* and has a smaller presentation priority level. In addition, presentation formats may be generated which are designed to output a speech presented by an audio data item which is included in the presentation data items 302*a* and has a smaller presentation priority level is output in a comparatively small size. In this way, the management unit 100 may include the presentation priority level determining unit which executes the function for setting the presentation formats different for the presentation priority levels of the presentation data items.

As described above, after the presentation data generating unit 302 changes the display size of an image data item, a text data item, or a video data item which is the presentation data item 302a, the superimposing unit 303 superimposes the presentation data item 302a on the picture data item 217, and the output unit 108 (the liquid crystal display 511) displays the picture data item 217 with the superimposed presentation data item 302a. The presentation data generating unit 302 may further change the presentation format of the presentation data item 302a when the user specifies the presentation data item 302a later. More specifically, the presentation data generating unit 302 may reduce a display size of the presentation data item 302a which is being displayed in a comparatively large size. More specifically, the presentation data generating unit 302 may increase a display size of the presentation data item 302a which is being displayed in a comparatively small size. In this way, it is possible to sequentially browse the presentation data items displayed at the same time while changing the sizes thereof. For example, the user can specify one of the presentation data items 302a by touching around the presentation data item 302a displayed on the liquid crystal display 511 (touch panel), or performing a pitching operation for widening or narrowing the area including the presentation data item 302a on the liquid crystal display 511 (touch panel).

Here, the demand control request 203 may be a demand request related to an indoor environment parameter indicating a temperature or humidity indoor or an illuminance indicating an amount of light therein. For example, the demand requests may be related to indoor environment parameters indicating "Please set temperature from 24 to 28 degrees Celsius, humidity from 40 to 60 percent, and illuminance from 500 to 1000 lux". The demand requests may be a demand request related only to one environmental parameter indicating a temperature, a humidity, or an illulminance, or may be requests related to any combination of a temperature, a humidity, or an illulminance. When the input unit 105 receives a demand request related to an indoor environment parameter, the demand plan generating unit 106 generates a demand plan satisfying the demand control request 203 using an energy consuming appliance having a function for changing the indoor environment parameter (the energy consuming appliance is, for example, an air conditioner, a humidifier, a dehumidifier, a lighting equipment, an electric curtain, or the like). In addition, the appliance observing unit 101 obtains an information item related to an indoor environment parameter from an energy consuming appliance having a function for measuring the indoor environment parameter through communication with the energy consuming appliance (the energy consuming appliance is, for example, the air conditioner, the humidifier, the dehumidifier, the lighting equipment, the electric curtain, or the like), and stores the obtained information item in a memory area. Next, through the processes as described above, the presentation data item related to the energy consuming appliance having the function for measuring the indoor environment parameter is output in a superimposed manner. In this way, the presentation data item based on the demand control request 203 related to the indoor environment parameter is output on the output unit 108 in the form of being superimposed around the energy consuming appliance. The user can easily understand how to use each of the energy consuming appliances so as to satisfy the demand control request 203 related to the indoor environment parameter.

Here, the demand control request 203 may be a demand request regarding an air quality in a room in the home. A room air quality is an indicator of a gas composition, chemical materials, the amount of particles or dusts, a temperature, a humidity, or so on in the air. The demand request regarding the room air quality is, for example, "The concentration of a material A in the air should be xx ppm." When the input unit 105 receives the demand request regarding the room air quality, the demand plan generating unit 106 generates a demand plan for satisfying the demand control request 203 using the energy consuming appliance having the function for changing the room air quality (the energy consuming appliance is, for example, an air cleaner, an air conditioner, an air fan, or the like). In addition, the appliance observing unit 101 obtains an information item regarding the room air quality through communication with the energy consuming appliance having the function for changing the room air quality (the energy consuming appliance is, for example, the air cleaner, the air conditioner, an air quality sensor, or the like). Next, through the processes as described above, the presentation data item related to the energy consuming appliance having the function for changing the room air quality is superimposed, and the picture data item is output. In this way, the presentation data item based on the demand control request 203 related to the room air quality is output on the output unit 108 in the form of being superimposed around the energy consuming appliance. The user can easily understand how to use each of the energy consuming appliances so as to satisfy the demand control request 203 related to the room air quality.

[Embodiment 2]

An energy management system in this embodiment is characterized by superimposing several kinds of presentation data items having different display levels according to the presentation priority levels of the presentation data items. In this embodiment, a presentation data item related to an energy consuming appliance having a larger difference between a value based on a demand plan and a current value has a higher presentation priority level to a user.

In this embodiment, the display levels for presentation data items are two levels of "detailed display" for presenting detailed information and "brief display" for presenting brief information. The "detailed display" is preferentially assigned to the presentation data item having the higher presentation priority level to the user.

The basic structure of this embodiment is the same as that of Embodiment 1. Thus, the structural elements used in common to those of Embodiment 1 are assigned with the same numerical references and detailed descriptions thereof are omitted where appropriate.

Figure 6:
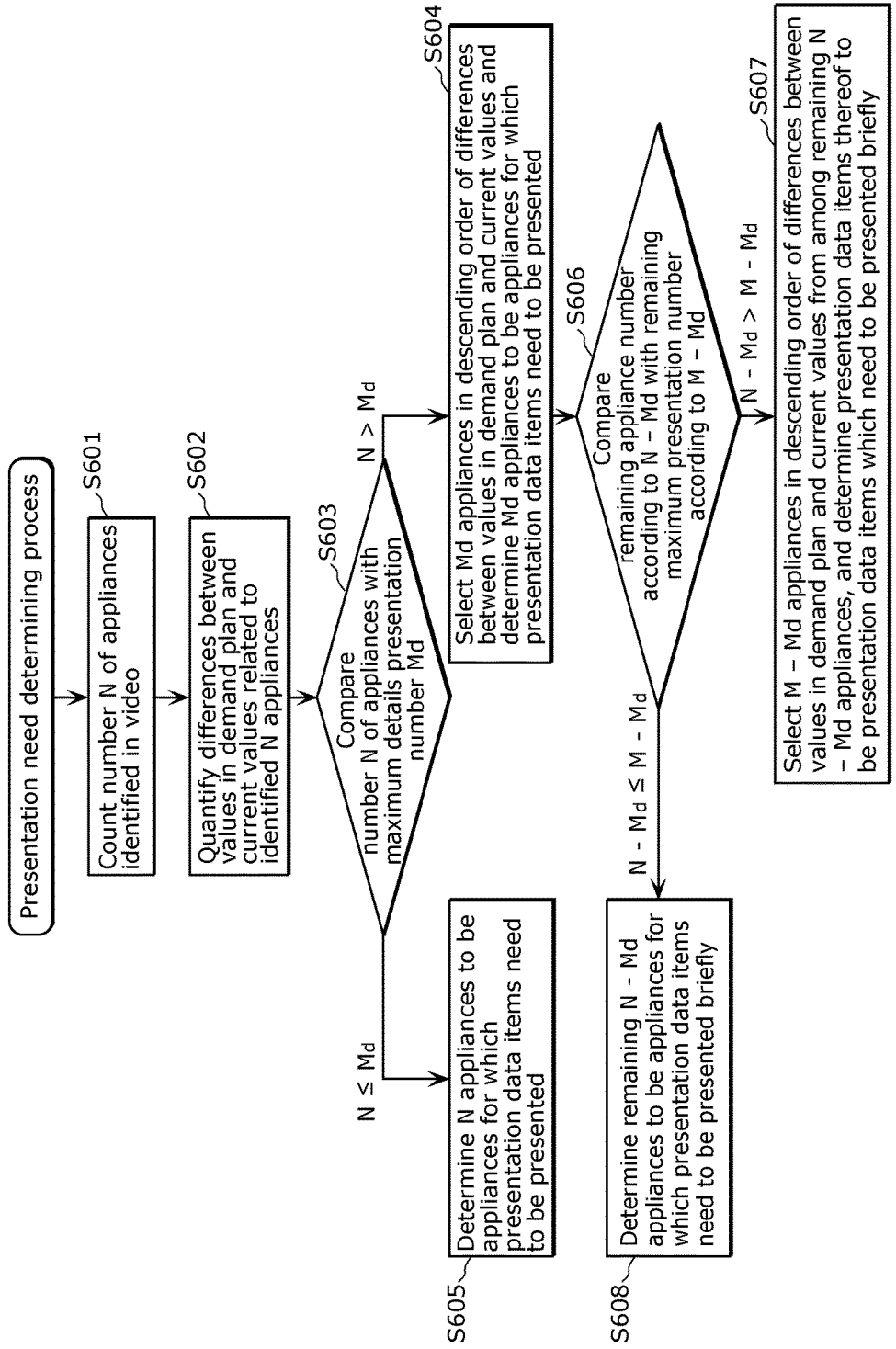
FIG. 6 is a flowchart for explaining a presentation need determining process in Embodiment 2.

FIG. 6 is a flowchart of the presentation need determining process performed by a presentation need determining unit 301 in this embodiment.

First, the presentation need determining unit 301 counts the number N (N is an integer larger than or equal to 0) of energy consuming appliances identified in the picture data item (Step S601).

Next, the presentation need determining unit 301 quantifies the differences between values in the demand plan and current values related to the identified N energy consuming appliances (Step S602).

Next, the number N of energy consuming appliances is compared with a maximum details presentation number Md (Md is an integer larger than or equal to 1) indicating the number of presentation data items to be presented at maximum (Step S603). Here, the maximum details presentation number Md is an upper limit for the number of presentation data items to be displayed at the "detailed display" level on the liquid crystal display of the output unit 108 at the same time. In other words, the maximum details presentation number Md is a value preset as a value for sufficiently securing user visibility even when plural presentation data items are displayed at the "detailed display" level at the same time, based on the size, resolution, and so on of the liquid crystal display.

When N>Md is satisfied, the number of energy consuming appliances identified in the picture data items is larger than the maximum details presentation number Md. In this case, Md energy consuming appliances are selected in descending order of the differences ΔE between the values in the demand plan and the current values calculated in Step S602, and the presentation data items related to the energy consuming appliances are determined to be presentation data items which need to be presented at the "detailed display" level (Step S604), and a shift is made to Step S606

When N≤Md is satisfied, the number of energy consuming appliances identified in the picture data items is smaller than or equal to the maximum details presentation number Md. For this reason, presentation data items of N energy consuming appliances identified in the picture data items are determined to be presentation data items which need to be presented, for completion of the presentation need determining process (Step S605).

In Step S606, a comparison is made as to (i) a remaining maximum presentation number according to M−Md (M is an integer larger than or equal to Md and indicates a maximum presentation number) and (ii) a remaining appliance number according to N−Md. Here, the remaining maximum presentation number according to M−Md is a number obtained by subtracting the number of presentation data items to be displayed at the "detailed display" level from the number of presentation data items which can be displayed at the "brief display" level.

In addition, the remaining appliance number according to N−Md is the number which is (i) obtained by subtracting the number of energy consuming appliances N identified in the picture data item from the number of presentation data items to be displayed at the "detailed display" level, and (ii) indicates the number of energy consuming appliances which are candidates for display at the "brief display" level.

Here, N−Md>M−Md shows that the remaining appliance number according to N−Md is larger than the remaining maximum presentation number according to M−Md. In this case, M−Md energy consuming appliances are selected from among N−Md energy consuming appliances in descending order of the differences ΔE between the values in the demand plan and the current values calculated in Step S602, and the presentation data items related to the energy consuming appliances are determined to be presentation data items which need to be presented briefly, for completion of the presentation need determining process (Step S607).

In addition, when N−Md≤M−Md is satisfied, since the remaining number of N−Md energy consuming appliances is smaller than or equal to the remaining maximum presentation number according to M−Md, the presentation data items related to the remaining N−Md energy consuming appliances are determined to be presentation data items which need to be displayed briefly, for completion of the presentation need determining process (Step S608).

In the presentation need determining process in this embodiment, it is also good to determine the needs for presenting the presentation data items of only energy consuming appliances having a particular function such as an energy saving mode or energy consuming appliances made by a particular manufacturer.

In this case, the appliance identifying unit 104 performs a process of adding appliance identification information items to picture data items of the energy consuming appliances having a particular function or the energy consuming appliances made by the particular manufacturer, with reference to specifications information stored in the appliance information storing unit 103.

In addition, the presentation data generating unit 302 in this embodiment generates presentation data items to be displayed at the "detailed display" level for the presentation data items determined by the presentation need determining unit 301 as being presentation data items which need to be displayed in detail, and generates presentation data items to be displayed at the "brief display" level for the presentation data items determined by the presentation need determining unit 301 as being presentation data items which need to be displayed briefly.

More specifically, the presentation data items to be displayed at the "detailed display" level include, for example, a text data item which requires a comparatively large display area on the liquid crystal display. In contrast, any of presentation data items to be displayed at the "brief display" level does not require a comparatively large display area on the liquid crystal display as required by the text data item.

Figure 7:
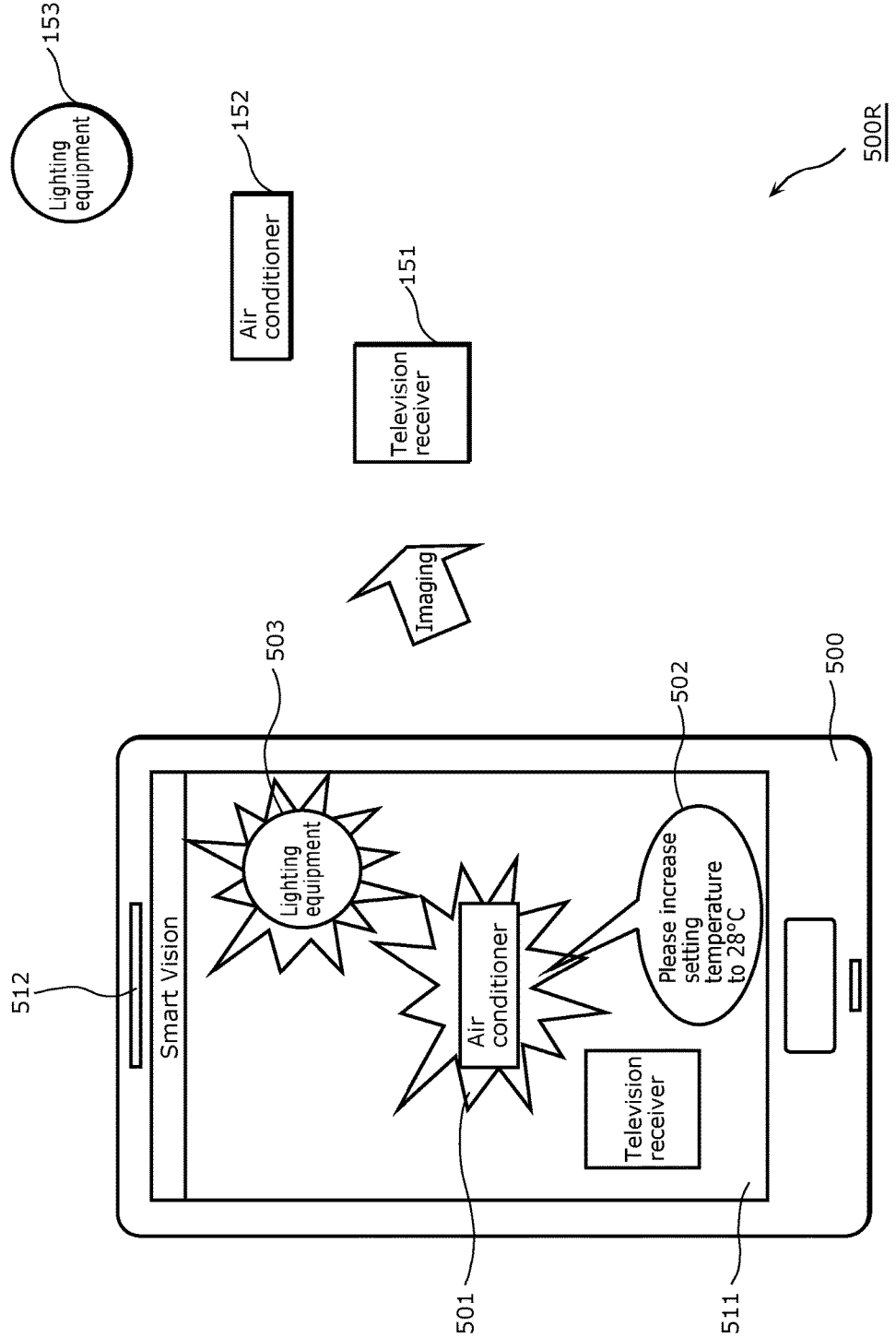
FIG. 7 is a diagram showing an example of a picture data item with superimposed presentation data items output on an output unit in Embodiment 2.

FIG. 7 shows an example where a picture data item 217 with superimposed presentation data items is output on the output unit 108 in this embodiment.

FIG. 7 shows an exemplary case where a liquid crystal display 511 and a speaker 512 of the mobile terminal 500, and a display application (not shown) and an audio reproduction application (not shown) executed by a CPU of the mobile terminal 500 are configured as the output unit 108.

In the case of FIG. 7, a maximum presentation number M indicating the number of presentation data items to be presented at maximum is 2, and a maximum details presentation number Md is 1. In this case, the presentation data item for an energy consuming appliance (air conditioner) 152 is determined to be a presentation data item which needs to be displayed in detail, and a presentation data item for an energy consuming appliance (lighting equipment) 153 is determined to be a presentation data item which needs to be displayed briefly.

Here, the energy consuming appliance (air conditioner) 152 has a presentation data item determined to be a presentation data item which needs to be presented in detail as having a comparatively large difference between a value in a demand plan and a current value. Thus, on the liquid crystal display 511, the display application superimposes and displays, as the presentation data items, an image data item 501 which visually enhances an image of the energy consuming appliance (air conditioner) 152 and a text data item 502 of "Please increase setting temperature to 28° C.".

The energy consuming appliance (lighting equipment) 153 has a presentation data item determined to be a presentation data item which needs to be presented briefly. Thus, the display application displays the presentation data item such that only an image data item 503 which visually enhances an image of the energy consuming appliance (lighting equipment) 153 is superimposed and displayed.

In this way, the presentation data item of the energy consuming appliance having the comparatively large difference between the value in the demand plan and the current value is superimposed as having a high display level. In this way, it is possible to increase visibility of the presentation data item which (i) is related to the energy consuming appliance having the comparatively large difference between the value in the demand plan and the current value, and (ii) indicates control for producing a comparatively large effect when performed.

For this reason, it is expected that the user visually recognizes, on the output unit 108, the picture data item with the superimposed presentation data item to be output by the output unit 108, and executes, on the presentation data item, comparatively effective control for achieving the demand control request in a more reliable manner.

Accordingly, it is possible to prompt the user to perform the comparatively effective method for using the energy consuming appliance to achieve the demand control request.

The display levels for the presentation data items are two in the above description, but three or more display levels may be used.

[Embodiment 3]

An energy management system in this embodiment is characterized by including a function for automatically controlling an energy consuming appliance based on a demand plan, and superimposing presentation data items such that an energy consuming appliance to be automatically controlled and an energy consuming appliance not to be automatically controlled are distinguished from each other.

The basic structure of this embodiment is largely in common to that of Embodiment 1. Thus, the structural elements used in common to those of Embodiment 1 are assigned with the same numerical references, and indication of diagrams and detailed descriptions thereof are omitted where appropriate.

Figure 8:
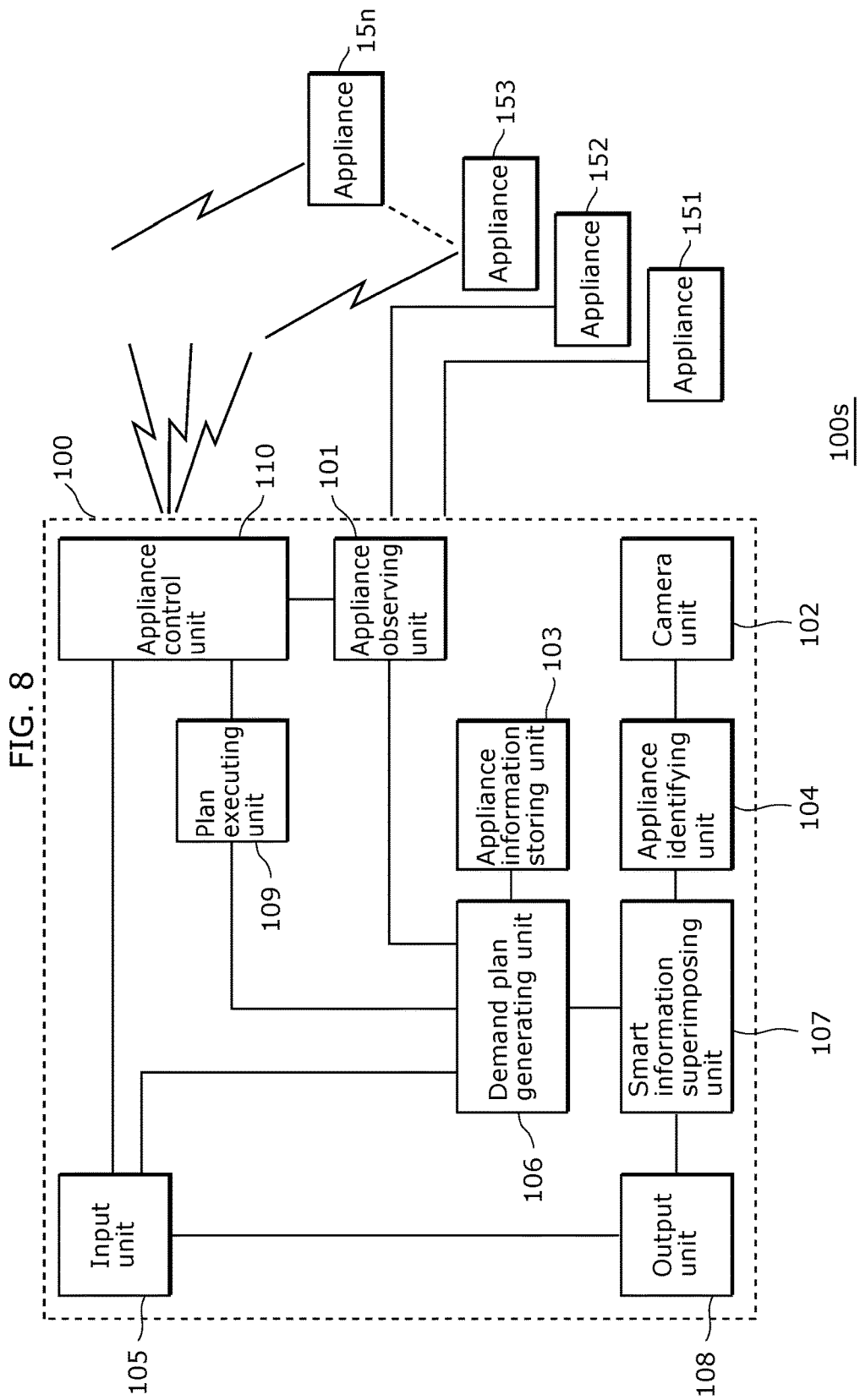
FIG. 8 is a diagram showing a configuration of an energy management system in Embodiment 3.

FIG. 8 is a diagram showing a configuration of the energy management system in this embodiment.

The energy management system in this embodiment includes an appliance control unit 110 and a plan executing unit 109, in addition to the system configuration in Embodiment 1.

The appliance control unit 110 controls the energy consuming appliance through wired or wireless communication with the energy consuming appliance. The plan executing unit 109 controls the execution of the demand plan by the energy consuming appliance to be automatically controlled through the appliance control unit 110.

The appliance control unit 110 does not always automatically control all of n energy consuming appliances 151 to 15n through communication with the appliances. It is assumed that a user has in his or her home (i) an energy consuming appliance which can be operated only manually by the user and (ii) an energy consuming appliance which can be controlled by the appliance control unit 110 but is set so as not to be automatically controlled.

In this embodiment, information items indicating whether the respective energy consuming appliances can be controlled, or are subject to automatic control are stored in the appliance information storing unit 103 as specifications information items.

In addition, the input unit 105 in this embodiment receives an instruction for controlling one of the energy consuming appliances input by the user in addition to the demand control request.

The instruction for controlling the energy consuming appliance input through the input unit 105 is received by the appliance control unit 110. The appliance control unit 110 controls the energy consuming appliance based on the received control instruction.

The aforementioned plan executing unit 109 and the appliance control unit 110 are configured actually in the forms of one or more CPUs and a plurality of memory appliances, in addition to the configuration including the appliance observing unit 101, the appliance information storing unit 103, the appliance identifying unit 104, the input unit 105, the demand plan generating unit 106, and the smart information superimposing unit 107, and the output unit 108

By means of the CPU(s) executing the program stored in the memory appliance and storing the information in the format which allows reading-out onto the memory area on the memory appliance, the functions of the plan executing unit 109 and the appliance control unit 110 are realized together with the functions of the appliance observing unit 101, the appliance information storing unit 103, the appliance identifying unit 104, the demand plan generating unit 106, and the smart information superimposing unit 107.

Figure 9:
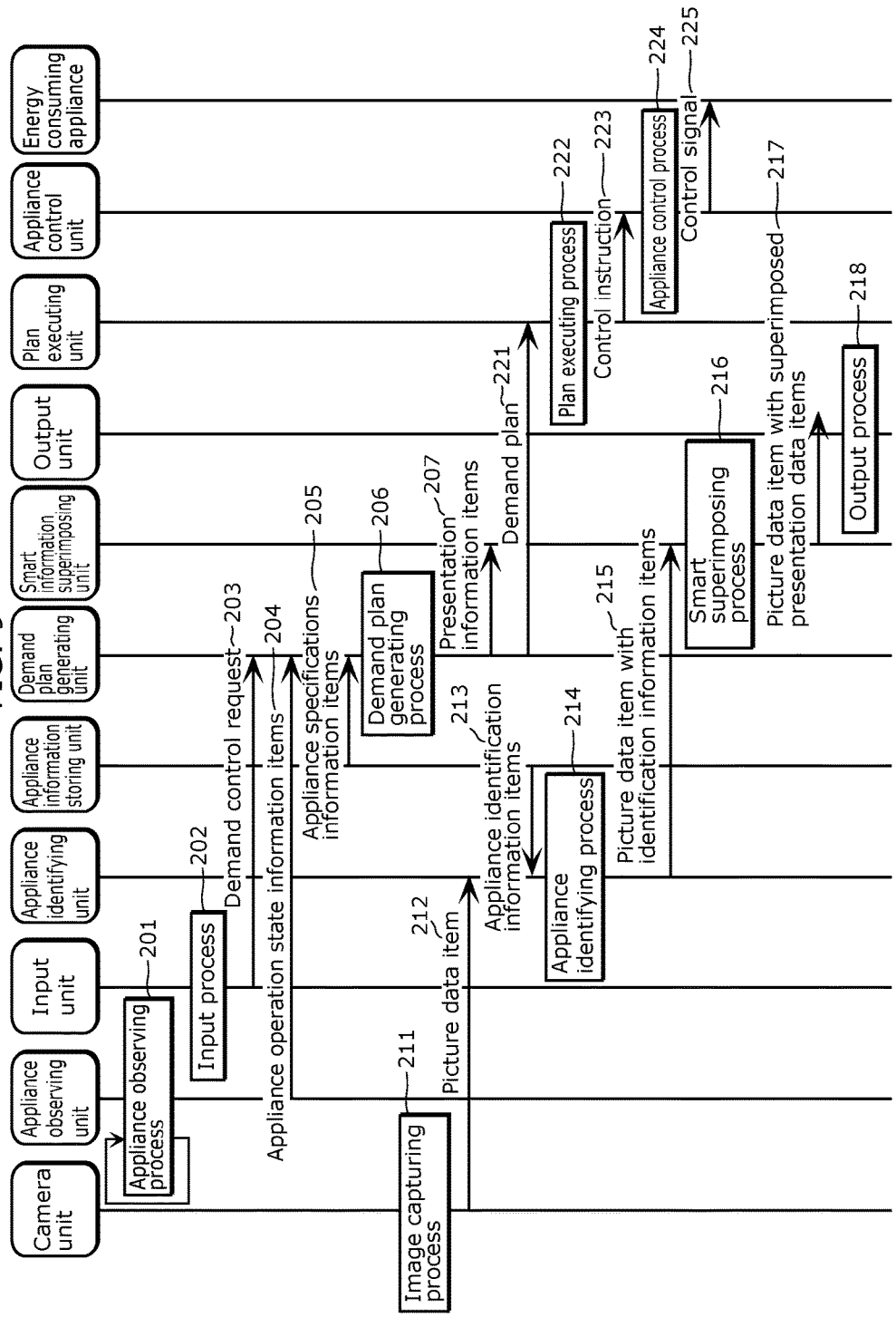
FIG. 9 is a sequence diagram for explaining operations in the energy management system in Embodiment 3.

FIG. 9 is a diagram showing a sequence of operations performed by the energy management system in this embodiment.

A sequence from an appliance observing process 201 by the appliance observing unit 101 to a process in which the output unit 108 outputs picture data item 217 with superimposed presentation data items using a liquid crystal display and/or a speaker is similar to the one in Embodiment 1.

In this embodiment, the demand plan generating unit 106 transmits the generated demand plan 221 to the plan executing unit 109, in addition to transmitting the presentation information items 207 to the smart information superimposing unit 107.

At this time, the demand plan generating unit 106 transmits the demand plan 221 related to an energy consuming appliance which has been set so as to be automatically controlled based on the demand plan.

Upon receiving the demand plan 221, the plan executing unit 109 transmits the control instruction 223 to the appliance control unit 110 so that the energy consuming appliance operates based on the details of the demand plan 221 (a plan executing process 222).

The appliance control unit 110 transmits the control signal 225 corresponding to the received control instruction 223 to each of the energy consuming appliances, and controls the energy consuming appliance (an appliance control process 224).

In this way, in the case of the energy consuming appliance which is automatically controlled based on the demand plan, the difference between the state in the demand plan and an actual operation state is comparatively small.

In other words, in the case of the energy consuming appliance subject to automatic control is to be automatically controlled based on the demand plan. For this reason, compared to the energy consuming appliance which is not subject to the automatic control, the energy consuming appliance subject to the automatic control does not comparatively need to be notified to the user in terms of the effective use.

For this reason, the smart information superimposing unit 107 in this embodiment preferentially superimposes a presentation data item for the energy consuming appliance which is not subject to the automatic control over a presentation data item for energy consuming appliance which is subject to the automatic control.

The smart information superimposing unit 107 in this embodiment has an internal structure similar to the one in Embodiment 1. However, the presentation need determining process by the presentation need determining unit 301 and the presentation data generating process by the presentation data generating unit 302 are characteristic with respect to those in the earlier-described embodiments.

Figure 10:
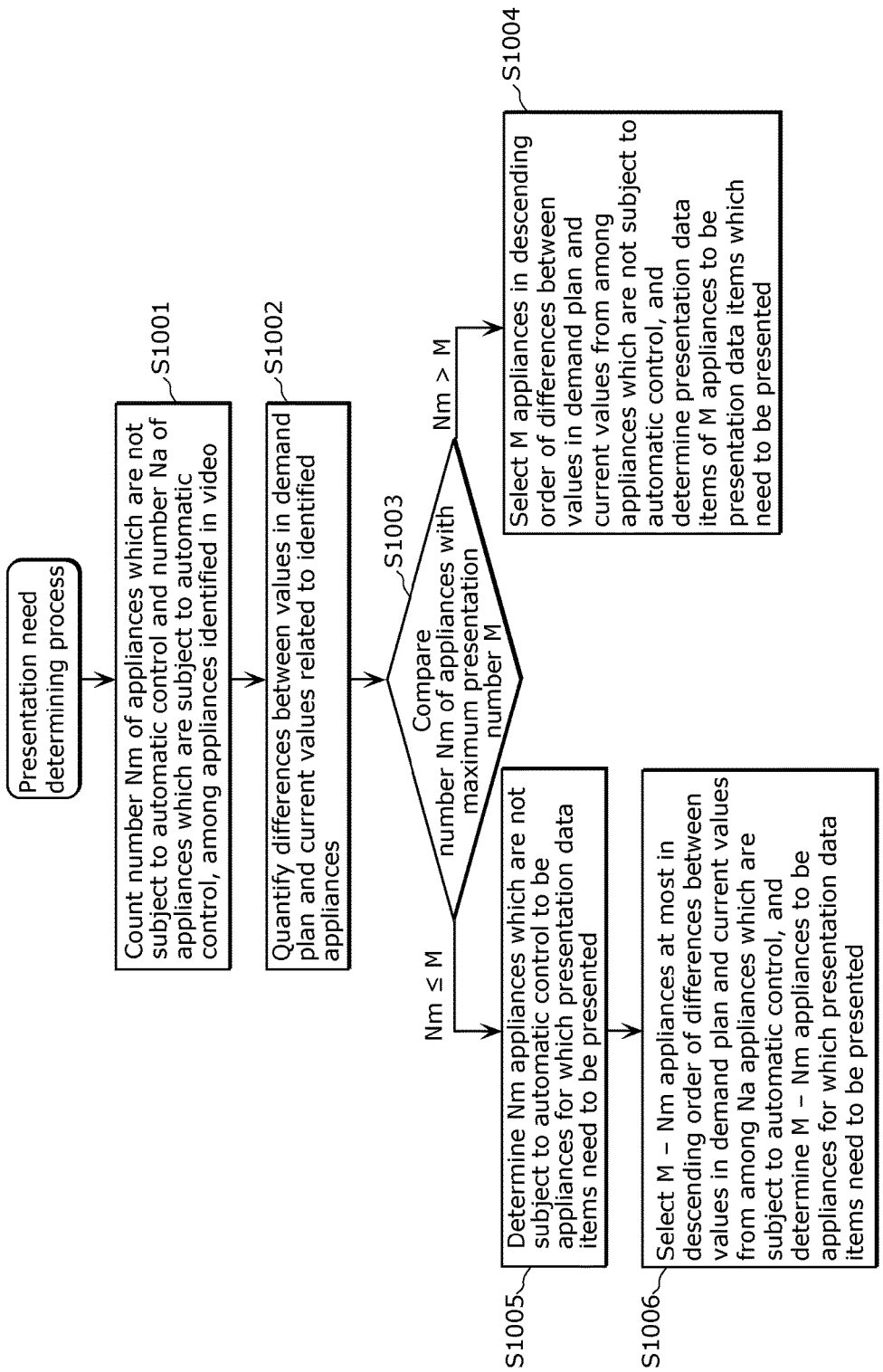
FIG. 10 is a flowchart for explaining a presentation need determining process in Embodiment 3.

FIG. 10 is a flowchart of a presentation need determining process by the presentation need determining unit 301 in this embodiment.

First, the presentation need determining unit 301 separately counts (i) the number Nm (Nm is an integer larger than or equal to 0) of energy consuming appliances which are not subject to the automatic control and (ii) the number Na (Na is an integer larger than or equal to 0) of energy consuming appliances which are subject to the automatic control, among the energy consuming appliances identified in the picture data item (Step S1001).

Next, the presentation need determining unit 301 quantifies the differences between values in the demand plan and current values related to the respectively identified energy consuming appliances (Step S1002).

Next, the number Nm of energy consuming appliances is compared with the maximum presentation number M (M is an integer larger than or equal to 1) indicating the number of presentation data items to be presented at maximum (Step S1003).

When Nm>M is satisfied, the number Nm of energy consuming appliances identified in the picture data item as being not subject to the automatic control is larger than the maximum presentation number M. In this case, M energy consuming appliances are selected from among the energy consuming appliances identified in the picture data item as being not subject to the automatic control. In other words, the M energy consuming appliances are selected in descending order of the differences ΔE between the values in the demand plan and the current values calculated in Step S1002. For this reason, presentation data items of M energy consuming appliances are determined to be presentation data items which need to be presented, for completion of the presentation need determining process (Step S1004).

In addition, when Nm≤M is satisfied, the number Nm of energy consuming appliances identified in the picture data item as being not subject to the automatic control is smaller than or equal to the maximum presentation number M. Thus, presentation data items for the Nm energy consuming appliances identified in the picture data item are determined to be presentation data items which need to be presented (Step S1005).

Next, the presentation need determining unit 301 selects M−Nm energy consuming appliances at maximum in descending order of the differences ΔE between the values in the demand plan and the current values calculated in Step S1002 from among Na energy consuming appliances which are subject to the automatic control, and determines the selected M−Nm energy consuming appliances to be appliances for which presentation data items need to be presented, for completion of the presentation need determining process (Step S1006).

As in Embodiment 1, the presentation data generating unit 302 in this embodiment generates presentation data items including image data items, audio data items, text data items, video data items, etc. It is to be noted that the presentation data items are generated to have different formats distinguishable between the energy consuming appliances which are subject to the automatic control and the energy consuming appliances which are not subject to the automatic control. More specifically, presentation data items including icon images showing that the automatic control is being executed are generated for the energy consuming appliances subject to the automatic control.

Figure 11:
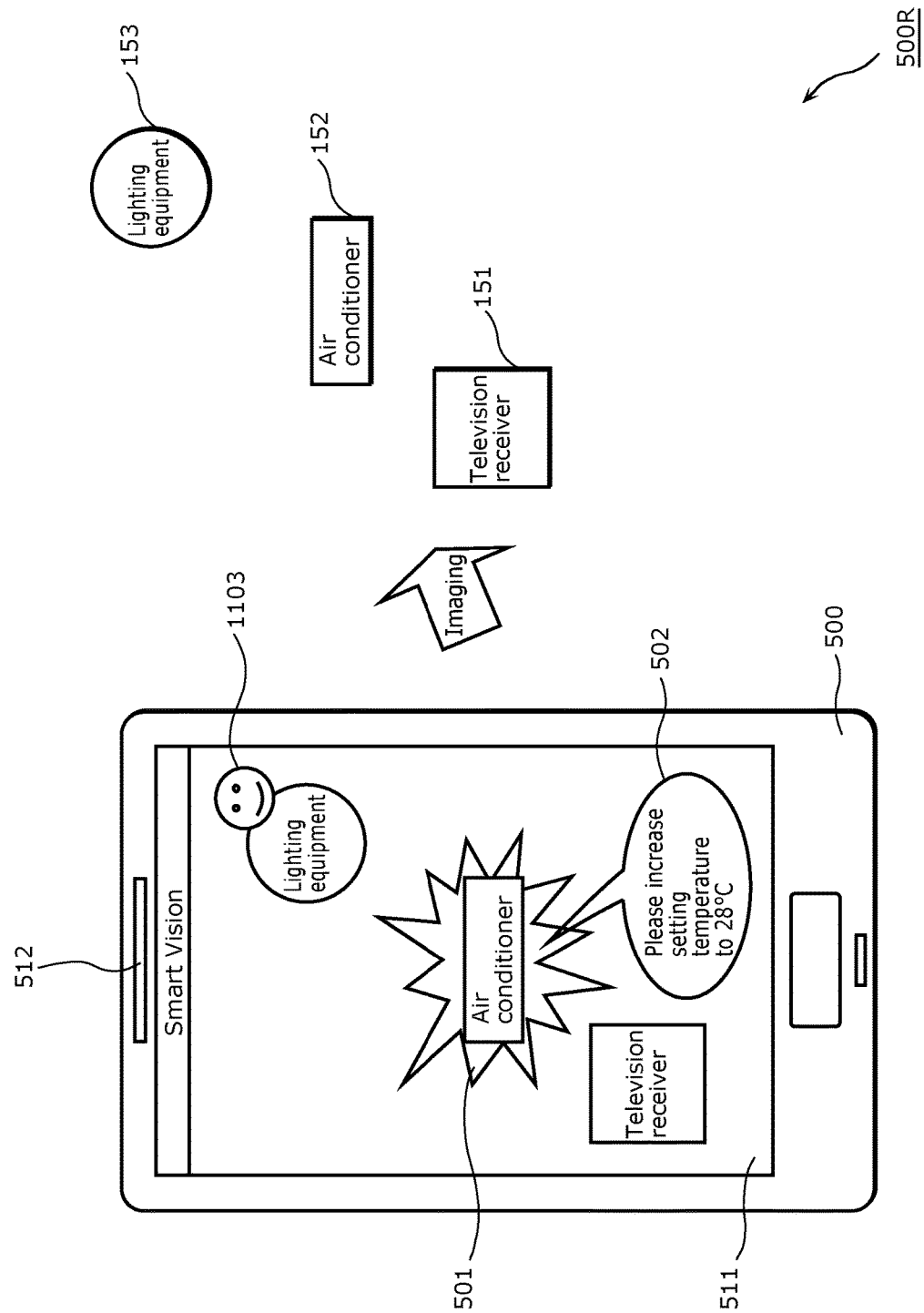
FIG. 11 is a diagram showing an example of a picture data item with superimposed presentation data items output on an output unit in Embodiment 3.

FIG. 11 is a diagram showing an exemplary output by the output unit 108 in this embodiment.

FIG. 11 shows an exemplary case where a liquid crystal display 511 and a speaker 512 of the mobile terminal 500, and a display application (not shown) and an audio reproduction application (not shown) executed on a CPU of the mobile terminal 500 are configured as the output unit 108.

FIG. 11 shows an example where the maximum presentation number M indicating the number of presentation data items to be presented at maximum is 2, the energy consuming appliance (television receiver) 151 and, the energy consuming appliance (lighting equipment) 153 are subject to the automatic control, and the energy consuming appliance (air conditioner) 152 is not subject to the automatic control. This example shows the case where presentation data items for the energy consuming appliance (air conditioner) 152 and the energy consuming appliance (lighting equipment) 153 are determined to be presentation data items which need to be presented.

In this case, on the liquid crystal display 511, the display application superimposes and displays an icon image 1103 showing that the automatic control is currently being executed, as the presentation data item for the energy consuming appliance (lighting equipment) 153. Furthermore, data items such as an image data item 501 which visually enhances the energy consuming appliance (air conditioner) 152 and a text data item 502 of "Please increase setting temperature to 28° C.!" are superimposed and displayed as presentation data items for the energy consuming appliance (air conditioner) 152.

In addition, when the user taps the energy consuming appliance (lighting equipment) 153 on the touch panel integrated with the liquid crystal display 511, the audio reproduction application outputs a speech of "Under automatic control!" from the speaker 512.

In addition, when the user taps the energy consuming appliance (air conditioner) 152, the audio reproduction application outputs a speech of "Please increase setting temperature to 28° C.!" from the speaker 512.

In this embodiment, the presentation data item for the energy consuming appliance which is not subject to the automatic control is superimposed preferentially over the presentation data items for the energy consuming appliances which are subject to the automatic control. In this case, the presentation data item for the energy consuming appliance which is not subject to the automatic control is visually recognized by the user. Thus, effective control based on the presentation data item is performed to achieve the demand control request. In this way, it is expected that the operation for control related to the presentation data item is executed by the user in a more reliable manner.

In this embodiment, presentation data items are generated to have different formats distinguishable between the energy consuming appliances subject to the automatic control and the energy consuming appliance not subject to the automatic control, for example, as shown by the icon image 1103 indicating that the automatic control is currently being executed.

In this case, the user can not only distinguish the energy consuming appliances which are subject to the automatic control and the energy consuming appliance which is not subject to the automatic control, but also can be relieved that the energy consuming appliances subject to the automatic control are being automatically controlled based on the demand plan.

Here, the superimposing unit 303 in this embodiment may superimpose an activation button for activating a remote control application on the picture data item 215 with identification information items, together with the presentation data items.

In this case, the remote control application is an application for controlling energy consuming appliances remotely. When the activation button superimposed on the picture data item is pressed by the user, a remote control operation for a corresponding energy consuming appliance is activated.

The remote control operation may be input through a menu display screen on the touch panel integrated with the liquid crystal display 511, but preferably be input in the form of a speech through the audio microphone of the input unit 105.

The control instructions recognized by the speech recognition application of the input unit 105 are transmitted to the appliance control unit 110. Upon receiving the control instructions, the appliance control unit 110 controls the energy consuming appliances based on the control instructions.

In this case, the user can control the energy consuming appliance remotely while watching the display screen with the superimposed presentation data items based on the demand plan. In other words, the user can perform, on energy consuming appliances, remote control operations which include adjusting a set temperature or switching operation modes for the air conditioner, adjusting the intensity of the light, switching ON or OFF of any of the energy consuming appliances, etc., resulting in increase in the userfriendliness.

[Embodiment 4]

Compared to Embodiment 3, an energy management system in this embodiment is further characterized by superimposing several kinds of presentation data items having different display levels according to the presentation priority levels of the presentation data items. In this embodiment, a presentation data item related to an energy consuming appliance having a larger difference between a value based on a demand plan and a current value has a higher presentation priority level to a user.

In this embodiment, the display levels for presentation data items are two levels of "detailed display" for presenting detailed information and "brief display" for presenting brief information. The former "detailed display" is preferentially assigned to a presentation data item having a higher presentation priority level to the user.

However, this embodiment is the same in the basic structure as Embodiment 3, and thus the structural elements used in common to those of Embodiment 3 are assigned with the same numerical references, and indication of diagrams and detailed descriptions thereof are omitted where appropriate.

Figure 12A:
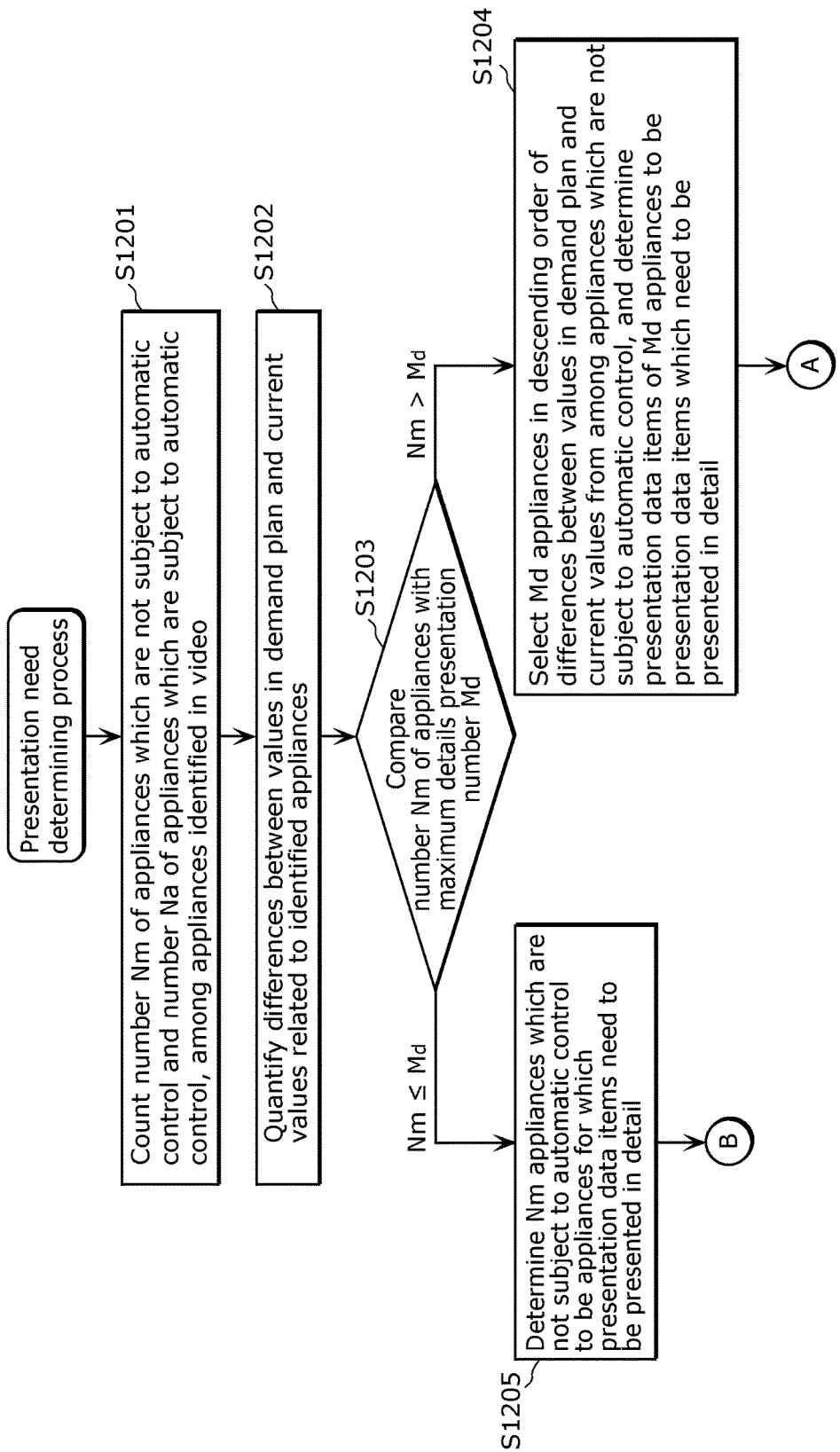
FIG. 12A is a flowchart for explaining a presentation need determining process in Embodiment 4.
Figure 12B:
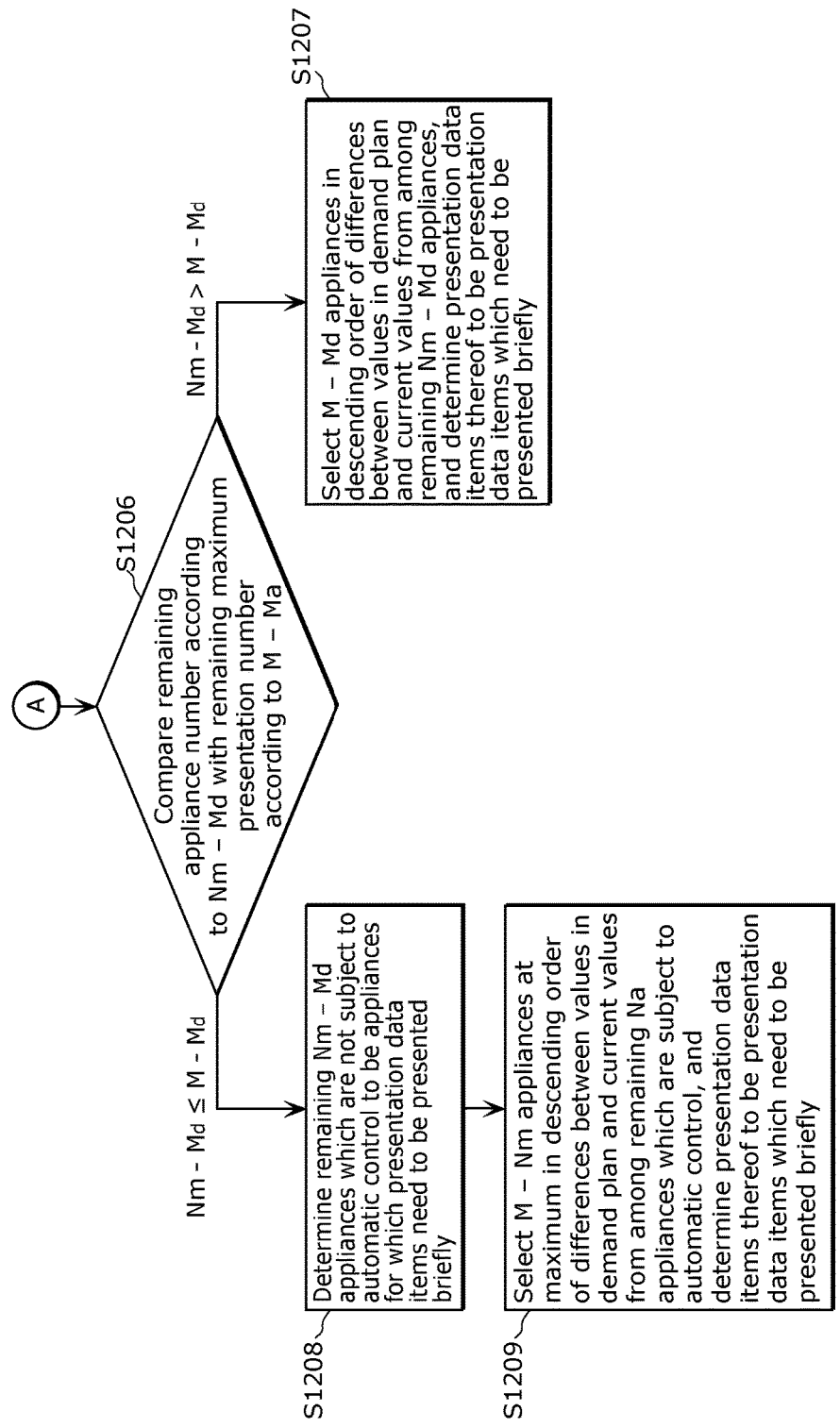
FIG. 12B is a second flowchart for explaining a presentation need determining process in Embodiment 4.
Figure 12C:
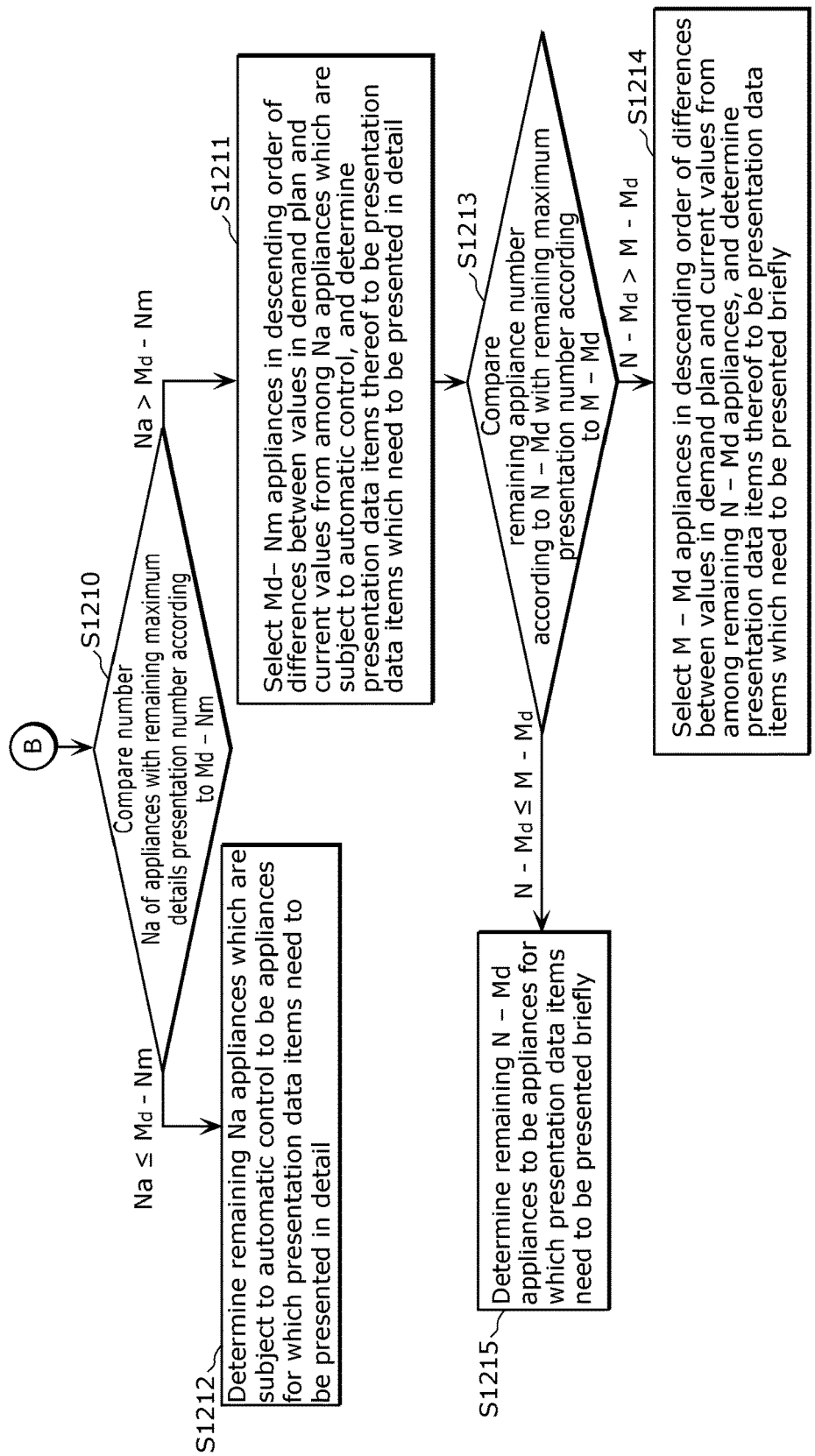
FIG. 12C is a third flowchart for explaining a presentation need determining process in Embodiment 4.

Each of FIGS. 12A, 12B, and 12C is a diagram showing a part of the flowchart of the presentation need determining process performed by the presentation need determining unit 301 in this embodiment.

First, the presentation need determining unit 301 separately counts (i) the number Nm (Nm is an integer larger than or equal to 0) of energy consuming appliances which are not subject to the automatic control and (ii) the number Na (Na is an integer larger than or equal to 0) of energy consuming appliances which are subject to the automatic control, among the energy consuming appliances identified in the picture data item (Step S1201).

Next, the presentation need determining unit 301 quantifies the differences between values in the demand plan and current values related to the respectively identified energy consuming appliances (Step S1202).

Next, the number Nm of energy consuming appliances which are not subject to the automatic control is compared with the maximum presentation number Md (Md is an integer larger than or equal to 1) indicating the number of presentation data items to be presented at maximum (Step S1203).

When Nm>Md is satisfied, the number of energy consuming appliances identified in the picture data item is larger than the maximum details presentation number Md, and thus Md energy consuming appliances are selected. In other words, from among the energy consuming appliances identified in the picture data item, the Md energy consuming appliances are selected in descending order of the differences ΔE between the values in the demand plan and the current values calculated in Step S1202. The presentation data items related to the Md energy consuming appliances are determined to be presentation data items which need to be presented in detail (Step S1204), and a shift is made to Step S1206.

When Nm≤Md is satisfied, the number of energy consuming appliances which are not subject to the automatic control among the energy consuming appliances identified in the picture data item is smaller than or equal to the maximum details presentation number Md. Thus, the presentation data items related to the Nm energy consuming appliances which are not subject to the automatic control are determined to be presentation data items which need to be presented in detail (Step S1205), and a shift is made to Step S1210.

In Step S1206, a comparison is made as to (i) a remaining maximum presentation number according to M−Md (M is an integer larger than or equal to Md and indicates a maximum presentation number) and (ii) a remaining appliance number according to Nm−Md, indicating the number of remaining energy consuming appliances which are not subject to the automatic control.

Here, the remaining maximum presentation number according to M−Md is a number obtained by subtracting the number of presentation data items to be displayed at the "detailed display" level from the number of presentation data items which can be displayed at the "brief display" level.

In addition, the remaining appliance number according to Nm−Md is a number obtained by subtracting the number of energy consuming appliances to be displayed at the "detailed display" level from the number Nm of energy consuming appliances which are not subject to the automatic control. In other words, the value obtained according to Nm−Md shows the number of energy consuming appliances which are candidates to be displayed at the "brief display" level.

Here, Nm−Md>M−Md shows that the remaining appliance number according to Nm−Md is larger than the remaining maximum presentation number according to M−Md. For this, M−Md energy consuming appliances are selected in descending order of the differences ΔE between the values in the demand plan and the current values calculated in Step S1202 from among the remaining Nm−Md energy consuming appliances. For this reason, presentation data items related to the selected energy consuming appliances are determined to be presentation data items which need to be presented briefly, for completion of the presentation need determining process (Step S1207).

In addition, when Nm−Md≤M−Md is satisfied, since the number of remaining N−Md energy consuming appliances is smaller than or equal to the remaining maximum presentation number according to M−Md, the presentation data items related to the remaining Nm−Md energy consuming appliances are determined to be presentation data items which need to be displayed briefly (Step S1208).

Next, the presentation need determining unit 301 selects M−Nm energy consuming appliances at maximum in descending order of the differences ΔE between the values in the demand plan and the current values calculated in Step S1202 from among Na energy consuming appliances which are subject to the automatic control, and determines the selected M−Nm energy consuming appliances to be appliances for which presentation data items need to be presented, for completion of the presentation need determining process (Step S1209).

In Step S1210, the number Na of energy consuming appliances subject to the automatic control is compared with the remaining maximum details presentation number according to Md−Nm (Md is an integer larger than or equal to 1) for the presentation data items.

When Na>Md−Nm is satisfied, the number of energy consuming appliances identified in the picture data item as being subject to the automatic control is larger than the remaining maximum details presentation number according to Md−Nm. In this way, the Md−Nm energy consuming appliances are selected in descending order of the differences ΔE between the values in the demand plan and the current values calculated in Step S1202. The presentation data items related to the Md−Nm energy consuming appliances are determined to be presentation data items which need to be presented in detail (Step S1211), and a shift is made to Step S1213.

In addition, when Na≤Md−Nm is satisfied, the number of energy consuming appliances identified in the picture data item as being subject to the automatic control is smaller than or equal to the remaining maximum details presentation number according to Md−Nm. For this reason, presentation data items related to Na energy consuming appliances identified in the picture data item are determined to be presentation data items which need to be presented in detail, for completion of the presentation need determining process (Step S1212).

In Step S1213, a comparison is made as to (i) a remaining maximum presentation number according to M−Md for the presentation data items (M is an integer larger than or equal to Md and indicates a maximum presentation number) and (ii) a remaining appliance number according to N−Md.

Here, N−Md>M−Md shows that the remaining appliance number according to N−Md is larger than the remaining maximum presentation number according to M−Md. For this, M−Md energy consuming appliances are selected in descending order of the differences ΔE between the values in the demand plan and the current values calculated in Step S1202 from among the remaining N−Md energy consuming appliances subject to the automatic control. For this reason, presentation data items related to the M−Md energy consuming appliances are determined to be presentation data items which need to be presented briefly, for completion of the presentation need determining process (Step S1214).

In addition, when N−Md≤M−Md is satisfied, since the remaining number of N−Md energy consuming appliances is smaller than or equal to the remaining maximum presentation number according to M−Md, the presentation data items related to the remaining N−Md energy consuming appliances are determined to be presentation data items which need to be displayed briefly, for completion of the presentation need determining process (Step S1215).

As in Embodiment 1, the presentation data generating unit 302 in this embodiment generates presentation data items including image data items, audio data items, text data items, video data items, etc.

It is to be noted that the presentation data items are generated to have different formats distinguishable between the energy consuming appliances which are subject to the automatic control and the energy consuming appliances which are not subject to the automatic control.

In addition, the presentation data generating unit 302 in this embodiment generates presentation data items to be displayed at the "detailed display" level for the presentation data items determined by the presentation need determining unit 301 as being presentation data items which need to be displayed in detail, and generates presentation data items to be displayed at the "brief display" level for the presentation data items determined by the presentation need determining unit 301 as being presentation data items which need to be displayed briefly.

FIG. 13 shows an example where a picture data item 217 with superimposed presentation data items is output on the output unit 108 in this embodiment.

FIG. 13 shows an example where a liquid crystal display 511 and a speaker 512 of the mobile terminal 500, and the display application (not shown) and the audio reproduction application (not shown) executed on the CPU of the mobile terminal 500 are configured as the output unit 108.

In the case of FIG. 13, the maximum presentation number M indicating the maximum number of presentation data items is 3, the maximum details presentation number Md is 2, and the energy consuming appliance (television receiver) 151, and the energy consuming appliance (lighting equipment) 153 are subject to the automatic control. In this example case, the energy consuming appliance (air conditioner) 152 is not subject to the automatic control, the presentation data items for the energy consuming appliance (air conditioner) 152 and the energy consuming appliance (lighting equipment) 153 are determined to be presentation data items which need to be presented in detail, and the presentation data item for the energy consuming appliance (television receiver) 151 is determined to be a presentation data item which needs to be presented briefly.

As for the energy consuming appliance (air conditioner) 152 which is not subject to the automatic control and for which the presentation data item is determined to be presented in detail, a presentation data item is superimposed and displayed on the liquid crystal display 511. For example, an image data item 501 which visually enhances the energy consuming appliance (air conditioner) 152 and a text data item 502 of "Please increase setting temperature to 28° C.!" are superimposed and displayed as presentation data items on the liquid crystal display 511.

In addition, as for the energy consuming appliance (lighting equipment) 153 which is subject to the automatic control and for which the presentation data item is determined to be presented in detail, an icon image 1103 showing that the automatic control is being executed and a text data item 502 of "Under automatic control! Energy saved by 15%" are superimposed and displayed as presentation data items on the liquid crystal display 511.

In addition, as for the energy consuming appliance (television receiver) 151 which is subject to the automatic control and for which the presentation data item is determined to be presented briefly, an icon image 1104 showing that the automatic control is being executed is superimposed and displayed on the liquid crystal display 511.

In this embodiment, the presentation data items for the energy consuming appliance which is not subject to the automatic control is superimposed preferentially over the presentation data items for the energy consuming appliances which are subject to the automatic control. Furthermore, the presentation data item of the energy consuming appliance having the comparatively large difference between the value in the demand plan and the current value is superimposed as having a high display level. In this way, it is possible to increase visibility of the presentation data item, among the presentation data items, which (i) is related to the energy consuming appliance having the comparatively large difference between the value in the demand plan and the current value, and (ii) indicates control for producing a comparatively large effect when performed.

For this reason, the presentation data item superimposed on the picture data item output on the output unit 108 is visually recognized by the user, and thus it is expected that the operation for control related to the presentation data item is executed by the user in a more reliable manner.

Accordingly, it is possible to prompt the user to perform the comparatively effective method for using the energy consuming appliance to achieve the demand control request.

The display levels for the presentation data items are two in the above description, but three or more display levels may be used.

[Embodiment 5]

An energy management system in this embodiment is characterized in that presentation data items based on a demand plan can be superimposed and seen in a picture data item obtained by imaging energy consuming appliances even when the energy consuming appliances are imaged by a camera unit 102 which does not face the energy consuming appliances.

The structural elements of this embodiment are largely in common to those of Embodiment 3, and thus the common structural elements are assigned with the same numerical references, and indication of diagrams and detailed descriptions thereof are omitted where appropriate.

Figure 14:
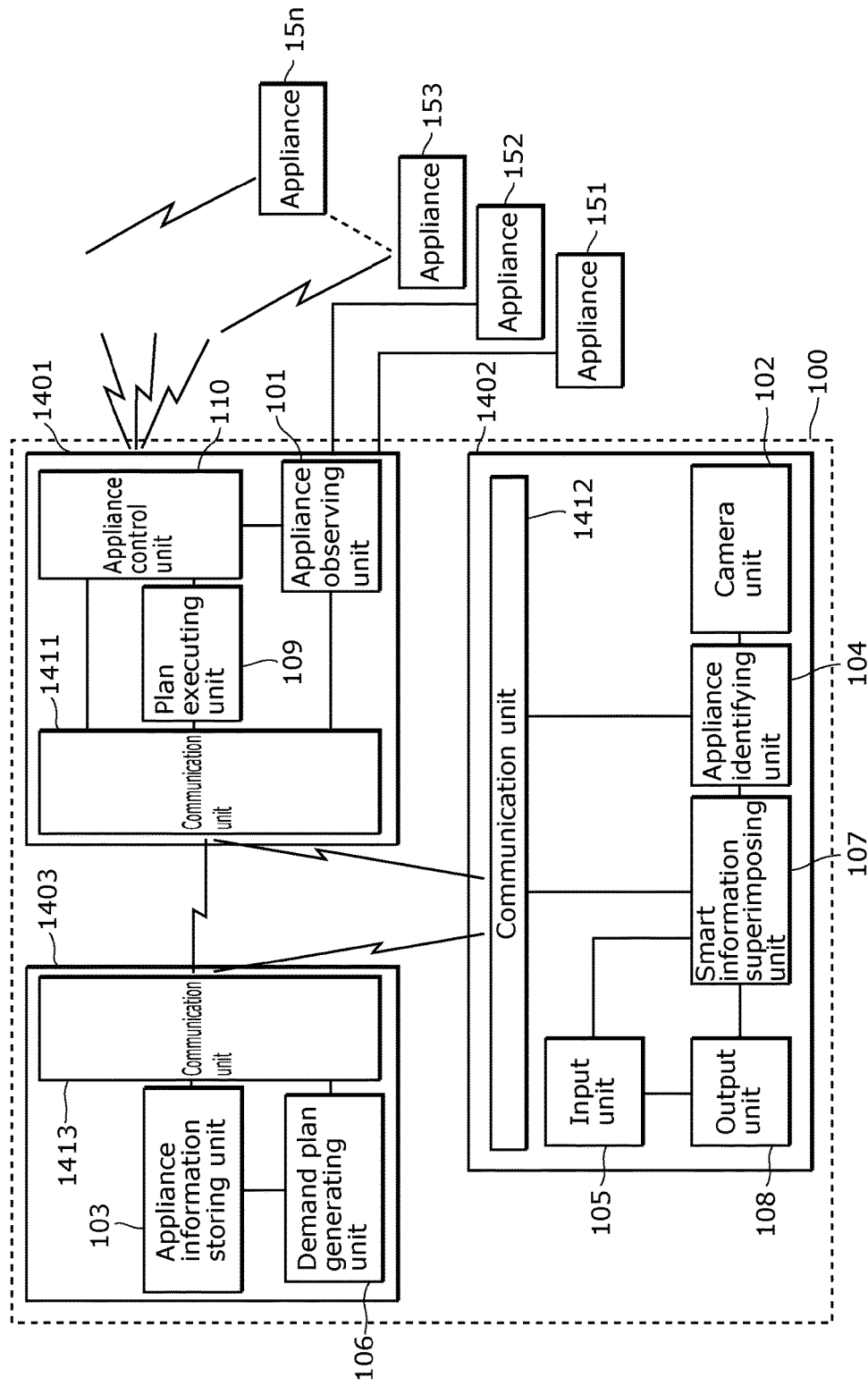
FIG. 14 is a diagram showing a configuration of an energy management system in Embodiment 5.

FIG. 14 is a diagram showing a configuration of an energy management system in this embodiment.

The energy management system in this embodiment includes n energy consuming appliances 151 to 15n, and three units of a home management unit 1401, a mobile terminal management unit 1402, and a server management unit 1403. The management unit 100 which manages energy consumed by the energy consuming appliances 151 to 15n includes the aforementioned three units.

The home management unit 1401 includes a communication unit 1411 which communicates with each of the following appliances placed in a home: an appliance observing unit 101; a plan executing unit 109; an appliance control unit 110; the mobile terminal management unit 1402; and the server management unit 1403.

The mobile terminal management unit 1402 includes a communication unit 1412 which communicates with each of the following mobile terminals having structures which allow the user to carry around: the camera unit 102; an appliance identifying unit 104; an input unit 105; a smart information superimposing unit 107; an output unit 108; the home management unit 1401; and the server management unit 1403.

The server management unit 1403 includes, as a computer server appliance, a communication unit 1413 which communicates with each of an appliance information storing unit 103, a demand plan generating unit 106, the home management unit 1401, and the mobile terminal management unit 1402. The management unit 100 is an example of a specific version of the management unit 100 in FIG. 8.

The communication units 1411, 1412, and 1413 are connected to each other so as to be communicable wired or wirelessly.

Figure 15:
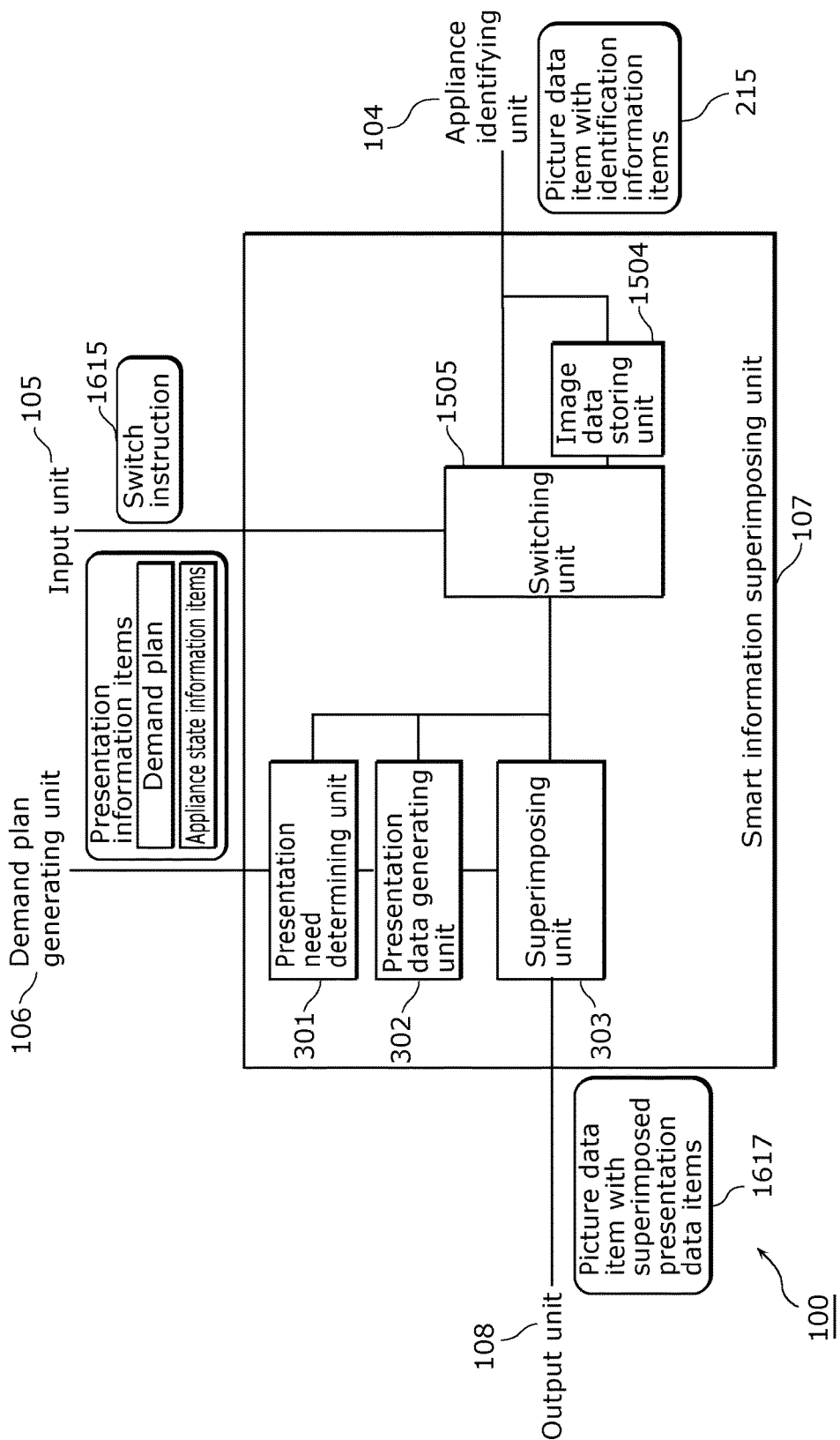
FIG. 15 is a block diagram of a smart information superimposing unit in the energy management system in Embodiment 5.

FIG. 15 shows an internal structure of the smart information superimposing unit 107 in this embodiment.

The smart information superimposing unit 107 in this embodiment includes: not only a presentation need determining unit 301; a presentation data generating unit 302; and a superimposing unit 303 but also processing units below.

The processing units are: an image data storing unit 1504 which stores picture and picture items to which appliance identification information items are added by the appliance identifying unit 104; and a switching unit 1505 which switches picture data items on which presentation data items are to be superimposed, by switching picture data items to be input to the presentation need determining unit 301, the presentation data generating unit 302, and the superimposing unit 303.

The image data storing unit 1504 stores the picture and image data items. A picture data item is obtained by imaging one or more energy consuming appliances in a room of the home using the camera unit 102, and an image data item is obtained by imaging each of one or more energy consuming appliances in the home using the camera unit 102. The picture and image data items are stored in advance with the appliance identification information items added by the appliance identifying unit 104.

Here, each of attribute information items of the picture and image data items stored in the image data storing unit 1504 includes a position information item indicating a place at which the image is imaged. This position information item is obtained using a position information obtaining function such as a Global Positioning System (GPS). The position information obtaining function is not shown in FIG. 14, but is provided to the mobile terminal included in the mobile terminal management unit 1402.

The switching unit 1505 reads out a picture or image data item stored in the image data storing unit 1504, and receives the picture data item with the appliance identification information items transmitted from the appliance identifying unit 104. The switching unit 1505 switches to the aforementioned picture data item to be output to the presentation need determining unit 301, the presentation data generating unit 302, and the superimposing unit 303, based on a switch instruction 1615 input by the user through the input unit 105. In other words, the switch instruction 1615 includes a control mode which is information for selecting a picture or image data item to be output onto the presentation need determining unit 301 etc. from among the selection candidates including the picture or image data item stored in the image data storing unit 1504.

Here, the switch instruction 1615 may further include, as a control mode, information for specifying either a picture data item stored in the image data storing unit 1504 is output to the presentation need determining unit 301 etc. or a picture data item etc. imaged by the camera unit 102 is output to the presentation need determining unit 301 etc. For example, when the switch instruction 1615 includes a "stored image mode" as the control mode, the picture data item stored in the image data storing unit 1504 is output to the presentation need determining unit 301 etc. In addition, when the switch instruction 1615 includes a "camera mode" as the control mode, the picture data item etc. imaged by the camera unit 102 is output to the presentation need determining unit 301 etc.

For example, the switching unit 1505 may switch to picture data items with appliance identification information items stored in the image data storing unit 1504. In this case, the picture data item which is obtained by imaging the energy consuming appliances placed in the home and is stored in the image data storing unit 1504 includes presentation data items based on the demand plan superimposed thereon. In this case, even when the camera unit 102 does not always face the energy consuming appliances, the superimposed presentation data items based on the demand plan can be seen on the picture data item obtained by imaging the actual energy consuming appliances.

On the other hand, as in the case of Embodiment 3, when a switch is made to the picture data item with the appliance identification information items transmitted from the appliance identifying unit 104, the presentation data items based on the demand plan are superimposed and seen on the picture data item obtained by imaging the energy consuming appliances which are currently being followed by the camera unit 102.

Figure 16:
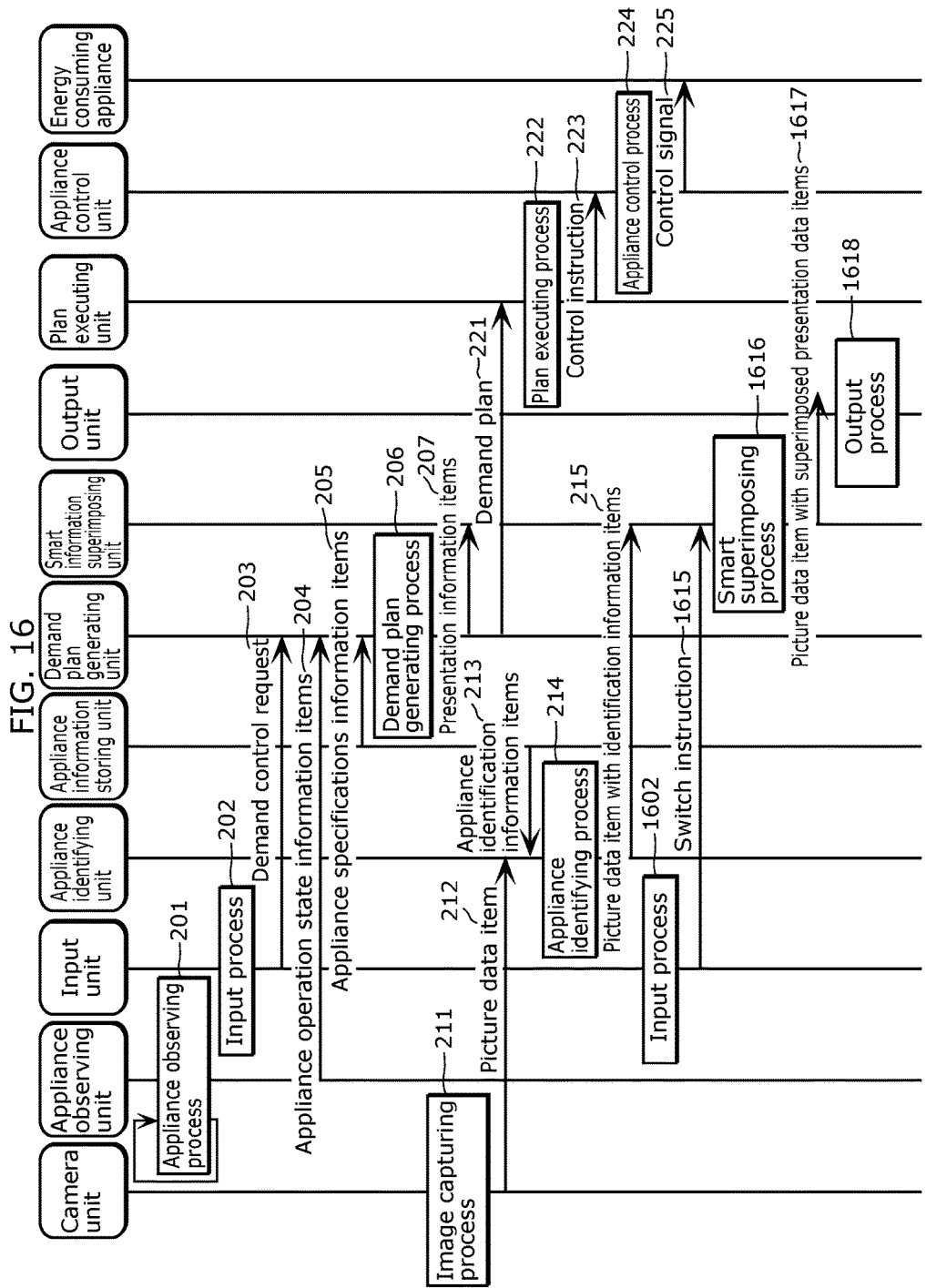
FIG. 16 is a sequence diagram for explaining operations in the energy management system in Embodiment 5.

FIG. 16 is a sequence diagram showing a sequence of operations performed by the energy management system in this embodiment.

The following sequences are similar to those in Embodiment 3: a sequence of processes from an appliance observing process 201 by the appliance observing unit 101 to when a control signal 225 based on the demand plan is transmitted; and a sequence from an image capturing process 211 by the camera unit 102 and to when the picture data item 215 with the identification information items is transmitted to the smart information superimposing unit 107.

In this embodiment, the switch instruction 1615 for switching to the picture data item on which a presentation data item is to be superimposed is input by the user through the input unit 105 (an input process 1602), the switch instruction 1615 which is an information item indicating the details of the input is transmitted to the smart information superimposing unit 107.

Upon receiving the switch instruction 1615, the smart information superimposing unit 107 switches the picture data item to be output to the presentation need determining unit 301, the switching unit 1505 switches to the picture data item to be output to the presentation data generating unit 302, and the superimposing unit 303, based on the switch instruction 1615.

The smart information superimposing unit 107 performs a smart superimposing process 1616 similar to the one in Embodiment 3 onto the picture data item after the switch by the switching unit 1505.

The smart information superimposing unit 107 performs the smart superimposing process 1616, and transmits the picture data item 1617 with the superimposed presentation data item to the output unit 108.

The output unit 108 outputs the picture data item 1617 with the superimposed presentation data item using the liquid crystal display and the speaker (an output process 1618).

Figure 17A:
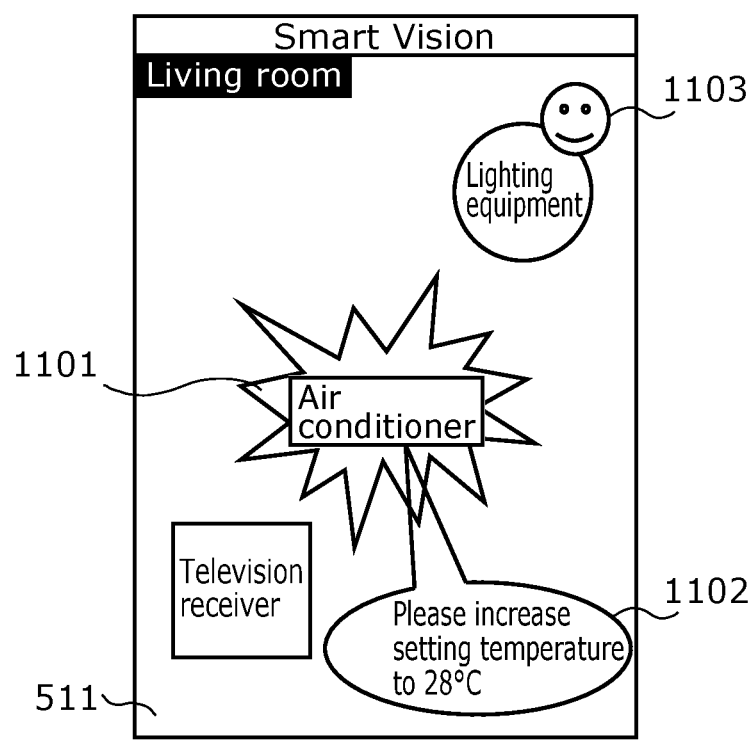
FIG. 17A shows an example of a picture data item with superimposed presentation data items output onto an output unit in Embodiment 5, specifically a picture data item showing a living room.
Figure 17B:
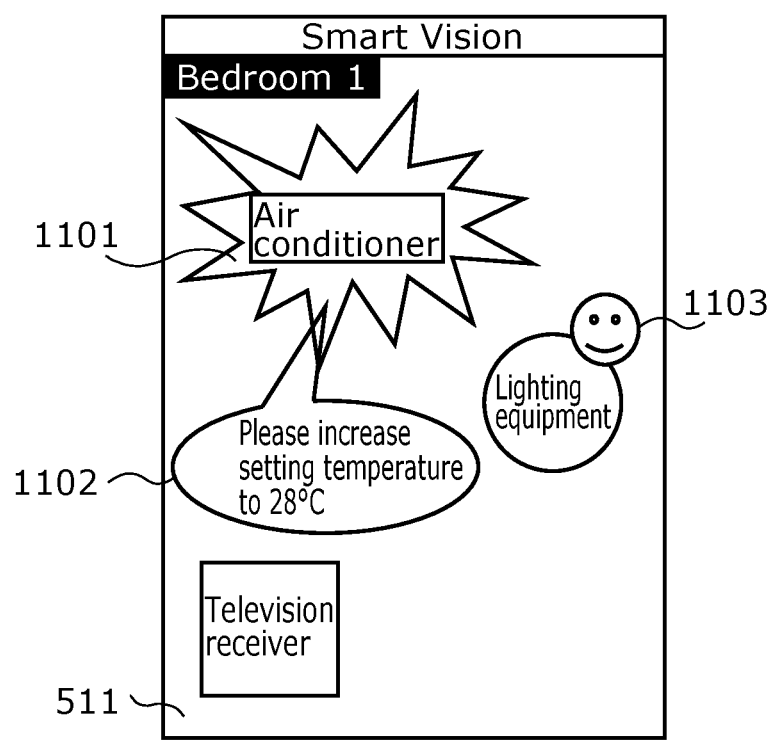
FIG. 17B shows an example of a picture data item with superimposed presentation data items output onto the output unit in Embodiment 5, specifically a picture data item showing a bedroom 1 displayed after a switch.
Figure 17C:
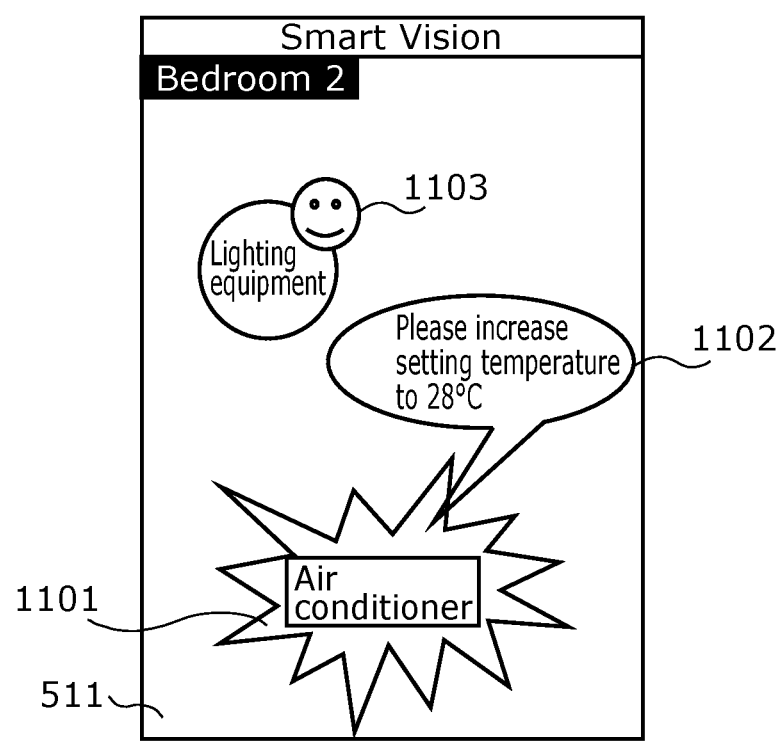
FIG. 17C shows an example of a picture data item with superimposed presentation data items output onto the output unit in Embodiment 5, specifically a picture data item showing a bedroom 2 displayed after a switch.

Each of FIGS. 17A, 17B, and 17C is a diagram showing an example where the picture data item 1617 with the superimposed presentation data item in this embodiment is output on the liquid crystal display 511 of the output unit 108.

FIG. 17A shows a case in which the switching unit 1505 switches to the picture data item on which the presentation data item is to be superimposed in a living room, based on the switch instruction 1602 input through the input unit 105.

In the case of FIG. 17A, the energy consuming appliance (lighting equipment), the energy consuming appliance (air conditioner), and the energy consuming appliance (television receiver) are displayed on the liquid crystal display on the output unit 108.

Furthermore, as for the energy consuming appliance (air conditioner), an image data item 1101 which visually enhances the energy consuming appliance (air conditioner) and a text data item 1102 of "Please increase setting temperature to 28° C.!" are superimposed and displayed as presentation data items.

Furthermore, as for energy consuming appliance (lighting equipment), an icon image 1103 showing that an automatic control is being executed are superimposed and displayed as presentation data items.

In addition, FIG. 17B shows a case where the switching unit 1505 switches to a picture data item obtained by imaging a bedroom 1 as a picture data item to which a presentation data item is superimposed, based on the switch instruction 1602 input through the input unit 105.

In the case of FIG. 17B, the energy consuming appliance (lighting equipment), the energy consuming appliance (air conditioner), and the energy consuming appliance (television receiver) in the bedroom 1 are displayed on the liquid crystal display on the output unit 108.

Furthermore, as for the energy consuming appliance (air conditioner), an image data item 1101 which visually enhances the energy consuming appliance (air conditioner) and a text data item 1102 of "Please increase setting temperature to 28° C.!" are superimposed and displayed as presentation data items.

Furthermore, as for energy consuming appliance (lighting equipment), an icon image 1103 showing that an automatic control is being executed are superimposed and displayed as presentation data items.

In addition, FIG. 17C shows a case where the switching unit 1505 switches to a picture data item obtained by imaging a bedroom 2 as a picture data item to which a presentation data item is superimposed, based on the switch instruction 1602 input through the input unit 105.

In the case of FIG. 17C, the energy consuming appliance (lighting equipment), and the energy consuming appliance (air conditioner) in the bedroom 2 are displayed on the liquid crystal display on the output unit 108.

Furthermore, as for the energy consuming appliance (air conditioner), an image data item 1101 which visually enhances the energy consuming appliance (air conditioner) and a text data item 1102 of "Please increase setting temperature to 28° C.!" are superimposed and displayed as presentation data items.

Furthermore, as for energy consuming appliance (lighting equipment), an icon image 1103 showing that an automatic control is being executed are superimposed and displayed as presentation data items.

Here, the switch instruction 1615 may be input in association with a flick operation on the touch panel through the input unit 105.

In this case, in response to the flick operation, the switching unit 1505 sequentially switches to picture data items to be output to the presentation need determining unit 301, the presentation data generating unit 302, and the superimposing unit 303.

In this way, the user can switch the picture data items on which presentation data items are superimposed in a comparatively easy manner by performing operations similar to the operations for switching photograph data items to be displayed on the liquid crystal display 511 of the mobile terminal 500.

As described above, in this embodiment, the presentation data items based on the demand plan are superimposed and seen in the picture data items obtained by imaging the energy consuming appliances even when the camera unit 102 does not always face the energy consuming appliances during the imaging.

In other words, the user can see the presentation data items based on the demand plan superimposed on the imaged data items of the energy consuming appliances in each room without going to the room.

In addition, the user can see the presentation data items based on the demand plan superimposed on the image data items of the energy consuming appliances outside the home, with an increased userfriendliness.

In addition, when the mobile terminal 500 is set to a mode for displaying the picture data items on which presentation data items are superimposed, the following operation may be performed. The operation which may be performed here is to output a picture data item with (i) the energy consuming appliance having the largest difference between a value in the demand plan and a current value and (ii) a presentation data item superimposed on the picture data item.

In this case, the smart information superimposing unit 107 identifies the energy consuming appliance having the largest difference between a value in the demand plan and a current value, based on the demand plan included in the presentation information items and the appliance state information items. The switching unit 1505 performs the switch operations to the picture data items including the identified energy consuming appliances.

In this way, the presentation data item is firstly performed which (i) is related to the energy consuming appliance having the largest difference between the value in the demand plan and the current value, and (ii) provides the highest effect when control based on the presentation data item is performed. In this case, the operation for control which is related to the presentation data item and effective for achieving the demand control request is visually recognized by the user, and thus it is expected that the operation is executed by the user in a more reliable manner.

In addition, the switching unit 1505 switches picture data items based on the switch instruction 1602 input through the input unit 105 in the above description, the switching unit 1505 may automatically switch the picture data items based on time information items or position information items.

For example, in the case of a switch based on time information items, the switching unit 1505 sequentially switches, at a predetermined time interval, picture data items to be output to the presentation need determining unit 301, the presentation data generating unit 302, and the superimposing unit 303.

In this way, the picture data items on which presentation data items are superimposed stored in the image data storing unit 1504 are to be output from the output unit 108 in a manner like a slide show.

In addition, for example, in the case of a switch based on position information items, the switching unit 1505 automatically switches to a picture data item imaged at a place closest to a current user position based on a user position information item, as a picture data item determined to be output to the presentation need determining unit 301, the presentation data generating unit 302, and the superimposing unit 303.

At this time, the switching unit 1505 compares position information items included in attribute information items of the image data items stored in the image data storing unit 1504, and switches to the image data item closest to the current user position based on the user position information item (the user here carries around the mobile terminal 500).

In this case, for example, when the user moves from the living room to one of the bedrooms, the picture data item imaged in the living room is switched to the picture data item imaged in the bedroom, and the picture data item imaged in the bedroom and presentation data items superimposed on the picture data item are output on the output unit 108.

Here, the superimposing unit 303 in this embodiment may superimpose an activation button of a remote control application together with the presentation data items, on the picture data item 1504 with identification information items.

In this case, when the activation button superimposed on the picture data item is pressed by the user, the remote control operation related to the corresponding energy consuming appliance is activated.

The remote control operation may be input through a menu display screen on the touch panel integrated with the liquid crystal display 511, but preferably be input in the form of a speech through the audio microphone of the input unit 105.

The control instruction recognized by the speech recognition application of the input unit 105 is transmitted to the appliance control unit 110. Upon receiving the control instruction, the appliance control unit 110 controls the energy consuming appliance based on the control instruction.

In this case, the user outside can control the energy consuming appliance remotely while watching the display screen with the superimposed presentation data item based on the demand plan.

In other words, the user can perform, on the energy consuming appliances, remote control operations which include adjusting a set temperature or switching operation modes for the air conditioner, adjusting the intensity of the light, switching ON or OFF of any of the energy consuming appliances, etc., resulting in increase in the userfriendliness.

[Embodiment 6]

An energy management system in this embodiment is characterized by generating a plurality of demand plans, and superimposing presentation data items based on one of the demand plans selected by a user.

The basic structure of this embodiment is largely in common to that of Embodiment 3. Thus, the structural elements used in common to those of Embodiment 3 are assigned with the same numerical references, and indication of diagrams and detailed descriptions thereof are omitted where appropriate.

Figure 18:
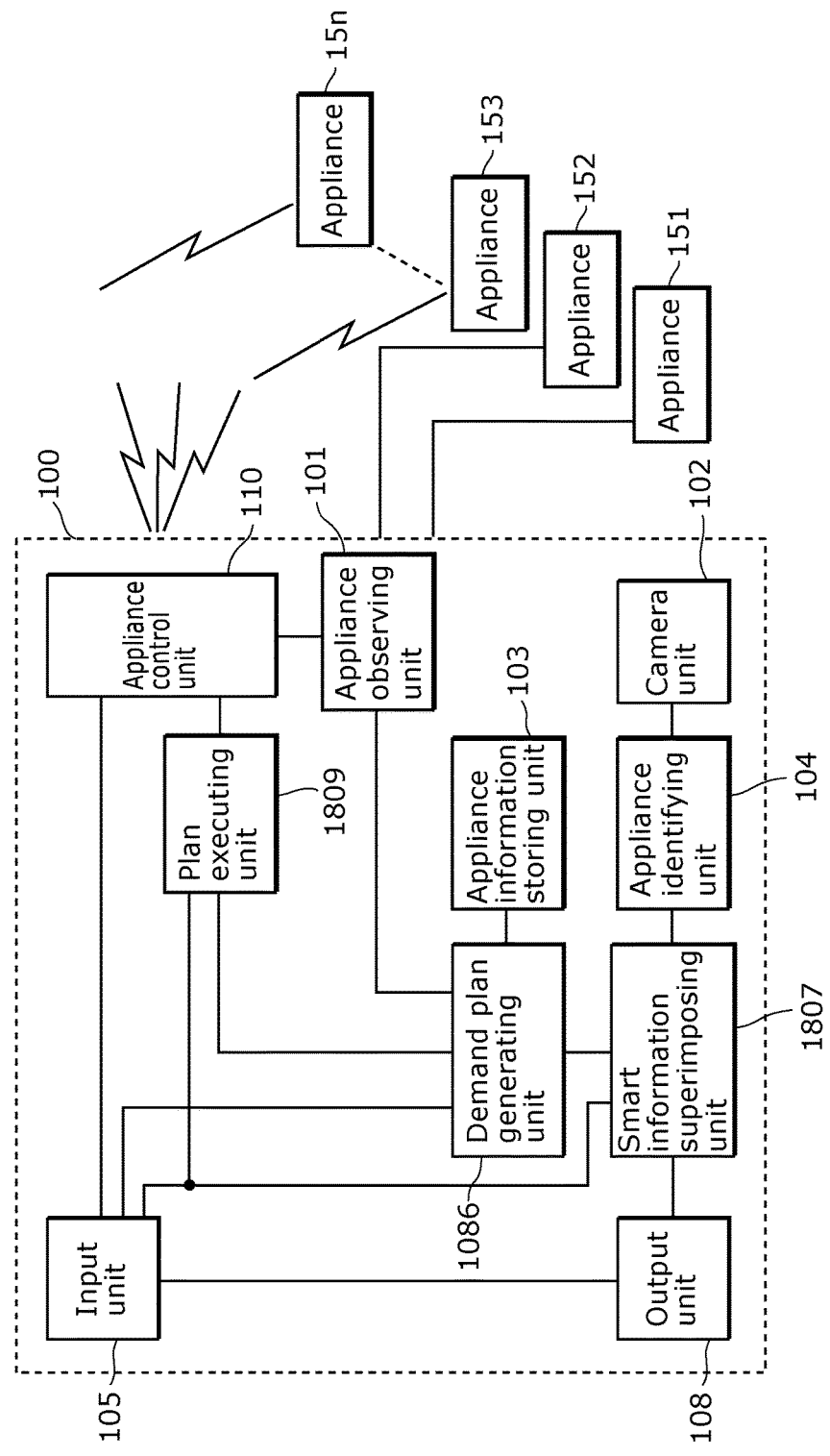
FIG. 18 is a diagram showing a configuration of an energy management system in Embodiment 6.

FIG. 18 is a diagram showing a configuration of an energy management system in this embodiment.

In this embodiment, the demand plan generating unit 1806 generates the demand plans.

The demand plan generating unit 1806 generates the demand plans, for example, based on a method performed by a simulation executing unit to generate reduction plans described in paragraphs [0078] to [0106] of Patent Literature 2.

The demand plan generating unit 1806 performs a simulation for a combination of a current appliance configuration and each of control patterns, evaluates the result of the simulation, derives some of the control patterns which will achieve the demand request (corresponding to the reduction target in Patent Literature 2). The details of the derived control patterns are regarded as the demand plans.

The demand plan generating unit 1806 generates presentation information items including the generated demand plans, and transmits them to the smart information superimposing unit 1807.

When the operation for selecting one of the demand plans is performed by the user, the selection instruction indicating the selected demand plan is transmitted to the smart information superimposing unit 1807 through the input unit 105.

The smart information superimposing unit 1807 selects the demand plan corresponding to the demand plan indicated by the selection instruction received through the input unit 105, and superimposes the presentation data items based on the selected demand plan onto a picture data item obtained by imaging energy consuming appliances in user's home.

In addition, the demand plans generated by the demand plan generating unit 1806 are also transmitted to the plan executing unit 1809.

In addition, the selection instruction indicated by the selected demand plan is also transmitted to the plan executing unit 1809 through the input unit 105. The plan executing unit 1809 executes the demand plan indicated by the selection instruction received through the input unit 105.

Figure 19:
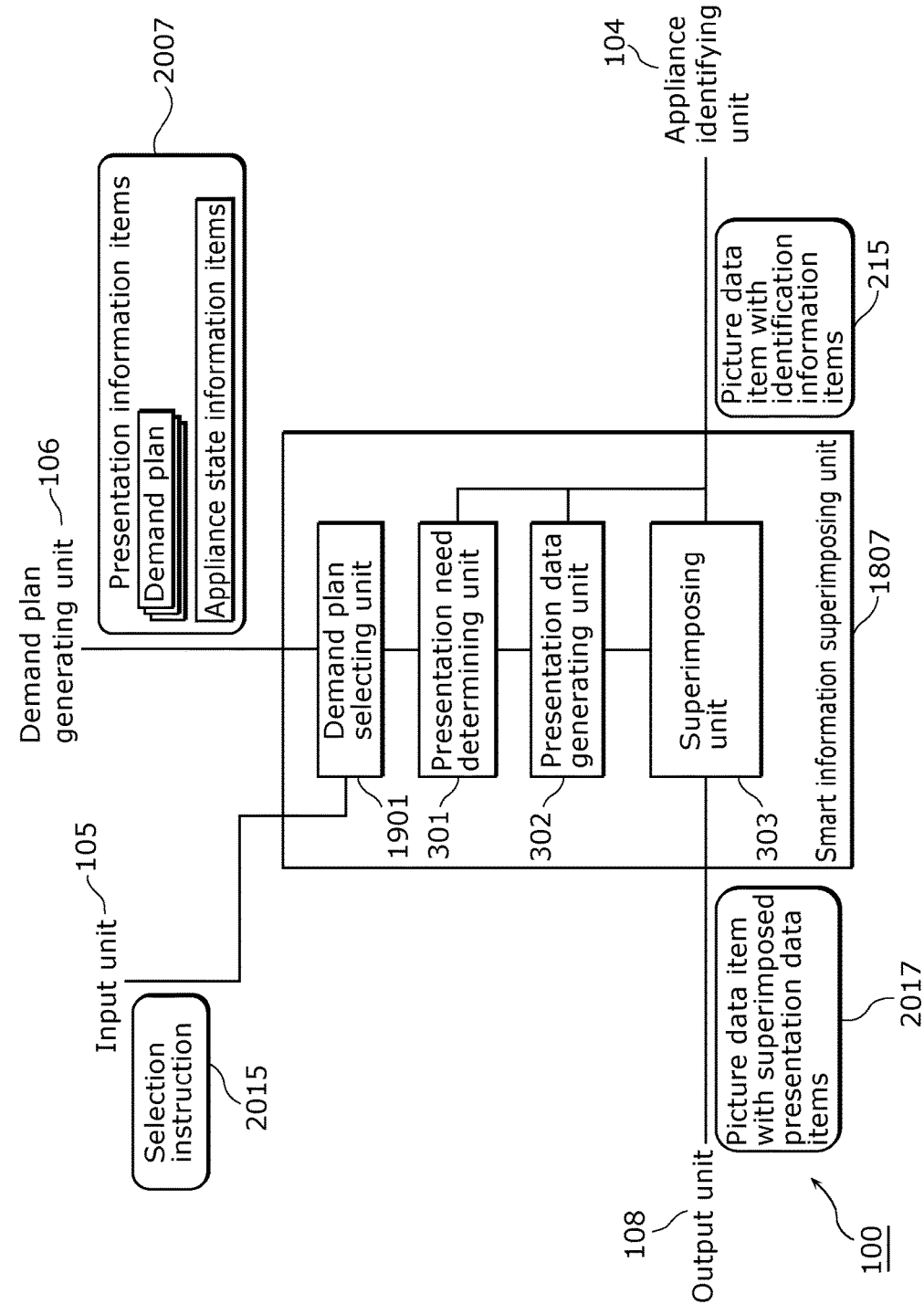
FIG. 19 is a block diagram of a smart information superimposing unit in the energy management system in Embodiment 6.

FIG. 19 shows an internal structure of the smart information superimposing unit 1807 in this embodiment.

The smart information superimposing unit 1807 in this embodiment includes a presentation need determining unit 301, a presentation data generating unit 302, a superimposing unit 303, and a demand plan selecting unit 1901 for selecting a demand plan to be superimposed on the picture data item 215 with identification information items.

Based on the selection instruction 1051 received through the input unit 105, the demand plan selecting unit 1901 selects the demand plan to be superimposed on the picture data item 215 with identification information items, from among the demand plans included in the presentation information items received from the demand plan generating unit 1806.

Figure 20:
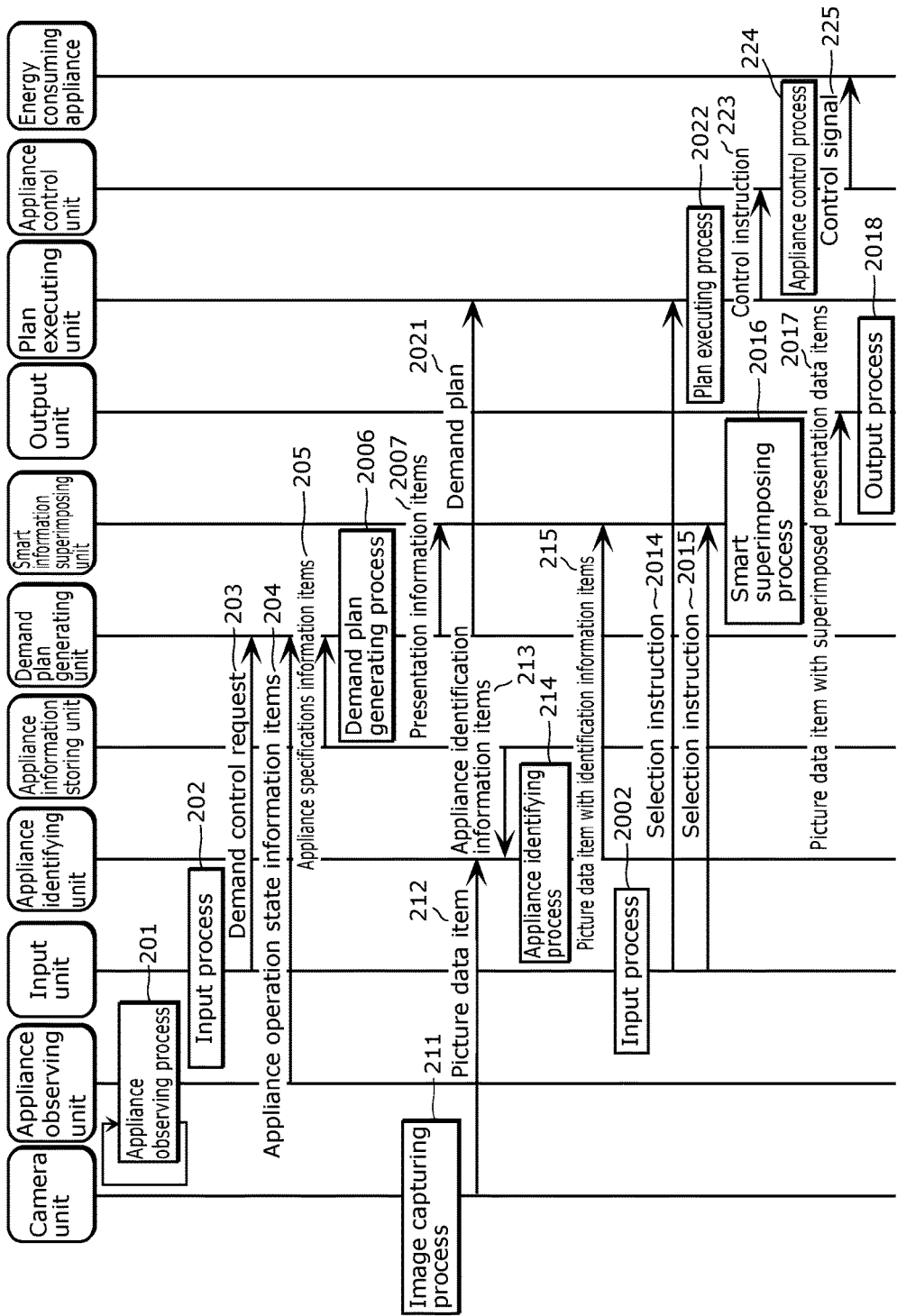
FIG. 20 is a sequence diagram for explaining operations in the energy management system in Embodiment 6.

FIG. 20 is a diagram showing a sequence of operations performed by the energy management system in this embodiment.

The following sequences are similar to those in Embodiment 3: a sequence of processes from an appliance observing process 201 by the appliance observing unit 101 to when appliance specification information items 205 are transmitted to the demand plan generating unit 1806; and a sequence from an image capturing process 211 by the camera unit 102 to when the picture data item 215 with the identification information items is transmitted to the smart information superimposing unit 107.

In this embodiment, the demand plan generating unit 1806 generates the demand plans (a demand plan generating process 2006), transmits the presentation information items 2007 including the generated demand plans to the smart information superimposing unit 1807, and transmits the generated demand plans 2021 to the plan executing unit 1809.

When selection instructions 2014 and 2015 for selecting corresponding demand plans are input by the user through the input unit 105 (an input process 2002), the selection instructions 2014 and 2015 indicating input information items are respectively transmitted to the plan executing unit 1809 and the smart information superimposing unit 1807.

In the smart information superimposing unit 1807 which has received the selection instruction 2015, a demand plan selecting unit 1901 selects one of the demand plans included in the presentation information items 2007, based on the selection instruction 2015.

The smart information superimposing unit 1807 superimposes the presentation data item based on the selected demand plan onto the picture data item 215 with identification information items received from the appliance identifying unit 104 (a smart superimposing process 2016).

The smart information superimposing unit 1807 superimposes presentation data items on a picture data item 2017 by performing a smart superimposing process 2016, and transmits the picture data item 2017 with the presentation data items to the output unit 108. The output unit 108 outputs the picture data item 2017 with the presentation data items using a liquid crystal display and/or a speaker (an output process 2018).

In addition, the plan executing unit 1809 which has received the selection instruction 2014 selects one of the demand plans, based on the selection instruction 2015, and transmits, to an appliance control unit 110, a control instruction for causing the corresponding energy consuming appliance to operate based on the selected demand plan (a plan executing process 2022).

The appliance control unit 110 transmits the control signal 225 corresponding to the received control instruction 223 to each of the energy consuming appliances, and controls the energy consuming appliance (an appliance control process 224).

Figure 21A:
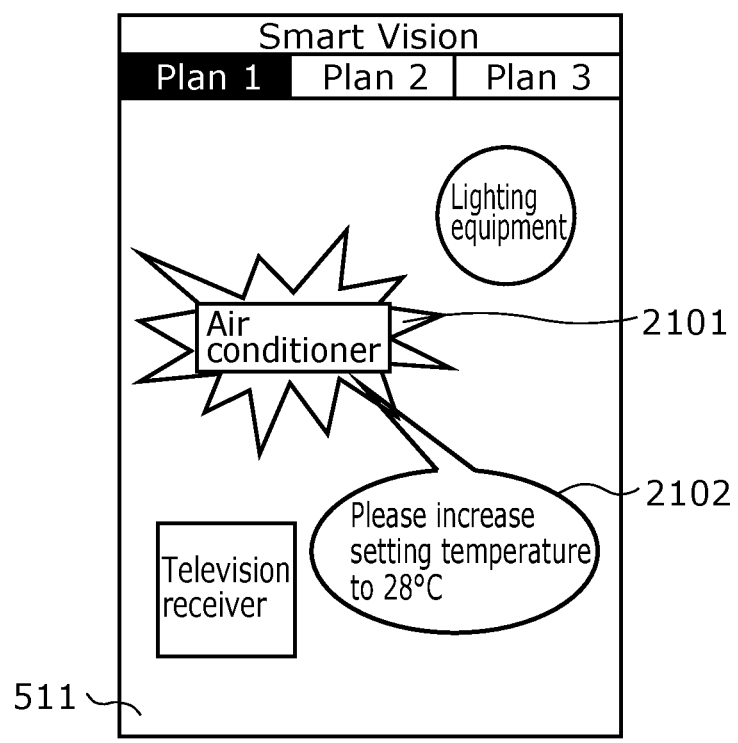
FIG. 21A is a diagram of an example which shows a picture data item with superimposed presentation data items output on an output unit in Embodiment 6, and in which a demand plan of "Plan 1" is selected.
Figure 21B:
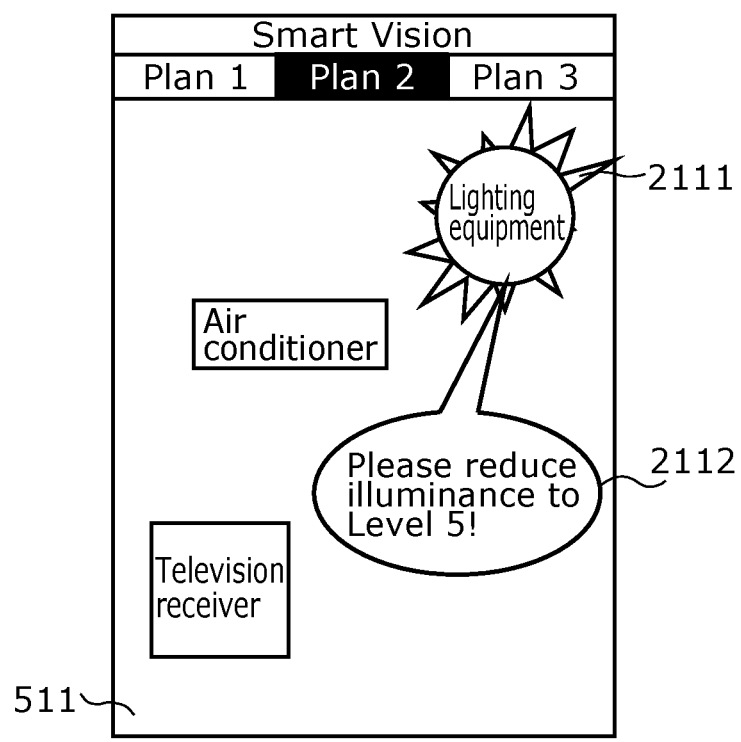
FIG. 21B is a diagram of an example which shows a picture data item with superimposed presentation data items output on an output unit in Embodiment 6, and in which a demand plan of "Plan 2" is selected.
Figure 21C:
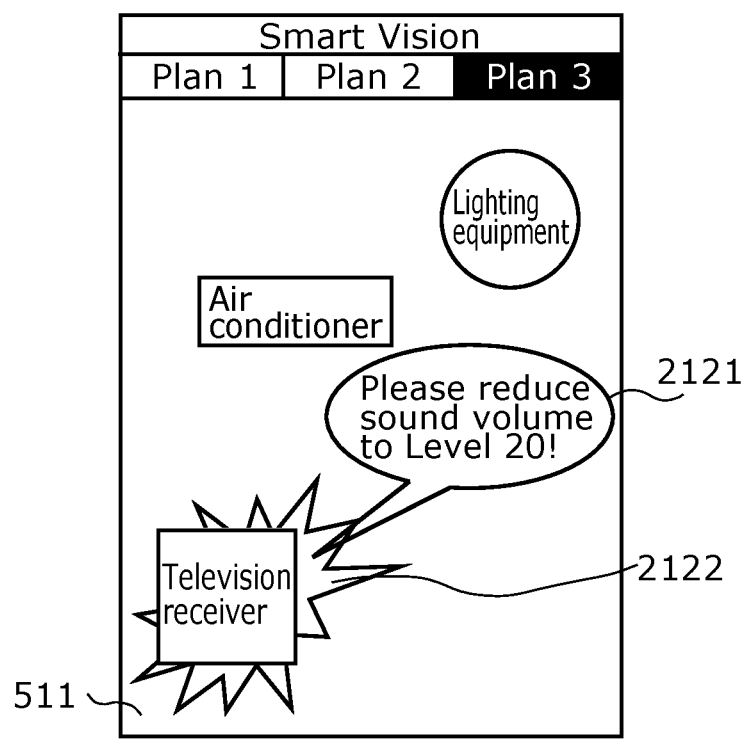
FIG. 21C is a diagram of an example which shows a picture data item with superimposed presentation data items output on an output unit in Embodiment 6, and in which a demand plan of "Plan 3" is selected.

Each of FIGS. 21A, 21B, and 21C is a diagram showing an example where the image data item 2017 with the superimposed presentation data items in this embodiment is output on a liquid crystal display 511 of the output unit 108.

The energy consuming appliances displayed on the liquid crystal display 511 are the same among FIG. 21A to 21C respectively showing cases where different demand plans are selected.

FIG. 21A shows a case where the demand plan selecting unit 1901 selects a demand plan referred to as "Plan 1" based on the selection instruction 2015 input through the input unit 105.

In the demand plan "Plan 1" in this case, a cooling temperature set for the energy consuming appliance (air conditioner) is determined as 28° C. In this case, a current temperature is different from the set temperature, and thus data items such as an image data item 2101 which visually enhances the energy consuming appliance (air conditioner) and a text data item 1202 of "Please increase setting temperature to 28° C.!" are superimposed and displayed as presentation data items for the energy consuming appliance (air conditioner).

FIG. 21B shows a case where the demand plan selecting unit 1901 selects a demand plan referred to as "Plan 2" based on the selection instruction 2015 input through the input unit 105.

In the demand plan "Plan 2" in this case, an illuminance level set for the energy consuming appliance (lighting equipment) is determined as Level 5. A current illuminance level is different from the set illuminance level, and thus an image data item 2111 which visually enhances the energy consuming appliance (lighting equipment) and a text data item 2112 of "Please lower illuminance level to Level 5!" are superimposed and displayed as presentation data items for the energy consuming appliance (lighting equipment).

In addition, FIG. 21C shows a case where the demand plan selecting unit 1901 selects a demand plan referred to as "Plan 3" based on the selection instruction 2015 input through the input unit 105.

In the demand plan "Plan 3" in this case, a sound volume level set for the energy consuming appliance (television receiver) is determined as Level 20. A sound volume level is different from the set sound volume level, and thus data items such as an image data item 2121 which visually enhances the energy consuming appliance (television receiver) and a text data item 2122 of "Please lower sound volume level to Level 20!" are superimposed and displayed as presentation data items for the energy consuming appliance (television receiver).

In this way, since the differences between the target values in the demand plan and current values are shown, the user can select the demand plan which satisfies the need, with an increase in the userfriendliness.

In addition, the user can select the demand plan which does not place much burden on the user, which increases a possibility that the user executes a demand plan for an energy consuming appliance which is not subject to automatic control, and results in achievement of a demand control request.

[Embodiment 7]

An energy management system in this embodiment is characterized by generating a plurality of demand plans including demand plans in which appliance configurations are changed by replacement with or addition of a newly bought energy consuming appliance, and superimposing presentation data items based on a demand plan selected by a user.

The basic structure of this embodiment is largely in common to that of Embodiment 6. Thus, the structural elements used in common to those of Embodiment 6 are assigned with the same numerical references, and indication of diagrams and detailed descriptions thereof are omitted where appropriate.

Figure 22:
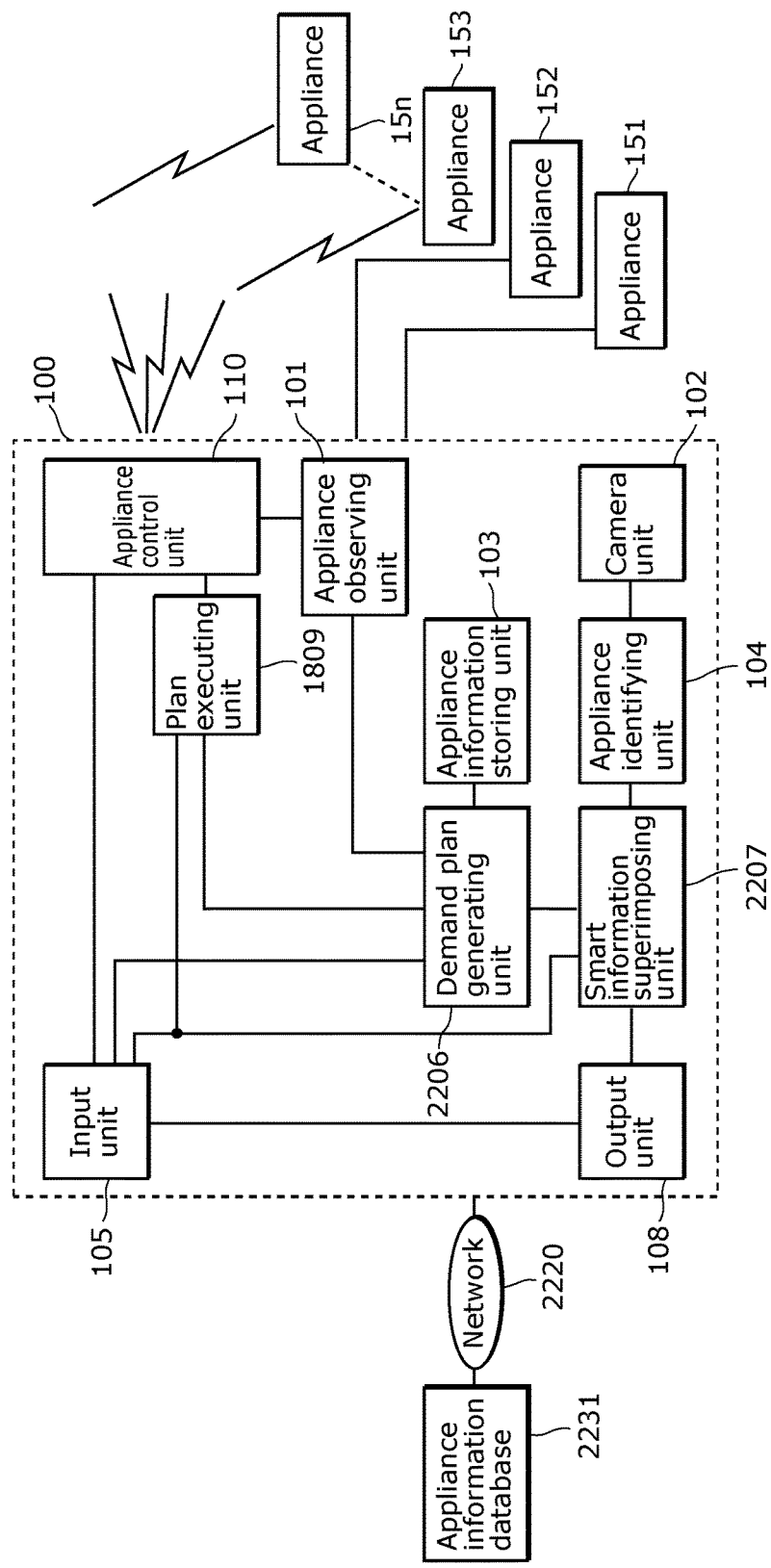
FIG. 22 is a diagram showing a configuration of an energy management system in Embodiment 7.

FIG. 22 is a diagram showing a configuration of the energy management system in this embodiment.

The energy management system in this embodiment includes an appliance information database 2231 which stores specifications information items and appliance identification information items on various kinds of energy consuming appliances. The appliance information database 2231 is connected to a management unit 100 through a network 2220.

A demand plan generating unit 2206 in this embodiment generates the plurality of demand plans including a demand plan in which appliance configurations are changed by replacement with or addition of a newly bought energy consuming appliance.

The appliance information database 2231 stores the specifications information items and appliance identification information items on energy consuming appliances 151 to 15n in user's home and other various kinds of energy consuming appliances, and further stores component data items of the presentation data items.

The appliance information database 2231 stores, as the specifications information items of the energy consuming appliances, information about energy consumed in various kinds of operation states of the energy consuming appliances and ID of the energy consuming appliances in an associated manner.

In addition, the appliance information database 2231 stores, as the appliance identification information items of energy consuming appliances, computer graphics data items (CG data items) of the energy consuming appliances and feature information items of the energy consuming appliances. In other words, the appliance information database 2231 stores CG data items as three-dimensional models of the energy consuming appliances and the feature information items, of the energy consuming appliances, for identifying the energy consuming appliances by image analysis in the picture data items obtained by imaging the energy consuming appliances. The appliance identification information items of the energy consuming appliances are stored together with ID of the energy consuming appliances in the associated manner.

In addition, the appliance information database 2231 stores text message templates, image data items, audio data items, animation data items etc. together with the ID of the energy consuming appliances in the associated manner, as the component data items of the presentation data items of the energy consuming appliances.

The demand plan generating unit 2206 in this embodiment generates the demand plans, for example, based on a method performed by a simulation executing unit to generate reduction plans described in paragraphs [0078] to [0106] of Patent Literature 2.

The demand plan generating unit 2206 obtains the specifications information items of the various kinds of energy consuming appliances through the network 2220, performs a simulation for a combination of a current appliance configuration and each of control patterns, evaluates the result of the simulation, derives some of the control patterns which will achieve the demand control request (corresponding to the reduction target in Patent Literature 2). The details of the derived control patterns are regarded as the demand plans.

The demand plan generating unit 2206 generates presentation information items including the generated demand plans, and transmits them to the smart information superimposing unit 2207.

When the operation for selecting one of the demand plans is performed by the user, the selection instruction indicating the selected demand plan is transmitted to the smart information superimposing unit 2207 through the input unit 105.

The smart information superimposing unit 2207 selects the demand plan corresponding to the demand plan indicated by the selection instruction received through the input unit 105, and superimposes the presentation data items based on the selected demand plan onto a picture data item obtained by imaging energy consuming appliances in user's home.

In addition, the demand plan generating unit 2206 transmits, to a plan executing unit 1809, a demand plan for the same appliance configuration as a current appliance configuration from among the generated demand plans.

The selection instruction indicated by the selected demand plan is also transmitted to the plan executing unit 1809 through the input unit 105. The plan executing unit 1809 executes the demand plan indicated by the selection instruction received through the input unit 105.

Figure 23:
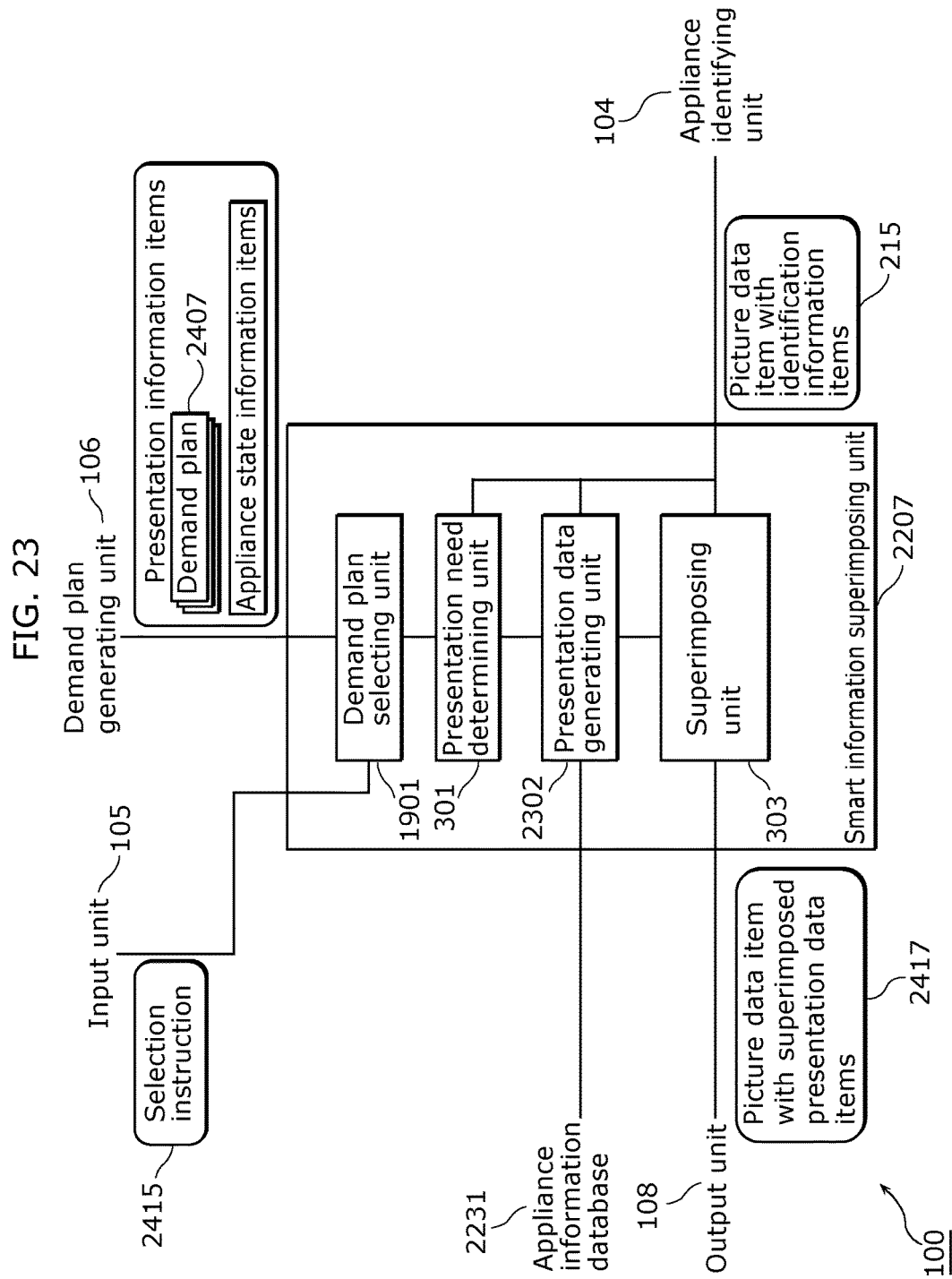
FIG. 23 is a block diagram of a smart information superimposing unit in the energy management system in Embodiment 7.

FIG. 23 shows an internal structure of the smart information superimposing unit 2207 in this embodiment.

The smart information superimposing unit 2207 in this embodiment is similar to the smart information superimposing unit 1807 in Embodiment 6 except that a presentation data generating unit 2302 operates differently from the presentation data generating unit 302 in Embodiment 6.

The presentation data generating unit 2302 performs operations indicated below when an energy consuming appliance determined by the presentation need determining unit 301 as being an energy consuming appliance which needs to be presented is different from any of the energy consuming appliances included in the current appliance configuration, in other words, performs operations for a demand plan showing that a new energy consuming appliance is added simply or as a replacement therein. In this case, the presentation data generating unit 2302 obtains the appliance identification information item of the energy consuming appliance which is not included in the current appliance configuration from the appliance information database 2231 through the network 2220.

The presentation data generating unit 2302 generates a presentation data item of the energy consuming appliance using the appliance identification information item obtained from the appliance information database 2231.

For example, the presentation data generating unit 2302 generates an image data item presenting a state in which a replacement energy consuming appliance is disposed, using a CG data item of the energy consuming appliance included in the appliance identification information item, together with a message for proposing a buy of the replacement energy consuming appliance.

When the energy consuming appliance determined by the presentation need determining unit 301 as being an energy consuming appliance which needs to be presented is the same as one of the energy consuming appliances included in the current appliance configuration, the presentation data generating unit 2302 generates presentation data items including image data items, audio data items, text data items, video data items, etc. as performed by the presentation data generating unit 302. In this case, when a rate ((Er−Ep)/Ep) of the difference between Er and Ep with respect to the demand plan is larger than or equal to a predetermined rate, the presentation data generating unit 2302 generates, as a presentation data item, a piece of advice for prompting the user to perform the control specified by the demand plan.

In addition, when a rate ((Er−Ep)/Ep) of the difference between Er and Ep with respect to the demand plan is smaller than the predetermined rate, the presentation data generating unit 2302 generates, as a presentation data item, an information item indicating a current operation state, and an information item indicating that the current operation state is almost ideal for achieving the demand control request.

Figure 24:
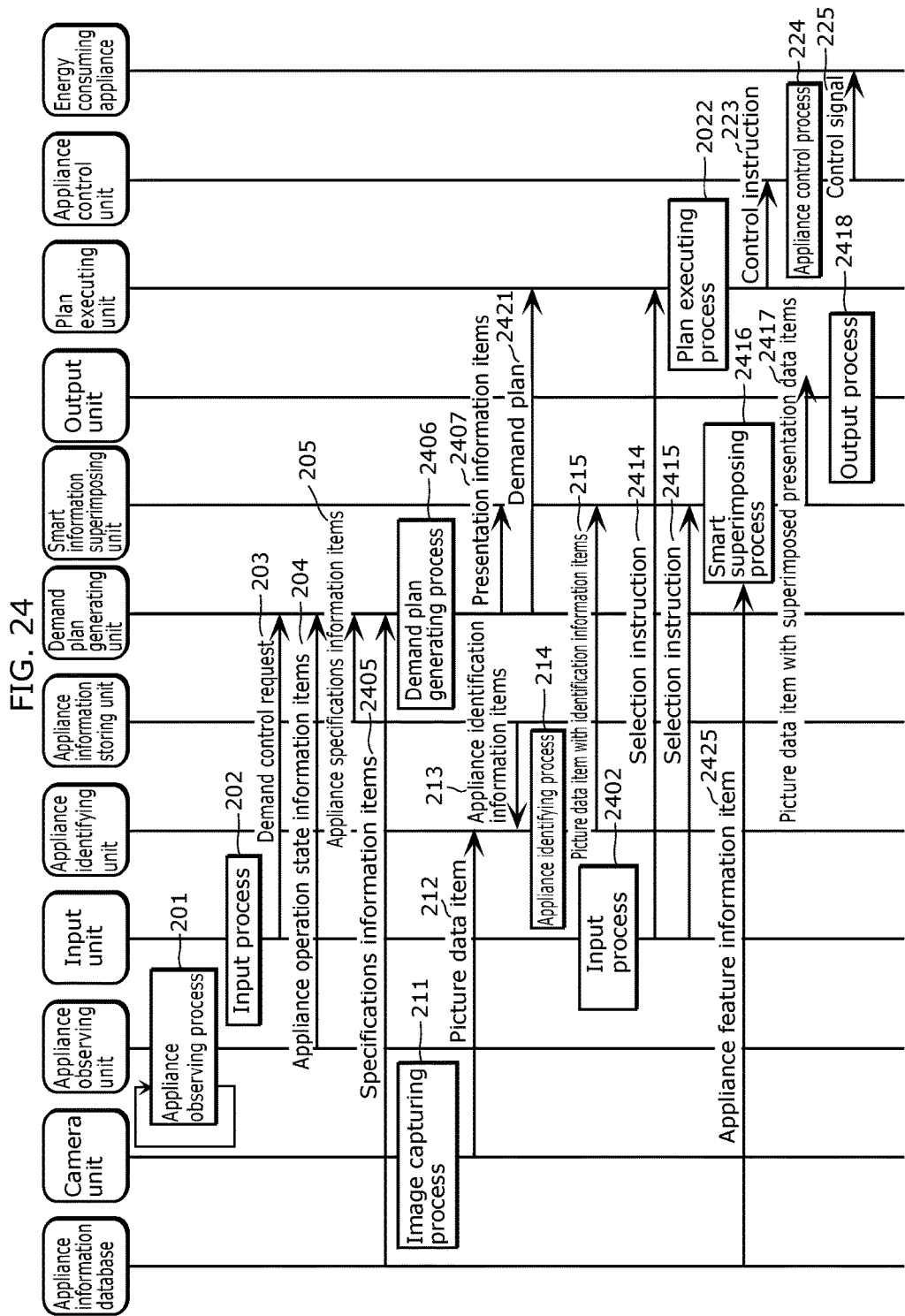
FIG. 24 is a sequence diagram for explaining operations in the energy management system in Embodiment 7.

FIG. 24 is a diagram showing a sequence of operations performed by the energy management system in this embodiment.

The following sequences are similar to those in Embodiment 6: a sequence of processes from an appliance observing process 201 by the appliance observing unit 101 to when appliance specification information items 205 are transmitted to the demand plan generating unit 1806; and a sequence from an image capturing process 211 by the camera unit 102 and to when a picture data item 215 with the identification information items is transmitted to the smart information superimposing unit 107.

In this embodiment, the demand plan generating unit 2206 performs a demand plan generating process 2406. In this process, the demand plan generating unit 2206 obtains specifications information items 2405 of the various kinds of energy consuming appliances from the appliance information database 2231, in addition to the appliance specifications information 205. In this way, the demand plan generating unit 2206 generates the plurality of demand plans including the demand plans in which appliance configurations are changed by replacement with or addition of a newly bought energy consuming appliance.

The demand plan generating unit 2206 generates presentation information items 2407 including the generated demand plans, and transmits them to the smart information superimposing unit 2207.

When a selection instruction 2415 for selecting a corresponding demand plan is input by the user through the input unit 105 (an input process 2402), the selection instruction 2415 indicating an input information item is transmitted to the smart information superimposing unit 2207.

In the smart information superimposing unit 2207 which has received the selection instruction 2415, a demand plan selecting unit 1901 selects one of the demand plans included in the presentation information items 2407, based on the selection instruction 2415.

Furthermore, in the smart information superimposing unit 2207, the presentation data generating unit 2302 obtains, as necessary, an appliance identification information item of an energy consuming appliance which is not included in a current appliance configuration, from the appliance information database 2231, and generates the presentation data item using also the appliance identification information item.

Furthermore, the smart information superimposing unit 2207 superimposes the presentation data item generated by the superimposing unit 303 onto the picture data item 215 with the identification information item received from the appliance identifying unit 104 (a smart superimposing process 2416).

The smart information superimposing unit 2207 performs the smart superimposing process 2416, and transmits the picture data item 2417 with the superimposed presentation data item to the output unit 108.

The output unit 108 outputs the image data item 2417 with the superimposed presentation data item using the liquid crystal display and/or the speaker (an output process 2418).

In addition, the demand plan generating unit 2206 transmits the presentation information items 2407 showing the generated demand plans to the smart information superimposing unit 2207, and transmits, to the plan executing unit 1809, a demand plan 2421 for the same appliance configuration as a current appliance configuration from among the generated demand plans.

When a selection instruction 2414 for selecting a corresponding demand plan is input by the user through the input unit 105 (an input process 2402), the selection instruction 2414 indicating an input information item is transmitted to the plan executing unit 1809.

In addition, the plan executing unit 1809 which has received the selection instruction 2414 selects one of the demand plans, based on the selection instruction 2414, and transmits, to an appliance control unit 110, a control instruction for causing the corresponding energy consuming appliance to operate based on the selected demand plan (a plan executing process 2022).

The appliance control unit 110 transmits the control signal 225 corresponding to the received control instruction 223 to each of the energy consuming appliances, and controls the energy consuming appliance (an appliance control process 224).

Figure 25A:
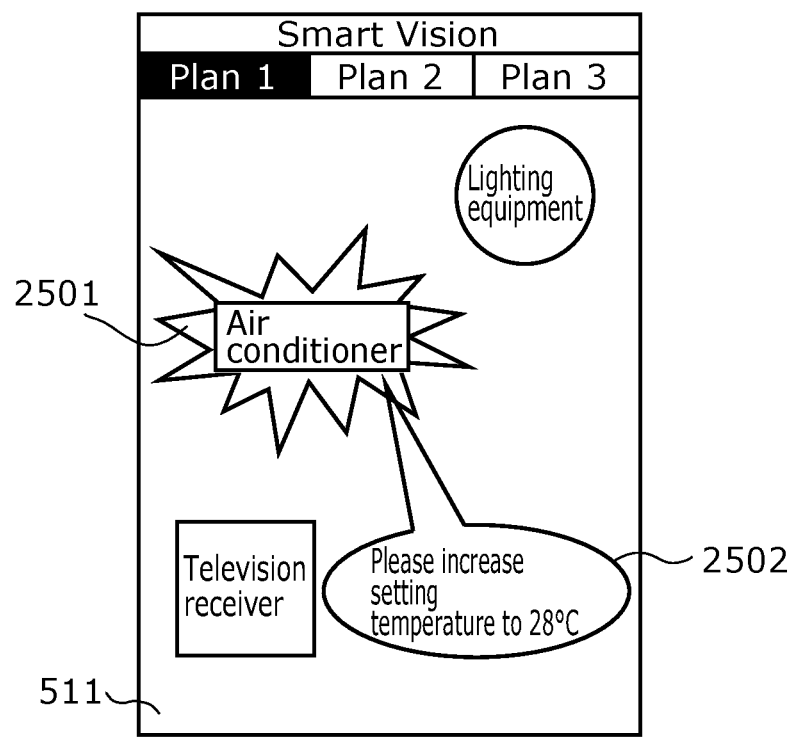
FIG. 25A is a diagram of an example showing a picture data item with superimposed presentation data items output on an output unit in Embodiment 7, in which a demand plan of "Plan 1" is selected.
Figure 25B:
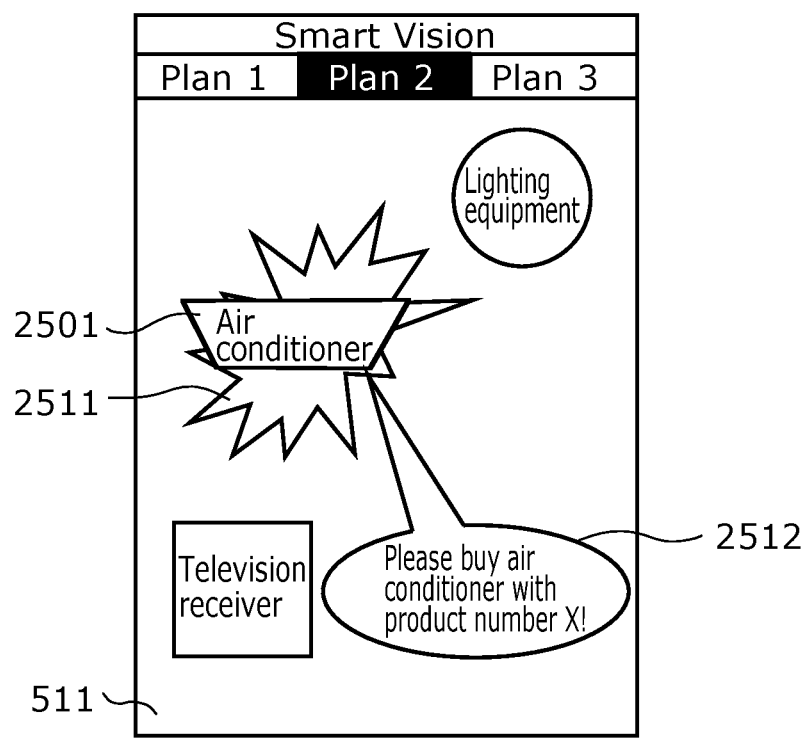
FIG. 25B is a diagram of an example which shows a picture data item with superimposed presentation data items output on an output unit in Embodiment 7, and in which a demand plan of "Plan 2" is selected.
Figure 25C:
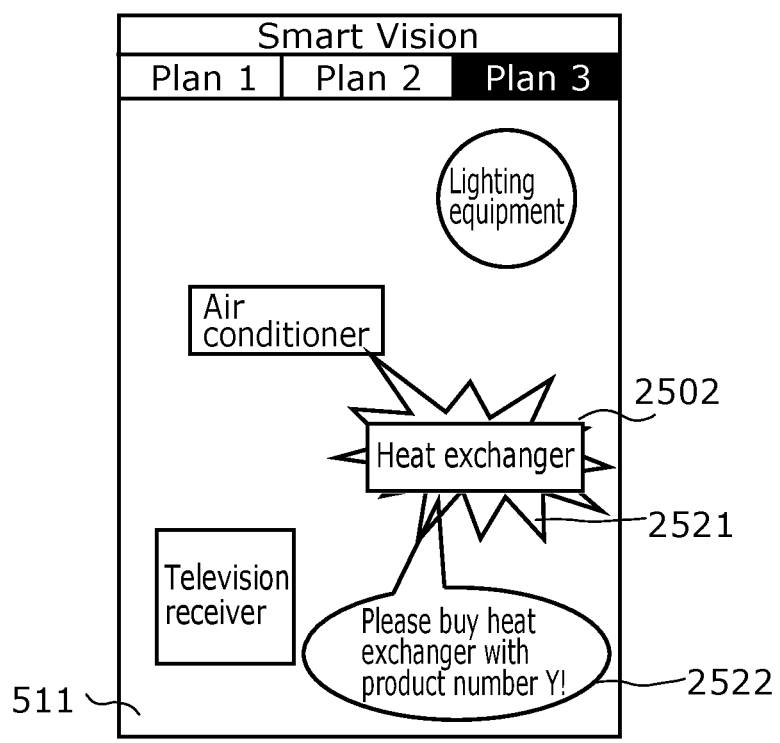
FIG. 25C is a diagram of an example which shows a picture data item with superimposed presentation data items output on an output unit in Embodiment 7, and in which a demand plan of "Plan 3" is selected.

Each of FIGS. 25A, 25B, and 25C is a diagram showing an example where the image data item 2417 with the superimposed presentation data item in this embodiment is output on the liquid crystal display 511 of the output unit 108.

FIGS. 25A, 25B, and 25C respectively show cases in which mutually different demand plans are selected.

FIG. 25A shows a case where the demand plan selecting unit 1901 selects a demand plan referred to as "Plan 1" which is a demand plan without any change in the appliance configuration, based on the selection instruction 2415 input through the input unit 105.

In the demand plan "Plan 1" in this case, a cooling temperature set for the energy consuming appliance (air conditioner) is determined as 28° C. which is different from a current temperature. Furthermore, as for the energy consuming appliance (air conditioner), an image data item 2501 which visually enhances the energy consuming appliance (air conditioner) and a text data item 2502 of "Please increase setting temperature to 28° C.!" are superimposed and displayed as presentation data items.

In addition, FIG. 25B shows a case where the demand plan selecting unit 1901 selects a demand plan referred to as "Plan 2" without a change in the appliance configuration, based on the selection instruction 2415 input through the input unit 105.

In the demand plan "Plan 2" in this case, the energy consuming appliance (air conditioner) is scheduled to be replaced with a new one. For this reason, as presentation data items of the energy consuming appliance (air conditioner), the following data items are superimposed and displayed: an image data item 2510 showing a state in which a replacement energy consuming appliance is disposed; an image data item 2511 which visually enhances the energy consuming appliance (air conditioner); and a text data item 2512 of "Please buy air conditioner with product number X!" for prompting the user to buy the new one.

In addition, FIG. 25C shows a case where the demand plan selecting unit 1901 selects a demand plan referred to as "Plan 3" with a change in the appliance configuration, based on the selection instruction 2015 input through the input unit 105.

In the demand plan "Plan 3" in this case, the energy consuming appliance (heat exchanger) is scheduled to be replaced with a new one. For this reason, as presentation data items of the energy consuming appliance (heat exchanger), the following data items are superimposed and displayed: an image data item 2520 showing a state in which a replacement energy consuming appliance (heat exchanger) is disposed; an image data item 2521 which visually enhances the energy consuming appliance (heat exchanger); and a text data item 2522 of "Please buy heat exchanger with product number Y!" for prompting the user to buy the new one.

In this way, the demand plans in which appliance configurations are changed by replacement with or addition of the newly bought energy consuming appliance are presented, which enables the user to select a demand plan for satisfying the need from among an increased number of options. This results in increase in the userfriendliness.

In addition, the user can select the demand plan which does not place much burden on the user, which increases a possibility that the user executes a demand plan for an energy consuming appliance which is not subject to automatic control and results in achievement of a demand control request.

Here, when the user buys a new energy consuming appliance for replacement or addition, the information stored by the appliance information storing unit 103 is updated.

When the new energy consuming appliance for replacement or addition is bought, the appliance information storing unit 103 obtains a specifications information item and an appliance identification information item of the new energy consuming appliance through the network 2220, and updates the information stored in the appliance information storing unit 103.

In addition, when the new energy consuming appliance for replacement or addition is bought, the component data of the presentation data stored by the presentation data generating unit 2302 is also updated.

When the new energy consuming appliance for replacement or addition is bought, the presentation data generating unit 2302 obtains the component data item of the presentation data item of the new energy consuming appliance through the network 2220, and updates the component data of the presentation data stored by the presentation data generating unit 2302.

Here, in the selected demand plan, the presentation need determining unit 301 may determine the presentation data item related to the new energy consuming appliance to be a presentation data item which needs to be presented preferentially.

Figure 26:
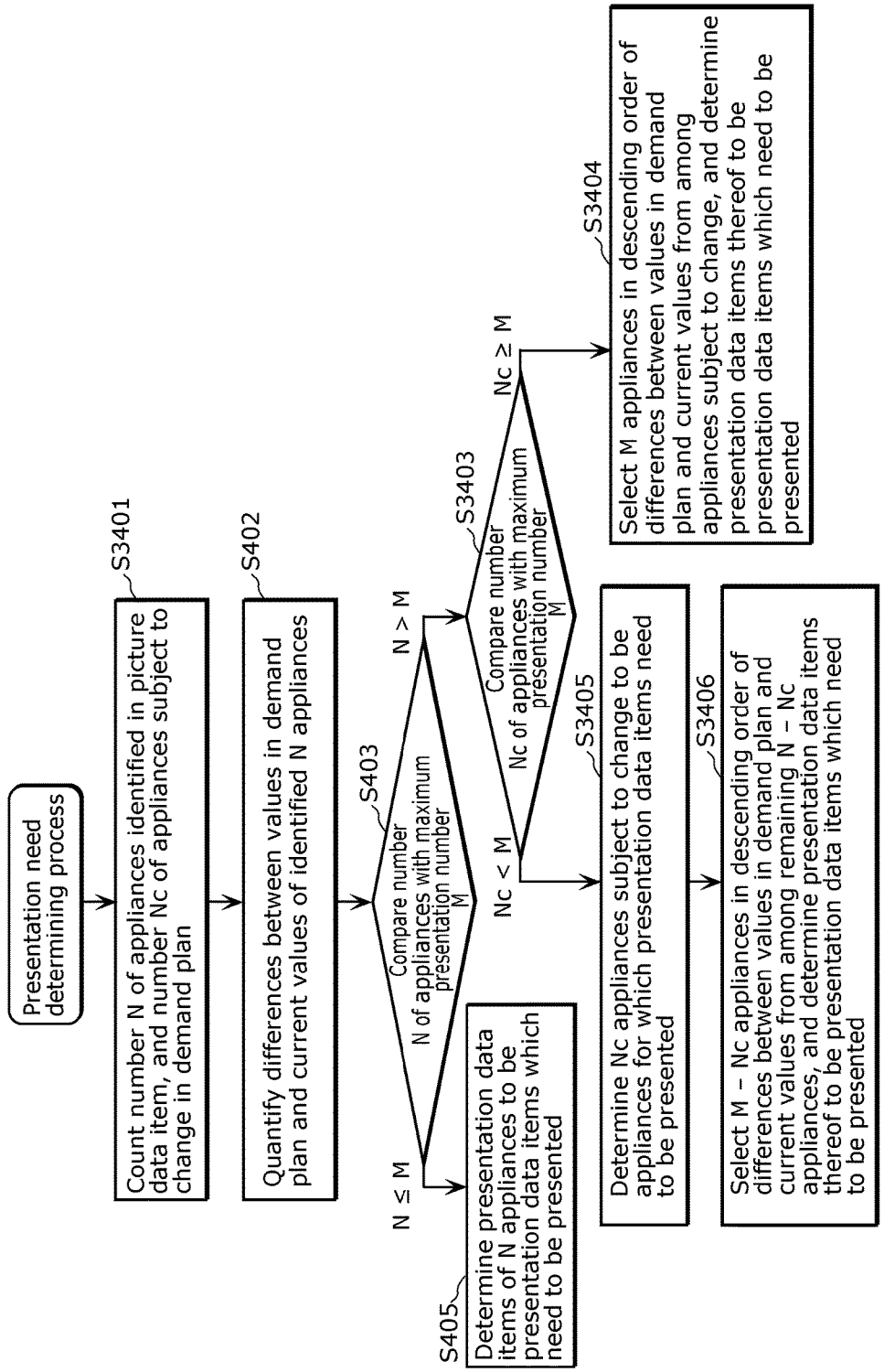
FIG. 26 is a flowchart for explaining a presentation need determining process in the case of prioritizing presentation of presentation data items related to energy consuming appliances whose states are to be adjusted in Embodiment 7.

FIG. 26 is a flowchart of the presentation need determining process performed by the presentation need determining unit 301 in this case.

First, based on appliance identification information items of the appliances, the presentation need determining unit 301 counts (i) the number N (N is an integer larger than or equal to 0) of energy consuming appliances identified in the picture data item 212, and (ii) the number Nc (Nc is an integer larger than or equal to 0) of energy consuming appliances subject to change in the selected demand plan (Step S3401).

Next, the presentation need determining unit 301 quantifies the differences between target values obtainable by performing the demand plan and current values related to the identified N energy consuming appliances (Step S402). Examples of data specifically used here include control details for the energy consuming appliances indicated by the demand plan. In the case where the demand control request is a control request related to a total energy consumption amount, the difference $\Delta E$ $(=Er-Ep)$ between an estimated value Ep and an actual value Er is calculated as being an obtainable value when the control details are performed, wherein Ep denotes the amount of energy consumed by each energy consuming appliance and Er denotes the amount of energy consumed under a current state.

In the case where the demand control request is a control request related to a $CO_2$ discharge amount, the difference $\Delta E$ $(=Er-Ep)$ between an estimated value Ep and an actual value Er is calculated as being obtainable value when the control details are performed, wherein Ep denotes the $CO_2$ discharge amount based on energy consumed by each energy consuming appliance and Er denotes the $CO_2$ discharge amount based on energy consumed under a current state.

In the case where the demand control request is a control request related to cost, the difference $\Delta E$ $(=Er-Ep)$ between an estimated value Ep and an actual value Er is calculated as being obtainable value when the control details are performed, wherein Ep denotes cost based on energy consumed by each energy consuming appliance and Er denotes cost based on energy consumed under a current state.

Next, the number N of energy consuming appliances is compared with the maximum presentation number M (M is an integer larger than or equal to 1) indicating the number of presentation data items to be presented at maximum (Step S403).

When $N \leq M$ is satisfied, the number of energy consuming appliances identified in the picture data item 212 is smaller than or equal to the maximum presentation number M. Thus, presentation data items of N energy consuming appliances among the identified appliances identified in the picture data item are determined to be presentation data items which need to be presented, for completion of the presentation need determining process (Step S405).

When N>M is satisfied, the number Nc of energy consuming appliances in the selected plan is also compared with the maximum presentation number M for the presentation data items (Step S3403).

When Nc≥Md is satisfied, M energy consuming appliances are selected from among the appliances subject to change in the selected plan in descending order of differences ΔE between target values in the demand plan and current values, and are determined to be energy consuming appliances for which presentation data items need to be presented, for completion of the presentation need determining process (Step S3404).

In addition, when Nc<M, Nc energy consuming appliances in the selected plan are determined to be energy consuming appliances for which presentation data items need to be presented (Step S3405). Furthermore, M−Nc energy consuming appliances are selected from among the remaining N−Nc energy consuming appliances in descending order of differences ΔE between target values in the demand plan and current values calculated in Step S402. The presentation data items of M−Nc energy consuming appliances are determined to be presentation data items which need to be presented, for completion of the presentation need determining process (Step S3406).

In this case, when the selected demand plan shows that one of the energy consuming appliances is changed, the message for prompting the user to buy the new energy consuming appliance for replacement is preferentially presented to the user.

[Embodiment 8]

An energy management system in this embodiment is characterized in that energy consuming appliances operate in a new operation mode, and new presentation data items are further superimposed.

In this embodiment, the following data items are obtained. Depending on combinations of low-level commands to the energy consuming appliances, control modules for causing the energy consuming appliances to operate in the new operation mode, data items including the new presentation data items (hereinafter referred to as "appliance content items") corresponding to the new operation mode are obtained through a network. This allows the energy consuming appliances to operate in the new operation mode, and enables superimposition of the new presentation data items.

Here, the new operation mode is an operation mode which cannot be normally used by energy consuming appliances, and is, for example, an energy saving control mode based on a new algorithm.

In addition, the new presentation data items are used to present, to the user, messages corresponding to the new operation mode and image data items, and are not output by simply connecting the energy consuming appliances to the management unit 100.

The basic structure of this embodiment is largely in common to that of Embodiment 3. Thus, the structural elements used in common to those of Embodiment 3 are assigned with the same numerical references, and indication of diagrams and detailed descriptions thereof are omitted where appropriate.

Figure 27:
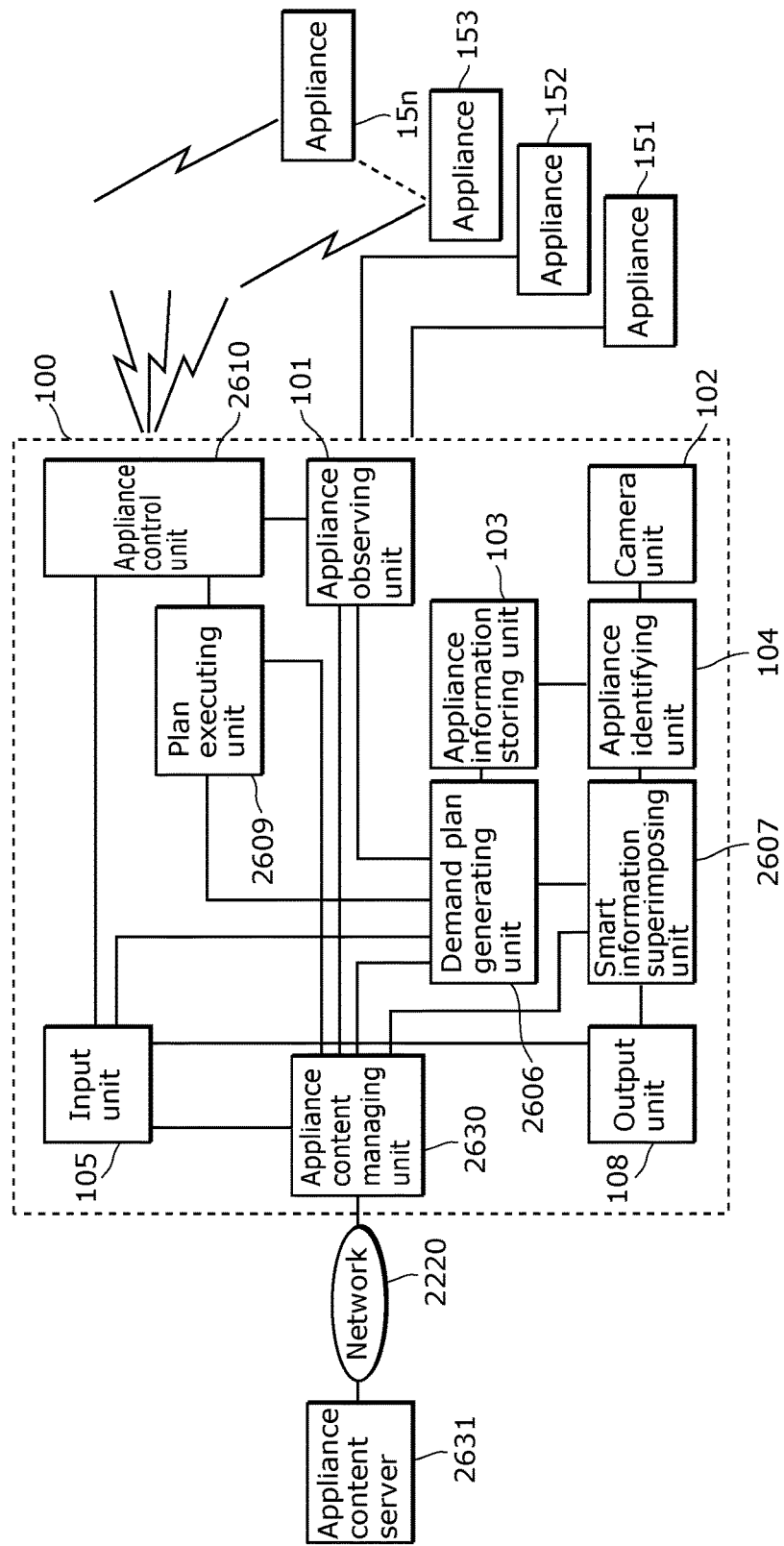
FIG. 27 is a diagram showing a configuration of an energy management system in Embodiment 8.

FIG. 27 is a diagram showing a configuration of the energy management system in this embodiment.

The energy management system in this embodiment further includes an appliance content server 2631 which distributes the appliance content items for the various kinds of energy consuming appliances. The appliance content server 2631 is connected to the management unit 100 through the network 2220.

Furthermore, the management unit 100 includes an appliance content managing unit 2630 which manages the appliance content items downloaded from the appliance content server 2631.

Figure 28:
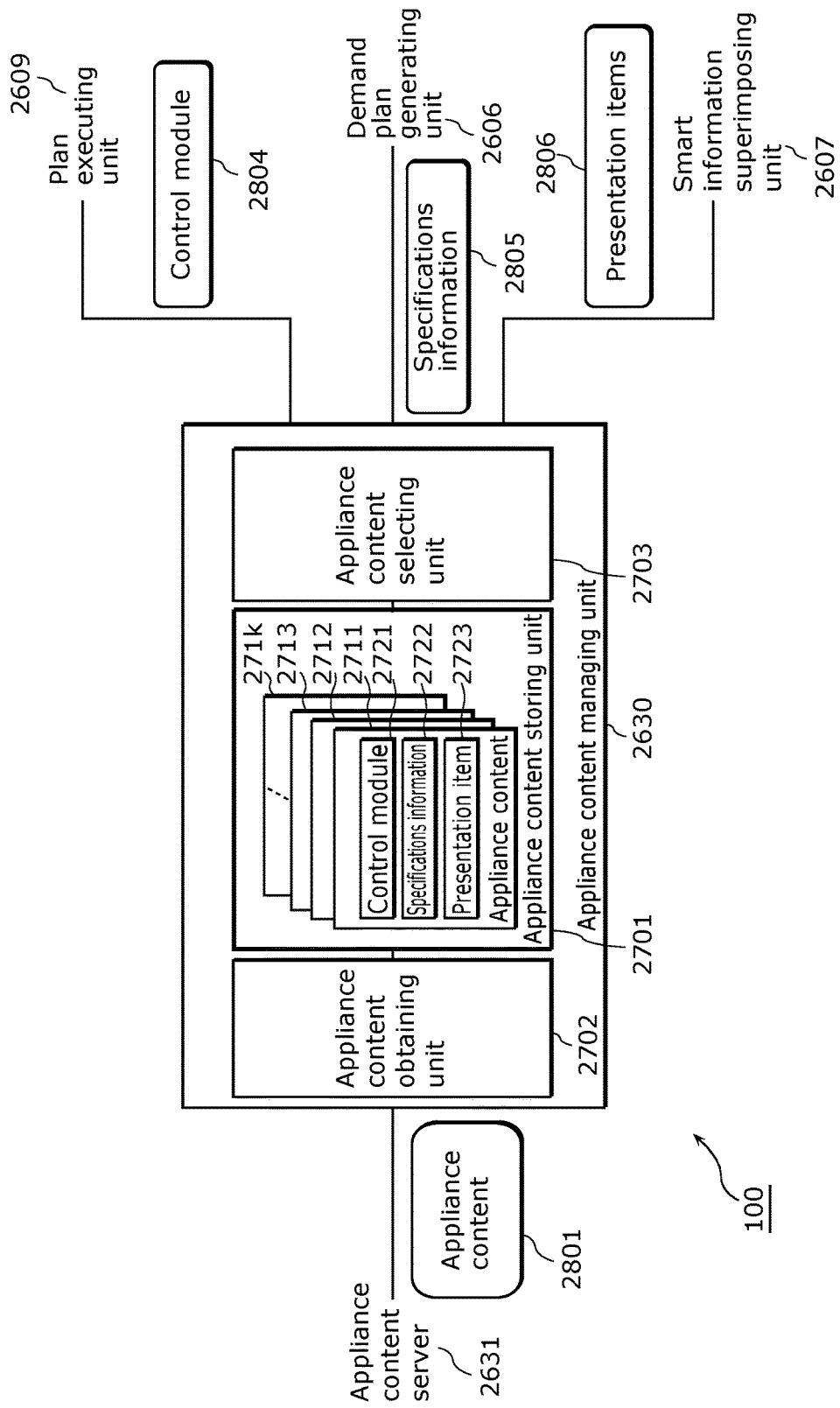
FIG. 28 is a block diagram of an appliance content unit in the energy management system in Embodiment 8.

FIG. 28 shows an internal structure of the appliance content managing unit 2630.

The appliance content managing unit 2630 includes an appliance content storing unit 2701, an appliance content obtaining unit 2702, and an appliance content selecting unit 2703.

The appliance content storing unit 2701 stores the content items 2711 to 271k (k is an integer larger than or equal to 1).

The appliance content obtaining unit 2702 obtains the appliance content items from the appliance content server 2631 through the network 2220, and stores them in the appliance content storing unit 2701.

The appliance content selecting unit 2703 selects appliance content items to be applied to the energy consuming appliances 151 to 15n from among appliance content items stored in the appliance content storing unit 2701.

The appliance content items include: a control module 2721 for causing the energy consuming appliances to operate in the new operation mode; and specifications information items 2722 of the energy consuming appliances and presentation items 2723 which are used to generate presentation data items for the energy consuming appliances to be controlled by the control module 2721.

The control module 2721 is a software program which is, for example, obtained by combining low-level commands to the energy consuming appliances, and is used to cause the energy consuming appliances to operate the new operation mode.

The specifications information items 2722 are information items related to energy consumption in the new operation mode in the case where the energy consuming appliances are controlled by the control module 2721.

The presentation items 2723 are component data items of the new presentation data items corresponding to the new operation mode, and include text message templates, image data items, audio data items, animation data items, etc.

The appliance content obtaining unit 2702 obtains the appliance content items from the appliance content server 2631. This obtainment is performed based on a user instruction which is input through an input unit 105. In addition, this obtainment is performed by periodically accessing the appliance content server 2631, and based on setting for obtaining obtainable appliance content items. In addition, this obtainment is performed in response to reception of event information showing that a new energy consuming appliance is newly connected to the management unit 100.

Here, in the obtainment of the appliance content item from the appliance content server 2631, a buy and sell agreement for the appliance content item or a use agreement for the appliance content item may be authenticated as necessary.

In addition, it is desirable that the appliance content be transmitted, for example, after being encrypted for the purpose of preventing unauthorized obtainment by a third person.

The appliance content storing unit 2701 stores the appliance content items and ID of the energy consuming appliances in an associated manner.

For each of the energy consuming appliances, plural appliance content items may be stored therein, or no appliance content item may be stored therein.

The appliance content selecting unit 2703 selects appliance content items suitable for the energy consuming appliances 151 to 15n. This selection is performed based on one of the following: a user instruction which is input through the input unit 105; a demand plan which is generated by the demand plan generating unit 2606; a use agreement information of the appliance content; and event information indicating that a new energy consuming appliance is newly connected to the management unit 100.

In relation to the selected appliance content, the appliance content selecting unit 2703 transmits (i) the control module 2721 to a plan executing unit 2609, (ii) the specifications information item 2722 to the demand plan generating unit 2606; and the presentation item 2723 to a smart information superimposing unit 2607.

Here, when the appliance content item is selected based on the use agreement information, for example, it is desirable that the appliance content item be encrypted and stored in the appliance content storing unit 2701 so as to prevent the appliance content item from being selected in an unauthorized manner.

For example, a case is conceivable in which the appliance content selecting unit 2703 selects an appliance content item 271j (j is an integer $1 \leq j \leq k$) for an energy consuming appliance 15i (j is an integer $1 \leq i \leq n$). In this case in this embodiment: (i) the demand plan generating unit 2606 generates, for the energy consuming appliance 15i, a demand plan with reference to the specifications information item 2722 of the appliance content item 271j; (ii) the plan executing unit 2609 controls the energy consuming appliance 15i using the control module of the appliance content item 271j; and (iii) the smart information superimposing unit 2607 generates the presentation data item of the energy consuming appliance 15i using the presentation item 2723 of the appliance content item 271j.

Figure 29:
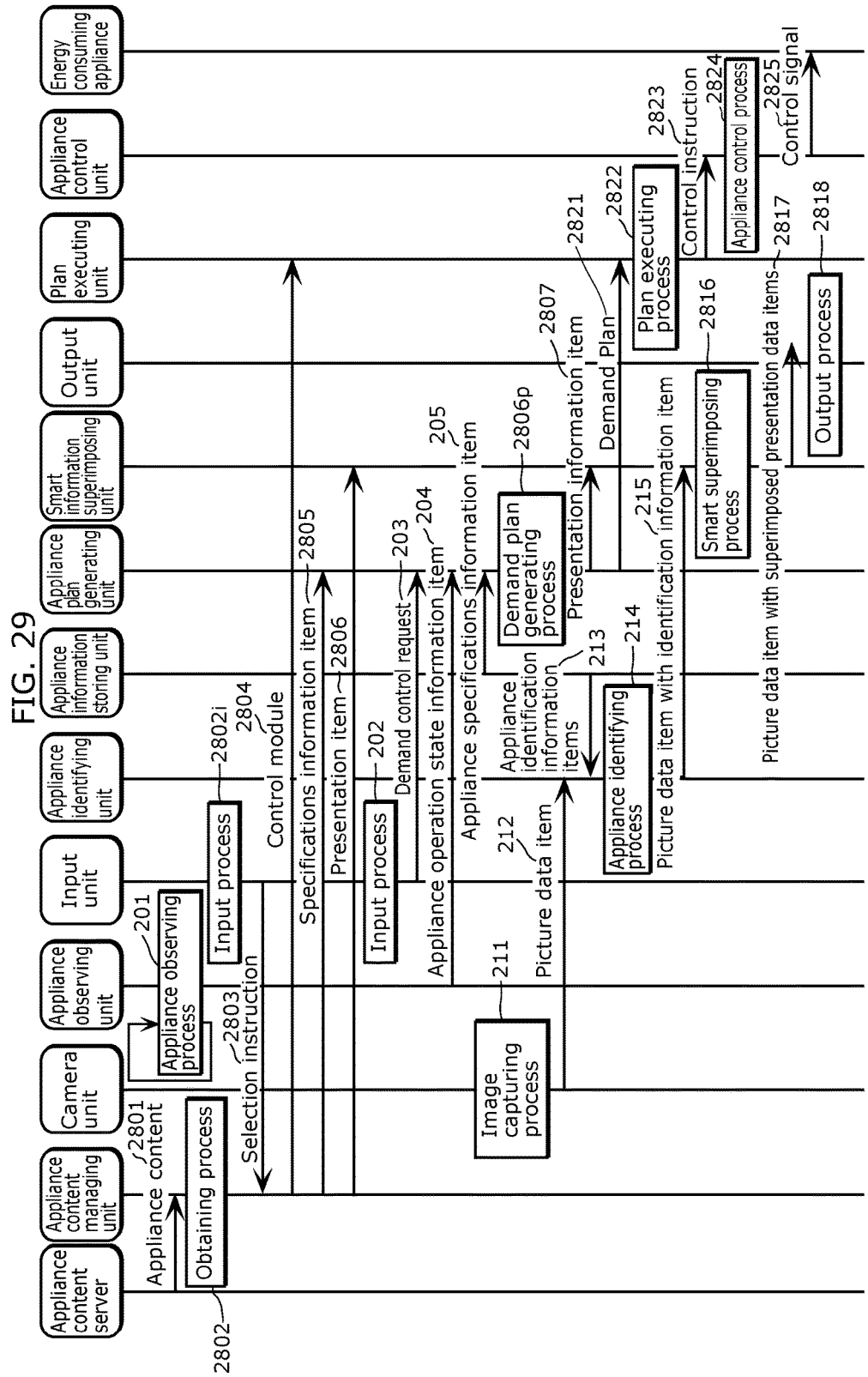
FIG. 29 is a sequence diagram for explaining operations in the energy management system in Embodiment 8.

FIG. 29 is a diagram showing a sequence of operations performed by the energy management system in this embodiment.

The following sequences are similar to those in Embodiment 3: a sequence of processes from the appliance observing process 201 by the appliance observing unit 101 and the input process 202 for a demand control request through the input unit 105 to when appliance specifications information items 205 are transmitted to the demand plan generating unit 2606; and a sequence from an image capturing process 211 by a camera unit 102 and to when the picture data item 215 with the identification information items is transmitted to the smart information superimposing unit 107.

In the energy management system in this embodiment, the appliance content obtaining unit 2702 of the appliance content managing unit 2630 receives the appliance content item 2801 from the appliance content server 2631, and stores the appliance content storing unit 2701 (an obtaining process 2802).

When a selection instruction 2803 for the appliance content item is input through the input unit 105 (an input process 2802i), the input selection instruction 2803 is transmitted to the appliance content managing unit 2630.

In the appliance content managing unit 2630, the appliance content selecting unit 2703 (i) selects the appliance content item based on the received selection instruction 2803, (ii) transmits a control module 2804 of the selected appliance content item to the plan executing unit 2609, (iii) transmits a specifications information item 2805 to the demand plan generating unit 2606, and (iv) transmits the presentation item 2806 to the smart information superimposing unit 2607.

The demand plan generating unit 106 generates a demand plan which satisfies a demand control request 203 with reference to (i) the specifications information item 2805 received from the appliance content managing unit 2630 as for the energy consuming appliance for which the appliance content item is applied, (ii) appliance specifications information item 205 stored in the appliance information storing unit 103 as for the energy consuming appliance for which the appliance content item is not applied, (iii) appliance operation state information item 204 stored in a memory area which is obtainable by accessing the appliance observing unit 101 (a demand plan generating process 2806p).

The demand plan generating unit 2606 transmits the presentation information item 2807 including the generated demand plan to the smart information superimposing unit 2607, and transmits the generated demand plan 2821 to the plan executing unit 2609.

Upon receiving the demand plan 2821, the plan executing unit 2609 transmits the control instruction 2823 to the appliance control unit 2610, so that the energy consuming appliance is caused to operate based on the details of the demand plan 2821, using the control module 2804 received from the appliance content managing unit 2630 (a plan executing process 2822).

The appliance control unit 2610 transmits the control signal 2825 corresponding to the received control instruction 2823 to each of the energy consuming appliances, and controls the energy consuming appliance (an appliance control process 2824).

Upon receiving the presentation information item 2807 and the picture data item 215 with identification information items, the smart information superimposing unit 2607 generates presentation data items using the presentation item 2806 received from the appliance content managing unit 2630, and superimposes the generated presentation data items around the energy consuming appliances on the picture data item 215 (a smart superimposing process 2816).

The smart information superimposing unit 2607 transmits the picture data item 2817 with the superimposed presentation data items. The output unit outputs the picture data item 2817 with the superimposed presentation data items on a liquid crystal display and/or using a speaker (an output process 2818).

Here, the demand plan generating unit 106 performs a simulation on a combination of appliance content items for the energy consuming appliances 151 to 15n, and may generate the optimum demand plan which satisfies the demand control request. In this case, the demand plan generating unit 2606 performs the simulation after receiving the specifications information items of the appliance content items other than an appliance content item which is currently being selected, from the appliance content selecting unit 2703.

In this case, as a result, the demand plan may include applying an appliance content item which is different from the current appliance content item to the energy consuming appliance.

Figure 30A:
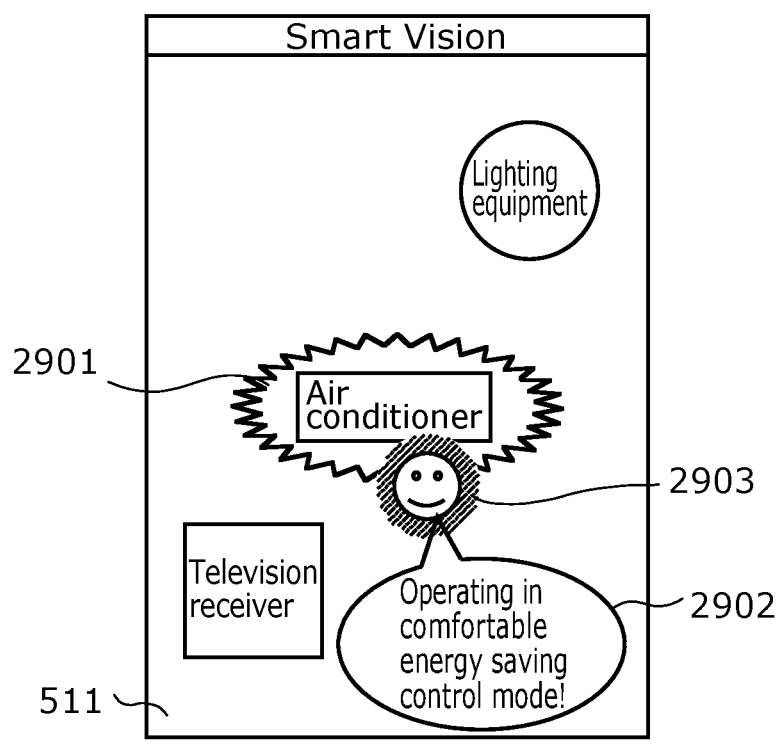
FIG. 30A is a diagram of an example which shows a picture data item with superimposed presentation data items output on an output unit in Embodiment 8, and in which an appliance content is applied to one (air conditioner) of the energy consuming appliances.
Figure 30B:
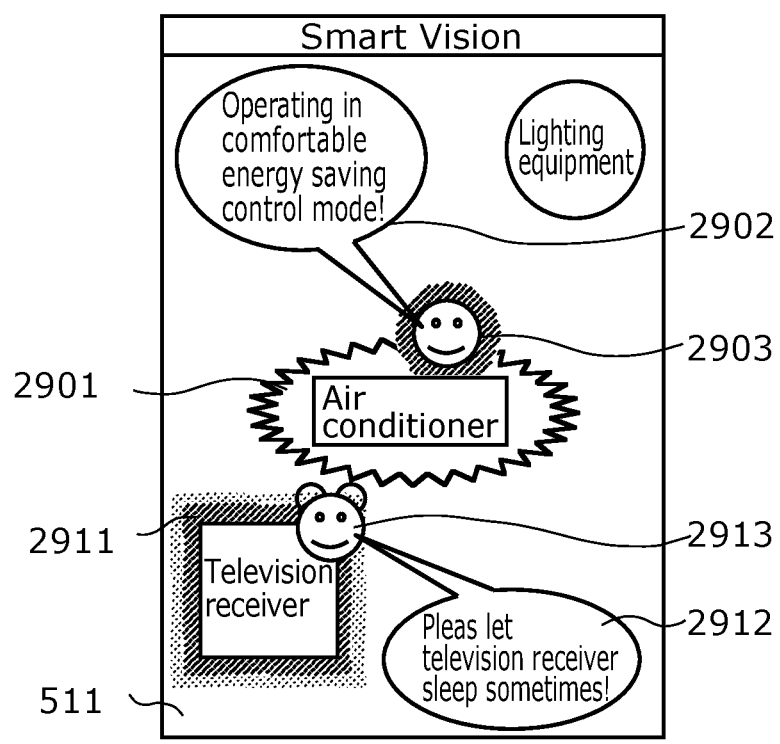
FIG. 30B is a diagram of an example which shows a picture data item with superimposed presentation data items output on the output unit in Embodiment 8, and in which an appliance content is applied to one (television receiver) of the energy consuming appliances.
Figure 30C:
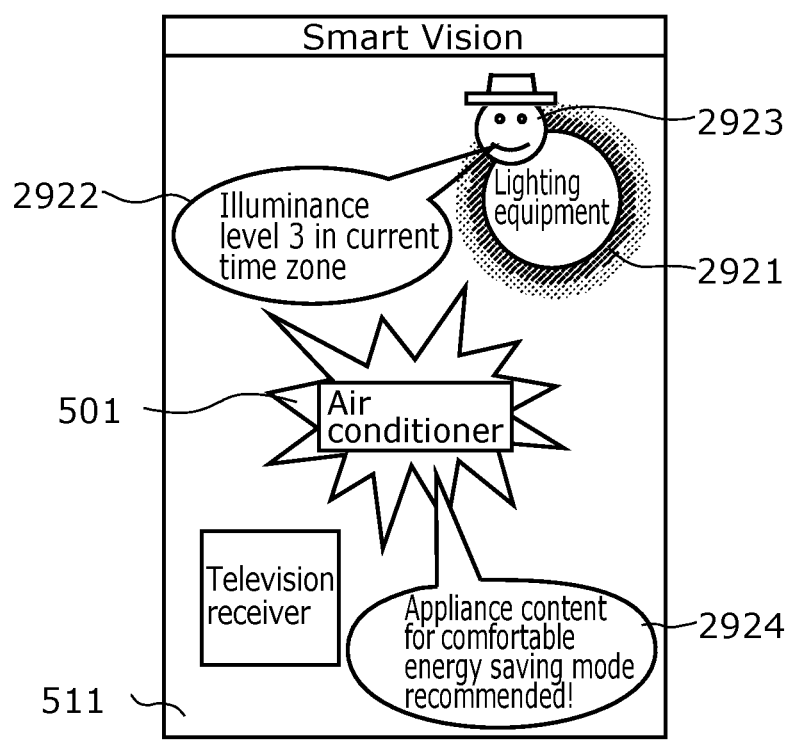
FIG. 30C is a diagram of an example which shows a picture data item with superimposed presentation data items output on the output unit in Embodiment 8, and in which an appliance content is applied to one (lighting equipment) of the energy consuming appliances.

Each of FIGS. 30A, 30B, and 30C is a diagram showing an example where the picture data item 2817 with the superimposed presentation data item in this embodiment is output on the liquid crystal display 511 of the output unit 108.

FIGS. 30A, 30B, and 30C respectively show cases where different appliance content items are selected.

FIG. 30A shows and an example case where an appliance content item is used for an energy consuming appliance (air conditioner).

In this case, the appliance content item used for the energy consuming appliance (air conditioner) includes a control module for operation in a new energy saving mode referred to as "comfort energy saving mode".

On the liquid crystal display 511, a display application displays and superimposes, as presentation data items for the energy consuming appliance (air conditioner), the following presentation data items: an image data item 2901 which visually enhances the energy consuming appliance (air conditioner) in a format different from a normal format; a text data item 2902 of "Operating in comfort energy saving mode!"; and a unique icon 2903.

In addition, when the user taps the icon 2903 on a touch panel integrated with the liquid crystal display 511, a speech of "Operating in comfort energy saving mode!" is output by an audio reproduction application from the speaker 512.

FIG. 30B shows an example case where an appliance content item is used for an energy consuming appliance (television receiver).

The appliance content item showing the energy consuming appliance (television receiver) includes a control module for operation in a new energy saving mode designed for children which is referred to as "energy saving mode for children".

For example, this control module automatically turns OFF a power source of the energy consuming appliance (television receiver) when the ON state of the power source exceeds a predetermined period of time, and lowers a sound volume level of the energy consuming appliance (television receiver) to a level at or below a certain level.

On the liquid crystal display 511, the display application displays and superimposes, as presentation data items for the energy consuming appliance (television receiver), the following presentation data items: an image data item 2911 which visually enhances the energy consuming appliance (television receiver) in a format different from a normal format; a text data item 2912 of "Please let television receiver sleep sometimes!"; and a unique icon for children 2913.

In addition, when the user taps the icon 2913 on the touch panel integrated with the liquid crystal display 511, a speech of "Please let television receiver sleep sometimes!" is output by the audio reproduction application from the speaker 512.

FIG. 30C shows an example case where an appliance content item showing an energy consuming appliance (lighting equipment) is used and an appliance content item for the "comfort energy saving mode" is required for the energy consuming appliance (air conditioner) in order to satisfy the demand control request.

In this case, the appliance content item used for the energy consuming appliance (lighting equipment) includes a control module for operations in new energy saving modes collectively referred to as "energy saving modes for time zones".

This control module changes illuminance levels of the light dependently on time zones such as morning, noon, evening, and night.

On the liquid crystal display 511, the display application displays and superimposes, as presentation data items for the energy consuming appliance (lighting equipment), the following presentation data items: an image data item 2921 which visually enhances the energy consuming appliance (lighting equipment) in a format different from a normal format; a text data item 2922 of "Illuminance level 3 in current time zone!"; and a unique icon 2923.

Furthermore, data items such as an image data item 501 which visually enhances the energy consuming appliance (air conditioner) and a text data item 2924 of "Appliance content for comfortable energy saving mode recommended!" are superimposed and displayed as presentation data items for the energy consuming appliance (air conditioner).

In addition, when the user taps the icon 2923 on the touch panel integrated with the liquid crystal display 511, a speech of "Illuminance level 3 in current time zone!" is output by the audio reproduction application from the speaker 512.

In addition, when the user taps the energy consuming appliance (air conditioner), a speech of "Appliance content for comfortable energy saving mode recommended!" is output by the audio reproduction application from the speaker 512.

The use of the appliance content items for the energy consuming appliances allows the energy consuming appliances to operate in new operation modes such as new energy saving modes, which increases the possibility that the demand control request can be achieved.

Furthermore, since the new presentation data items corresponding to the new operation modes are superimposed and presented, it is possible to present, to the user, operation states of the energy consuming appliances in the new operation modes even when the display on the LED, liquid crystal display, or the like is unchanged.

Here, it is also good to include, as presentation items, image or video data items and audio data items related to celebrities such as movie actors and actresses and characters in animation works.

In this case, since the image or video data items and audio data items related to the celebrities and characters are superimposed and presented to the user, the presentation data items are more likely to draw user's attention than normal presentation data items, with an increased visibility.

[Embodiment 9]

An energy management system in this embodiment is characterized in that presentation data items are presented to a user in synchronization with operations by energy consuming appliances and that the energy consuming appliances operate in synchronization with presentation of the presentation data items to the user.

In some cases, timing at which a presentation data item for an energy consuming appliance is presented to a user with a delay from timing of an operation by the energy consuming appliance. In such a case, the user may think the presentation data item strange and ignore the presentation data item.

When the presentation data item is presented to the user in synchronization with the operation by the energy consuming appliance, the user does not think the presentation data item strange and pays attention to the presentation data item, resulting in an increase in the visibility.

The basic structure of this embodiment is largely in common to that of Embodiment 8. Thus, the structural elements used in common to those of Embodiment 8 are assigned with the same numerical references, and indication of diagrams and detailed descriptions thereof are omitted where appropriate.

Figure 31:
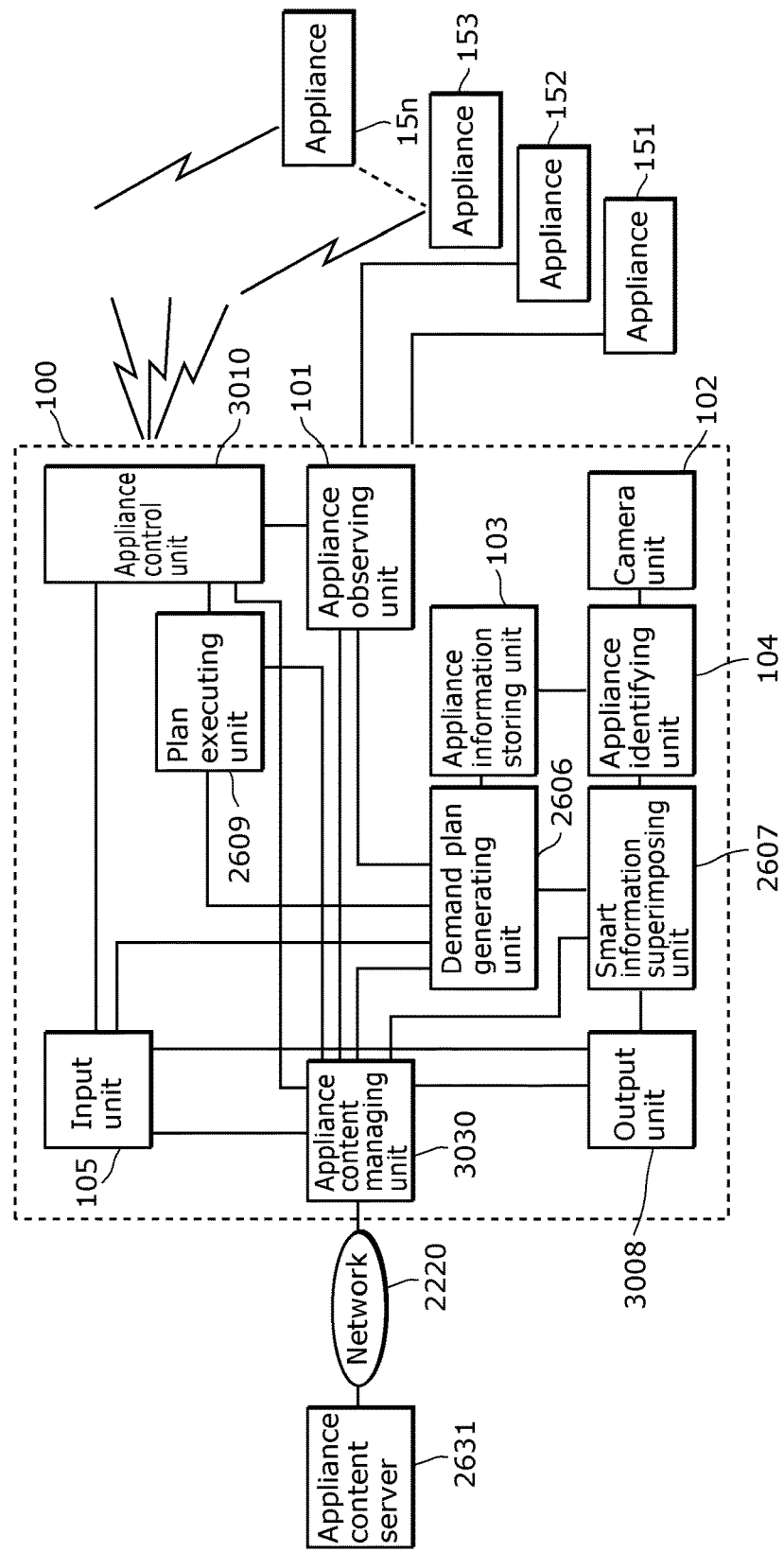
FIG. 31 is a diagram showing a configuration of an energy management system in Embodiment 9.

FIG. 31 is a diagram showing a system configuration of an energy management system in this embodiment.

Figure 32:
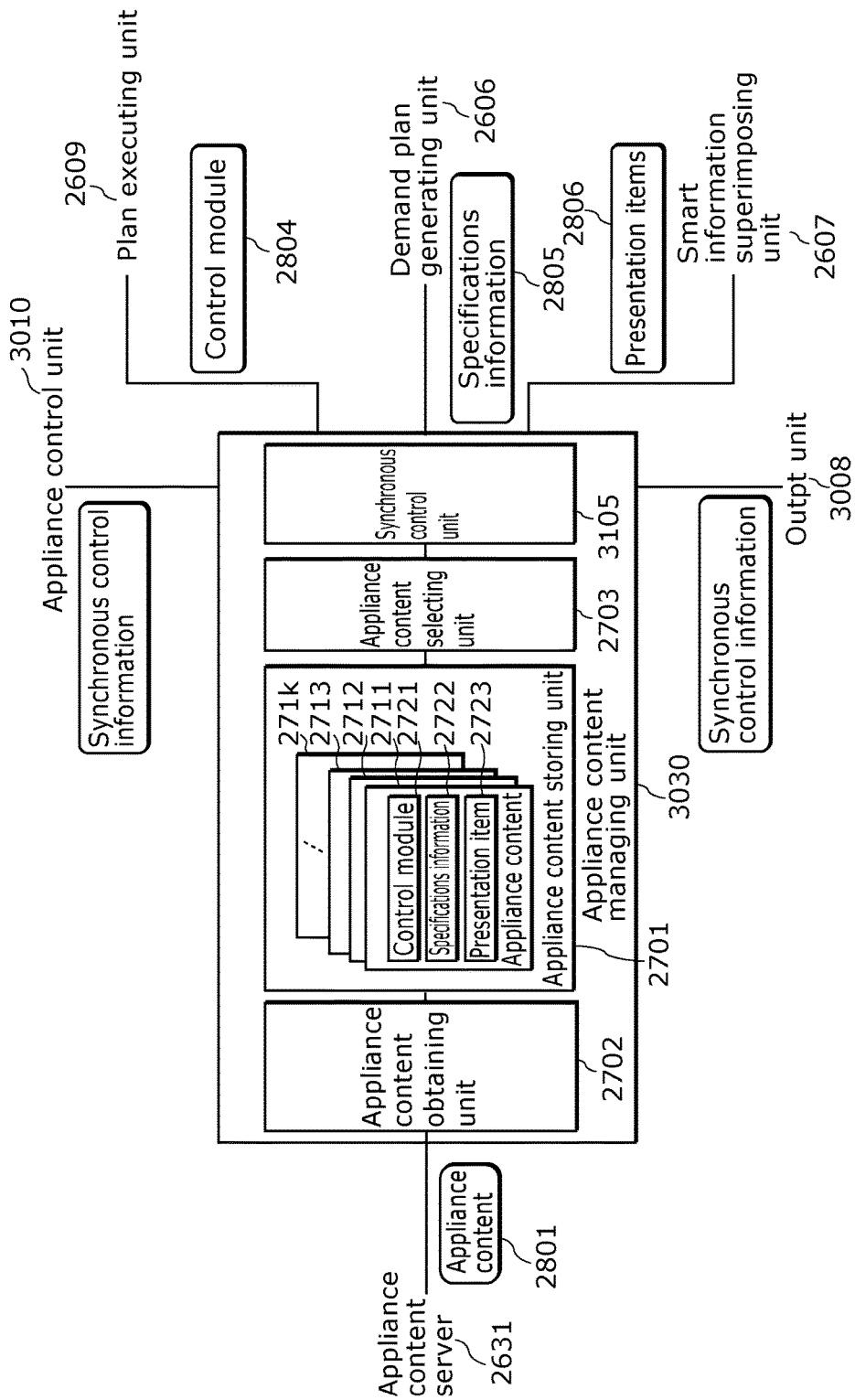
FIG. 32 is a block diagram of an appliance content unit in the energy management system in Embodiment 9.

FIG. 32 shows an internal structure of the appliance content managing unit 3030 in this embodiment.

The energy management system in this embodiment is similar to the one in Embodiment 8, except for an appliance content managing unit 3030, an output unit 3008, and an appliance control unit 3010.

In this embodiment, the appliance content managing unit 3030 further includes the output unit 3008, and a synchronous control unit 3105 which performs synchronous control on the appliance control unit 3010.

The appliance content managing unit 3030 communicates synchronous control information items with each of the output unit 3008 and the appliance control unit 3010. In this way, the appliance content managing unit 3030 helps the output unit 3008 to output the presentation data items in synchronization with operations by the energy consuming appliances. In addition, the appliance content managing unit 3030 helps the appliance control unit 3010 to control the energy consuming appliances in synchronization with presentation of the presentation data items to the user.

The synchronous control information items include ID for identifying the energy consuming appliances, ID indicating operations to be synchronized, and time information items about time points at which the operations are to be executed. The time information items included in the synchronous control information items are classified into time information items based on absolute time Ta (Ta shows a time point represented by "specific time, minute, and second") and time information items based on relative time Tr (Tr shows a time point represented as, for example, "after N seconds").

For example, the output unit 3008 receives, from the synchronous control unit 3105, a synchronous control information item including ID for identifying one of the energy consuming appliances, an identification information item indicating a reproduction operation of an animation item, and an absolute time Ta. In response to the reception of the synchronous control information item, the output unit 3008 performs an operation of outputting the data items including the superimposed animation item as the presentation data items of the energy consuming appliance at the absolute time Ta.

As another example, the output unit 3008 receives, from the synchronous control unit 3105, a synchronous control information item including ID for identifying one of the energy consuming appliances, an identification information item indicating a reproduction operation of an animation work, and an absolute time Tr. In response to the reception of the synchronous control information item, the output unit 3008 performs an operation of outputting the data items including the superimposed animation item as the presentation data items of the energy consuming appliance after the elapse of the relative time Tr.

For example, the appliance control unit 3010 receives, from the synchronous control unit 3105, a synchronous control information item including ID for identifying one of the energy consuming appliances, an identification information item indicating a certain operation by the energy consuming appliance, and an absolute time Ta. In response to the reception of the synchronous control information item, the appliance control unit 3010 causes the energy consuming appliance to perform the operation at the absolute time Ta.

As another example, the appliance control unit 3010 receives, from the synchronous control unit 3105, a synchronous control information item including ID for identifying one of the energy consuming appliances, an identification information item indicating a certain operation by the energy consuming appliance, and an absolute time Tr. In response to the reception of the synchronous control information item, the appliance control unit 3010 causes the energy consuming appliance to perform the operation at the relative time Tr.

Figure 33:
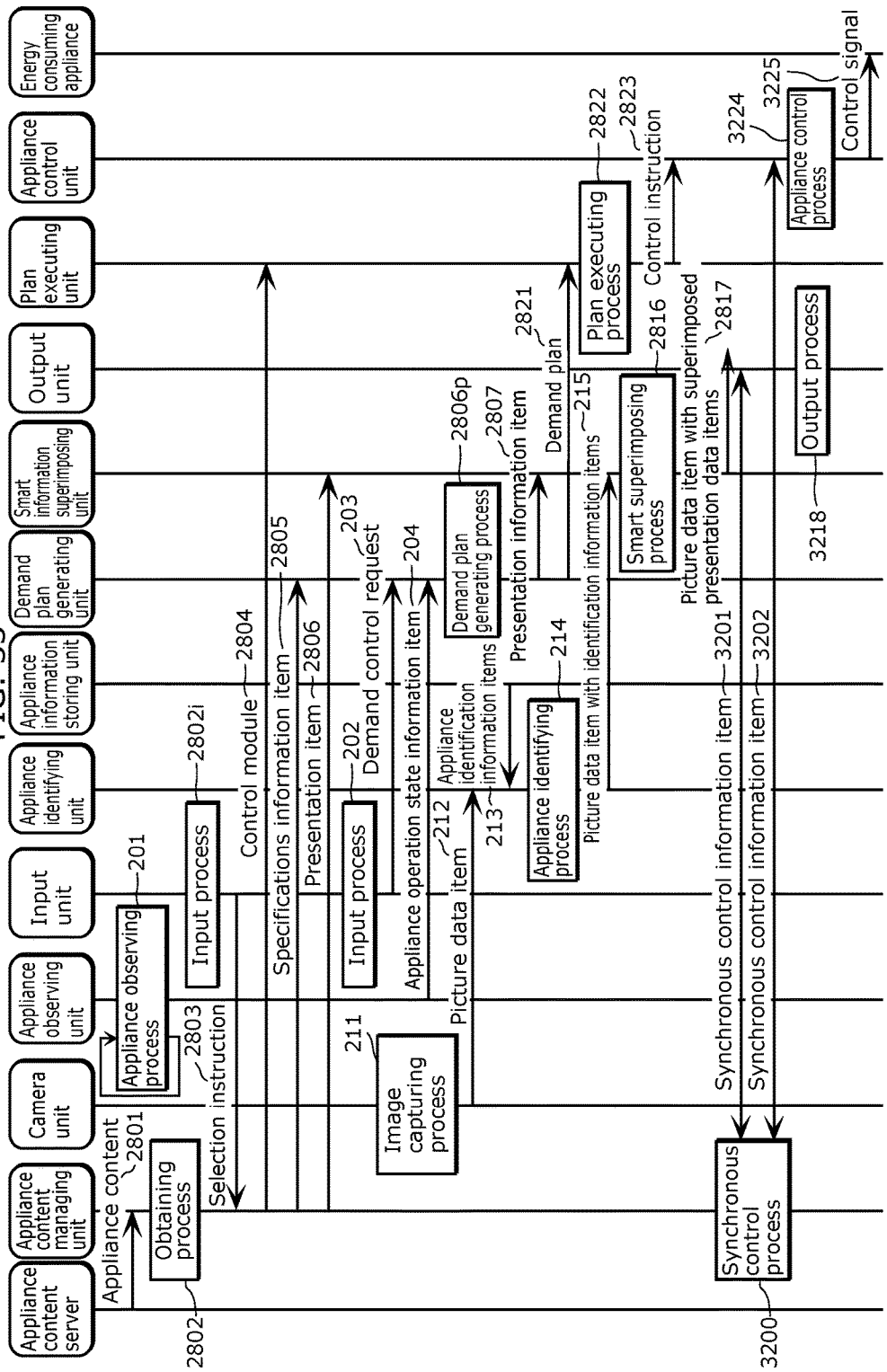
FIG. 33 is a sequence diagram for explaining operations in the energy management system in Embodiment 9.

FIG. 33 is a diagram showing a sequence of operations performed by an energy management system in this embodiment.

The following sequence of processes is similar to Embodiment 8. The sequence similar to the one in Embodiment 8 includes: an appliance observing process 201 by an appliance observing unit 101; and processes from an obtaining process 2802 for obtaining an appliance content item 2801 performed by an appliance content managing unit 3030 to when a control module 2804, a specifications information item 2805, and a presentation item 2806 each for the selected appliance content item are transmitted to a plan executing unit 2609, a demand plan generating unit 2606, and a smart information superimposing unit 2607, respectively. In addition, the following sequences are also similar to those in Embodiment 8: a sequence from an input process 202 for a demand control request to the input unit 105 to when a control instruction 2823 is transmitted to the appliance control unit 3010; and a sequence from an image capturing process 211 by a camera unit 102 to when a picture data item 2817 with a presentation data item superimposed thereon.

In the energy management system in this embodiment, the synchronous control unit 3105 of the appliance content managing unit 3030 performs a synchronous control process 3200, communicates a synchronous control information item 3201 with the output unit 3008, and communicates a synchronous control item 3202 with the appliance control unit 3010.

Based on the received synchronous control information item 3201, the output unit 3008 outputs a picture data item 2817 with superimposed presentation data items, using a liquid crystal display and/or a speaker (an output process 3218). The appliance control unit 3010 controls the energy consuming appliances based on the synchronous control information item 3202 (an appliance control process 3224).

Figure 34A:
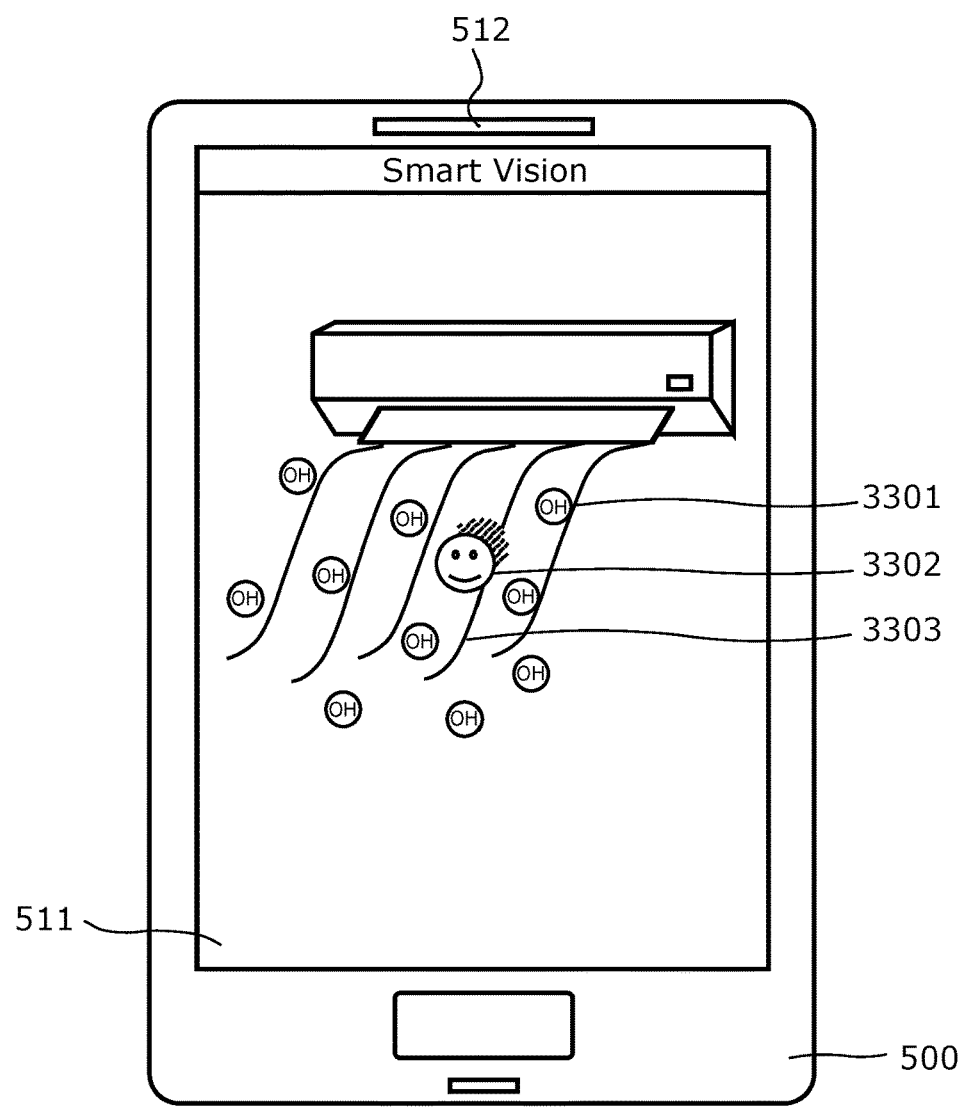
FIG. 34A is a schematic diagram of an example which shows a picture data item with superimposed presentation data items output on an output unit in Embodiment 9, and in which the picture data item is output on the output unit in synchronization with an operation of one (air conditioner) of the energy consuming appliances.
Figure 34B:
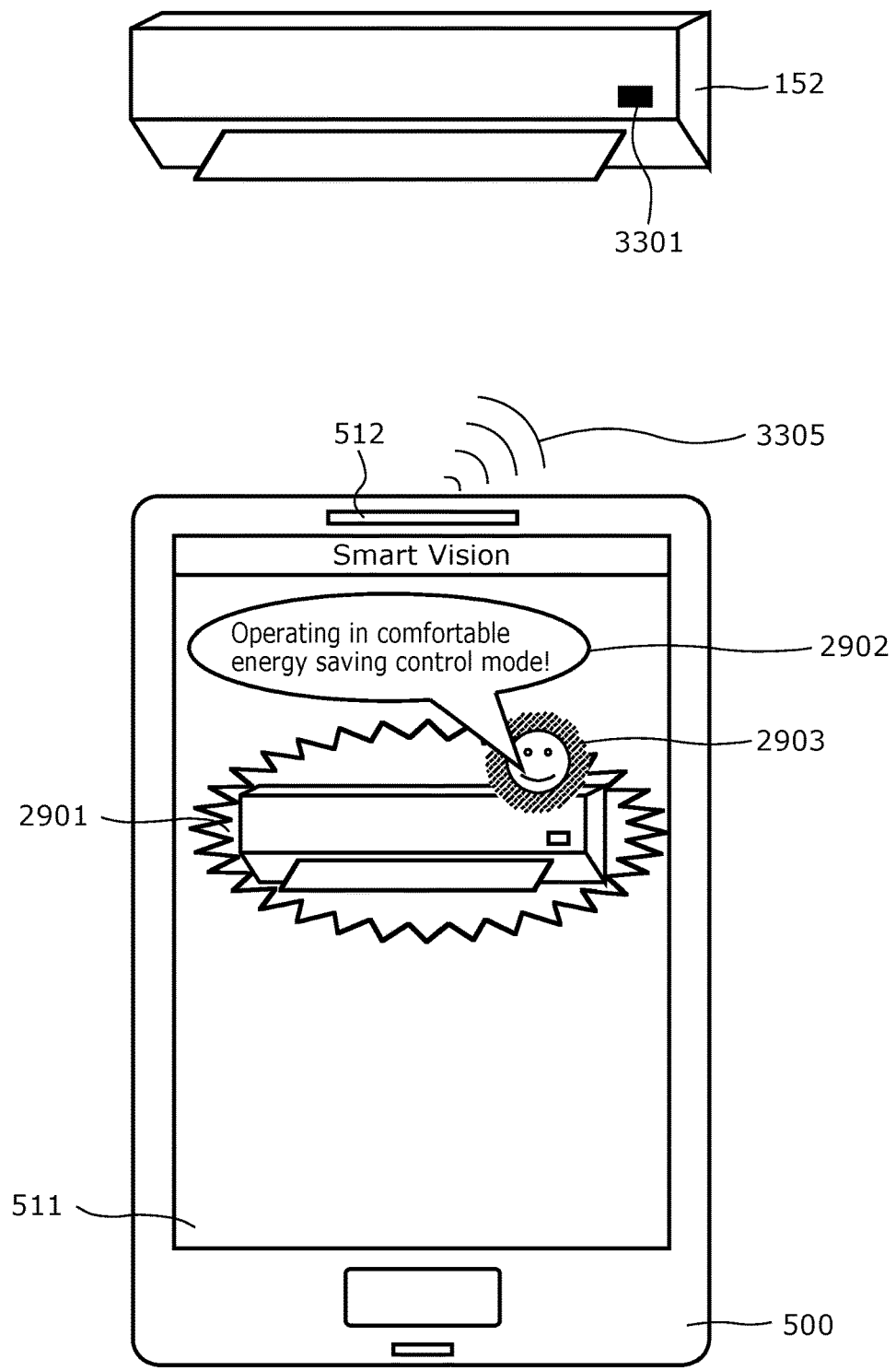
FIG. 34B is a schematic diagram of an example which shows a picture data item with superimposed presentation data items output on the output unit in Embodiment 9, and in which one (air conditioner) of the energy consuming appliances is performing a predetermined operation in synchronization with the output on the output unit.

Each of FIGS. 34A and 34B is a schematic diagram showing an example state where operations by the energy consuming appliances and presentation of presentation data items to the user are performed in synchronization with each other in this embodiment.

FIG. 34A shows an example state where a presentation data item for the energy consuming appliance (air conditioner) 152 is output onto the output unit 3008 in synchronization with the operation by the energy consuming appliance 152 (air conditioner).

In this case, as known from an appliance content item, the energy consuming appliance (air conditioner) 152 operates in a new energy saving mode referred to as "Energy saving mode for health".

On a liquid crystal display 511, an image data item is displayed which is obtained by imaging the energy consuming appliance (air conditioner) 152 in user's home and with a superimposed presentation data item related to the energy consuming appliance (air conditioner) 152.

Presentation data items superimposed in this case are nanoparticle ions 3301 having an elimination effect to be output from the energy consuming appliance (air conditioner) 152, a unique icon 3303 showing that the "Energy saving mode for health" is currently being performed, and an animation item showing a flow of wind 3302 which is currently output from the energy consuming appliance (air conditioner) 152.

Based on the synchronous control information received from the synchronous control unit 3105, the output unit 3008 outputs the image data item with the superimposed presentation data item. The image data item with the superimposed presentation data item is the image data item obtained by superimposing the presentation data item onto the image data item obtained by imaging the energy consuming appliance (air conditioner) 152 in the home. When the image data item is output based on the synchronous control information, the animation item is reproduced in synchronization with the flow of wind from the actual energy consuming appliance (air conditioner) 152.

The nanoparticle ions 3301 and flow of wind 3302 output from the energy consuming appliance (air conditioner) 152 cannot be seen actually, but are visualized using the presentation data items in this case.

In this way, by presenting, to the user, the presentation data items in synchronization with the operation by the actual energy consuming appliance (air conditioner) 152, it is possible to present the state of operation by the energy consuming appliance (air conditioner) 152 without causing the user to feel the presentation strange. As a result, the presentation data item attracts the user's attention, resulting in an increase in the visibility.

FIG. 34B shows an example state where the energy consuming appliance (air conditioner) 152 performs a predetermined operation in synchronization with output of an image data item with a superimposed presentation data item onto the output unit.

In this case, as known from an appliance content item, the energy consuming appliance (air conditioner) 152 operates in a new energy saving mode referred to as "Comfort saving mode".

On the liquid crystal display 511, an image data item is displayed which is obtained by imaging the energy consuming appliance (air conditioner) 152 in the home and with the superimposed presentation data item related to the energy consuming appliance (air conditioner) 152.

On the liquid crystal display 152, the following presentation data items for the energy consuming appliance (air conditioner) 152 are superimposed and displayed as presentation data items: an image data item 2901 which visually enhances the energy consuming appliance (air conditioner) 152 in a format different from a normal format; a text data item 2902 of "Operating in comfort energy saving mode!"; and a unique icon 2903.

In addition, the user taps the icon 2903 on the touch panel integrated with the liquid crystal display 511. In response to this, the audio reproduction application causes the speaker 512 to output a speech of "Operating in comfort energy saving mode!", and causes the energy consuming appliance (air conditioner) 152 to flicker its light emitting diode (LED) 3301 at the same time.

At this time, based on the synchronous control information received from the synchronous control unit 3105, the appliance control unit 3010 transmits a control signal for flickering the LED 3301 to the energy consuming appliance (air conditioner) 152. With this, the energy consuming appliance (air conditioner) 152 flickers its LED 3301 in synchronization with the output of the speech from the speaker 512.

By flickering the LED 3301 in synchronization with the output of the speech, it is possible to cause the user to feel as if the energy consuming appliance (air conditioner) 152 is saying the speech.

In this way, by means of the actual energy consuming appliance operating in synchronization with the presentation of the presentation data item to the user, it is possible to present the details of the presentation data item without causing the user to feel the presentation strange. As a result, the presentation data item attracts the user's attention, resulting in an increase in the visibility.

[Other Variations]

The present invention has been described above based on the embodiments, but naturally is not limited to the exemplary embodiments. The present invention also includes the following implementations.

(1) Each of the aforementioned apparatuses is, specifically, a computer system including a microprocessor, a ROM, a RAM, a hard disk unit, a display unit, a keyboard, a mouse, and so on. A computer program is stored in the RAM or hard disk unit. The respective apparatuses achieve their functions through the microprocessor's operations according to the computer program. Here, the computer program is configured to achieve their functions by combining plural instruction codes indicating instructions for the computer. Computer systems here are not limited to computer systems including all of a microprocessor, a ROM, a RAM, a hard disk unit, a display unit, a keyboard, a mouse, and so on, and computer systems including some of the apparatuses are also possible.

(2) A part or all of the structural elements of the respective apparatuses may be configured with a single system-LSI (Large-Scale Integration). The system-LSI is a super-multi-function LSI manufactured by integrating structural units on a single chip, and is specifically a computer system configured to include a microprocessor, a ROM, a RAM, and so on. A computer program is stored in the RAM. The system-LSI achieves its function through the microprocessor's operations according to the computer program.

Furthermore, each of the structural units of the respective apparatuses may be made as separate individual chips, or as a single chip to include a part or all thereof.

Furthermore, system-LSI is mentioned here, but there are instances where the designations IC, LSI, super LSI, or ultra LSI are used depending on the degree of integration. Furthermore, the means for circuit integration is not limited to an LSI, and implementation with a dedicated circuit or a general-purpose processor is also available. In addition, it is also possible to use a Field Programmable Gate Array (FPGA) that is programmable after the LSI is manufactured, and a reconfigurable processor in which connections and settings of circuit cells within the LSI are reconfigurable.

Furthermore, when a circuit integration technology for replacing LSIs with new circuits appears in the future with advancement in semiconductor technology and derivative other technologies, the circuit integration technology may be naturally used to integrate functional blocks. Application of biotechnology is one such possibility.

(3) A part or all of the constituent elements constituting the respective apparatuses may be configured as an IC card which can be attached to and detached from the respective apparatuses or as a stand-alone module. The IC card or the module is a computer system configured from a microprocessor, a ROM, a RAM, and so on. The IC card or the module may also be included in the aforementioned super-multi-function LSI. The IC card or the module achieves its functions through the microprocessor's operations according to the computer program. The IC card or the module may also be implemented to be tamper-resistant.

(4) The present invention may be the above-described method. Furthermore, the present invention may be implemented as computer programs for executing the above-described method, using a computer, and may also be implemented as digital signals including the computer programs.

Furthermore, the present invention may also be implemented as computer programs or digital signals recorded on computer-readable recording media such as a flexible disc, a hard disk, a CD-ROM, an MO, a DVD, a DVD-ROM, a DVD-RAM, a BD (Blu-ray Disc), and a semiconductor memory. Furthermore, the present invention may also be implemented as the digital signals recorded on these recording media.

Furthermore, the present invention may also be implemented as the aforementioned computer programs or digital signals transmitted via a telecommunication line, a wireless or wired communication line, a network represented by the Internet, a data broadcast, and so on.

The present invention may also be implemented as a computer system including a microprocessor and a memory, in which the memory stores the aforementioned computer program and the microprocessor operates according to the computer program.

Furthermore, it is also possible to execute another independent computer system by transmitting the programs or the digital signals recorded on the aforementioned recording media, or by transmitting the programs or digital signals via the aforementioned network and the like.

(5) The embodiments and variations may be arbitrarily combined.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the control information display apparatus according to each of the embodiments is a program described below.

For example, this program causes a computer to execute a control information display method including: obtaining one or more control information items (i) regarding one or more appliances which consume energy provided in a building and (ii) used for satisfying a control request in the building; obtaining one or more picture data items showing images of the one or more appliances; storing the one or more picture data items obtained in the obtaining of the one or more picture data items; selecting, based on a specified control mode, a picture data item from among selection candidates including the one or more picture data items stored in the storing; generating a presentation data item to be presented to a user to indicate a control information item for each of the one or more appliances which are included in the picture data item selected in the selecting, and superimposing the presentation data item at a position around the appliance in the picture data item; and displaying the picture data item with the presentation data item superimposed thereon.

Although the control information display apparatus or the information display apparatus according to one or more aspects of the present invention has been described above based on the embodiments, the present invention is not limited to the embodiments. The present invention has a scope which covers and encompasses not only the one or more aspects but also various modifications conceivable by a person skilled in the art and added thereto and embodiments obtainable by combining structural elements of different embodiments without materially departing from the principles and spirit of the present invention.

INDUSTRIAL APPLICABILITY

The energy control apparatus, energy control method, and energy control system in the above described embodiments reduce energy consumption by presenting a user with information related to all appliances (including appliances without any communication function) in his or her home, and controlling appliances with a communication function.

REFERENCE SIGNS LIST

100 Management unit
101 Appliance observing unit
102 Camera unit
102x Obtaining unit
102y, 1504 Image data storing unit
102z Selecting unit
103 Appliance information storing unit
104 Appliance identifying unit
105 Input unit
106, 1806, 2206, 2606 Demand plan generating unit
107, 1807, 2207, 2607 Smart information superimposing unit
107x Image processing unit
108, 3008 Output unit
109, 1809, 2609 Plan executing unit
110, 2610, 3010 Appliance control unit
151-15n Energy consuming unit
301 Presentation need determining unit
302, 2302 Presentation data generating unit
303 Superimposing unit
1401 Home management unit
1402 Mobile terminal management unit
1403 Server management unit
1411, 1412, 1413 Communication unit
1505 Switching unit
1901 Demand plan selecting unit
2630, 3030 Appliance content managing unit
2701 Appliance content storing unit
2702 Appliance content obtaining unit
2703 Appliance content selecting unit
3105 Synchronous control unit

The invention claimed is:
1. An information display apparatus comprising:
a first obtaining unit configured to obtain a plurality of control plans including one or more control information items regarding one or more appliances;
a second obtaining unit configured to obtain a picture data item showing an image of the one or more appliances;
a memory that stores the picture data item obtained by the second obtaining unit;
a first selecting unit configured to select, based on a specified selection instruction, a control plan from among the control plans obtained by the first obtaining unit;
a processor that executes processing for superimposing the one or more control information items included in the control plan selected by the first selecting unit, for each of the one or more appliances which are included in the picture data item obtained by the second obtaining unit, at a position around the appliance in the picture data item; and
a display unit configured to display the picture data item with the one or more control information items superimposed thereon, wherein at least one of the one or more control information items includes instructions for controlling one of the one or more appliances.

2. The information display apparatus according to claim 1, further comprising:
a second selecting unit configured to select, based on a specified control mode, a picture data item from among selection candidates including the picture data item stored in the memory,
wherein the processor executes processing for superimposing the one or more control information items for each of the one or more appliances which are included in the picture data item selected by the second selecting unit.

3. The information display apparatus according to claim 1, further comprising:
a control unit configured to control the one or more appliances via a communication network,
wherein the control unit controls the one or more appliances according to the control plan selected by the first selecting unit.

4. The information display apparatus according to claim 1,
wherein the control plans include one or more control information items in the case of replacing one or more appliances in a building.

5. The information display apparatus according to claim 1,
wherein the information display apparatus is one of a mobile phone, a smart phone, and a television receiver.

6. An information display method comprising:
obtaining a plurality of control plans including one or more control information items regarding one or more appliances;
obtaining a picture data item showing an image of the one or more appliances;
storing the obtained picture data item;
selecting, based on a specified selection instruction, a control plan from among the obtained control plans;
executing processing for superimposing the one or more control information items included in the selected control plan, for each of the one or more appliances which are included in the obtained picture data item, at a position around the appliance in the picture data item; and
displaying the picture data item with the one or more control information items superimposed thereon,
wherein at least one of the one or more control information items includes instructions for controlling one of the one or more appliances.

* * * * *